US012263572B1

(12) United States Patent
Conklin

(10) Patent No.: US 12,263,572 B1
(45) Date of Patent: Apr. 1, 2025

(54) STUD MARKER APPARATUS AND METHOD

(71) Applicant: Mark Conklin, Clark, NJ (US)

(72) Inventor: Mark Conklin, Clark, NJ (US)

(*) Notice: Subject to any disclaimer, the term of this patent is extended or adjusted under 35 U.S.C. 154(b) by 0 days.

(21) Appl. No.: 18/937,854

(22) Filed: Nov. 5, 2024

(51) Int. Cl.
*B25H 7/04* (2006.01)

(52) U.S. Cl.
CPC .................................... *B25H 7/045* (2013.01)

(58) Field of Classification Search
CPC ... B25H 7/00; B25H 7/02; B25H 7/04; B25H 7/045
USPC ..... 33/18.1, 32.1, 32.2, 34, 39.1, 41.1, 41.6, 33/45, 772, 775, 779, 782
See application file for complete search history.

(56) References Cited

U.S. PATENT DOCUMENTS 2,947,084 A * 8/1960 Billings ................ E04F 21/165 33/41.6
3,006,273 A * 10/1961 Lawrence ................ G01B 3/12 101/328
3,046,884 A * 7/1962 Pearson ................... B41K 1/42 33/36
3,286,351 A * 11/1966 McAlister ................ B25H 7/04 30/263
4,372,049 A * 2/1983 Hogue ..................... B43K 8/00 101/328
4,519,139 A * 5/1985 Ghinamo ................ C03B 33/10 33/32.3
4,680,864 A * 7/1987 Heagerty .................. B43L 9/00 D19/135
5,195,247 A * 3/1993 Wilcox ............... E04G 21/1891 33/36
5,749,522 A * 5/1998 Smrt .................... B65D 83/184 239/150
6,035,542 A * 3/2000 Woznow .................. G01C 7/04 33/775
7,574,815 B1 * 8/2009 Lai ........................... G01B 3/12 33/772
8,196,309 B2 * 6/2012 Alkhalifah ............... G01B 3/12 33/772
9,482,508 B2 * 11/2016 Wojciechowski ....... G01B 3/12
11,839,967 B1 * 12/2023 Keller ..................... B25H 7/045
2009/0064527 A1 * 3/2009 Weavers .................. G01B 3/12 33/775
2009/0217542 A1 * 9/2009 Watkins ............... B65D 83/386 33/775
2015/0047743 A1 * 2/2015 Keskinen ................. G01B 3/12 33/775
2016/0288315 A1 * 10/2016 Choate ................... G01B 3/303

* cited by examiner

*Primary Examiner* — George B Bennett
(74) *Attorney, Agent, or Firm* — Walter J. Tencza, Jr.

(57) ABSTRACT

An apparatus including a first marking device; a first roller wheel; and a structure to which the first marking device and the first roller wheel are attached. The first roller wheel is configured to roll on the top of a stack of one or more plates, while the structure moves over the top of the stack, and the first marking device marks a first side of the stack with a marking material, such as ink or paint. The apparatus may further include a housing; and wherein the housing includes an enclosure containing the marking material; and a pump configured to pump the marking material out to the first marking device. The apparatus may include a second marking device, with the second marking device attached to the structure on a first side of the structure, and the first marking device attached to the structure on a second side of the structure.

22 Claims, 46 Drawing Sheets

STUD MARKER APPARATUS AND METHOD

FIELD OF THE INVENTION

This invention relates to devices for marking studs.

BACKGROUND OF THE INVENTION

Wood framed walls typically consist of one two by four or two by six wood shoe plate at the bottom of a wall, and two two by four or two by six wood plates at the top of the wall once the studs are nailed in place. Prior to installation of studs and erection of walls, carpenters typically stack all three two by four or two by six wood wall plates directly on top of each other on the subfloor in a plumb, level, and square position in order to mark each stud and floor joist by hand with a carpenter's square one at time with the carpenter on his/her hands and knees.

SUMMARY OF THE INVENTION

At least one embodiment of the present invention provides a stud marker apparatus or rolling machine that mechanizes the marking of wood studs and floor joists on wood framed walls. One or more embodiments of the present invention enable a carpenter to mark studs and floor joists all at once with a single push of a button and do so from a standing position at a much faster rate than the traditional way of marking studs and ceiling joists by hand one at a time on your hands and knees.

One or more embodiments of the present invention has an adjustable guide that allows a carpenter to mark studs from six inches on center to twenty-four inches on center and every measurement in between. One or more embodiments of the present invention provide a machine which has calibrations for measuring in inches or metric units. A machine or apparatus of one or more embodiments of the present invention machine also has a marking device on the trailing end of the apparatus that allows the carpenter to scribe a line on the top plate for the box beam thickness of the floor system that will be framed on top of the wall (box beam scriber) once the wall is erected.

The box beam scriber traces a parallel line on the upper wood two by four or two by six wood plate as set by a carpenter for the prescribed box beam thickness, which typically may be one and one half inches but which may vary. In at least one embodiment, the box beam scriber is adjustable and can be set to scribe a line for the box beam thickness specified by the architect.

In at least one embodiment of the present invention, an apparatus is provided which includes a first marking device; a first roller wheel; and a structure to which the first marking device and the first roller wheel are attached; and wherein the first roller wheel is configured to roll on the top of a stack of one or more plates, while the structure moves over the top of the stack, and while the first marking device marks a first side of the stack with a marking material. The marking material may, for example, be ink or paint.

The apparatus may be further comprised of a housing; and wherein the housing includes an enclosure containing the marking material; and wherein the housing includes a pump configured to pump the marking material out to the first marking device.

The apparatus may be further comprised of a second marking device; and wherein the second marking device is attached to the structure on a first side of the structure, and the first marking device is attached to the structure on a second side of the structure, which is opposite the first side of the structure; and wherein the first roller wheel is configured to roll on the top of the stack, while the structure moves over the top of the stack, and while the second marking device marks a second side of the stack with a marking material, wherein the second side of the first plate is opposite the first side of the first plate.

In another embodiment, the apparatus may be further comprised of a second marking device attached to the structure; and wherein the first roller wheel is configured to roll on the top of the first plate, while the structure moves over the top of the stack, and while the second marking device marks the top of the stack.

In at least one embodiment, the structure includes first and second members which are configured to be set parallel to one another, with a distance between the first and second members; and the apparatus may be further comprised of means for changing the distance between the first and the second members.

The apparatus may further include a handle device attached to the structure; and wherein the handle device has an activation device for causing the marking material to be supplied to the first marking device.

The apparatus may be further comprised of a first stabilizing device attached to the structure on a first side of the structure; and a second stabilizing device attached to the structure on a second side of the structure which is opposite the first side of the structure; and wherein first stabilizing device, the second stabilizing device, and the structure are configured to be put in a state where the stack is between the first stabilizing device and the second stabilizing device, and the first and second stabilizing device help to keep the structure aligned with the first stack, and simultaneously over the top of the stack.

The first marking device may be configured to rotate with respect to the structure. Each of the first and second stabilizing devices may be configured to rotate with respect to the structure.

In at least one embodiment of the present invention, a method is provided which includes marking a first horizontal plate of a stack of one or more horizontal plates, with a location of a first vertical stud using an apparatus; wherein the apparatus may be configured as previously described.

DETAILED DESCRIPTION OF THE INVENTION

Figure 1:
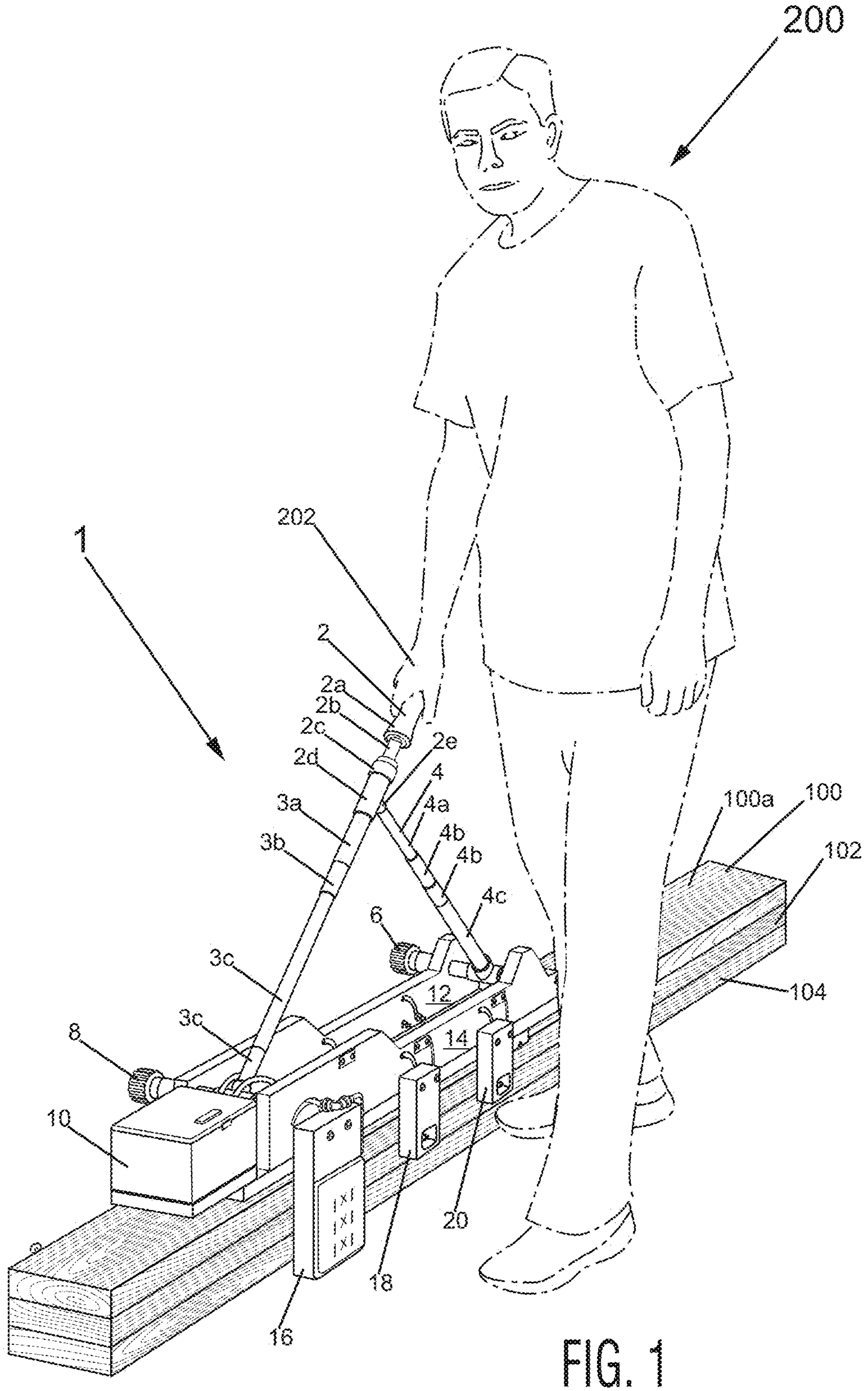
FIG. 1 is a top, front, and left perspective view of a stud marker apparatus in accordance with an embodiment of the present invention, with a first stack of three wood plates, with the stud marker apparatus shown in a first state, and with a person shown holding a handle of the stud marker apparatus with the person's right hand.

FIG. 1 is a top, front, and left perspective view of a stud marker apparatus 1 in accordance with an embodiment of the present invention, with a first stack of three wood plates 100, 102, and 104, with the stud marker apparatus 1 shown in a first state, and with a person 200 shown holding a handle of the stud marker apparatus 100 with the person's right hand 202.

Referring to FIG. 1, the stud marker apparatus 1 includes a handle 2, a handle housing 2*a*, hollow tubes 2*b*, and 2*c*, t-shaped connector 2*d*, hollow tubes 3*a*, 3*b*, 3*c*, and member 4 including hollow tubes 4*a*, 4*b*, and 4*c*.

Figure 2:
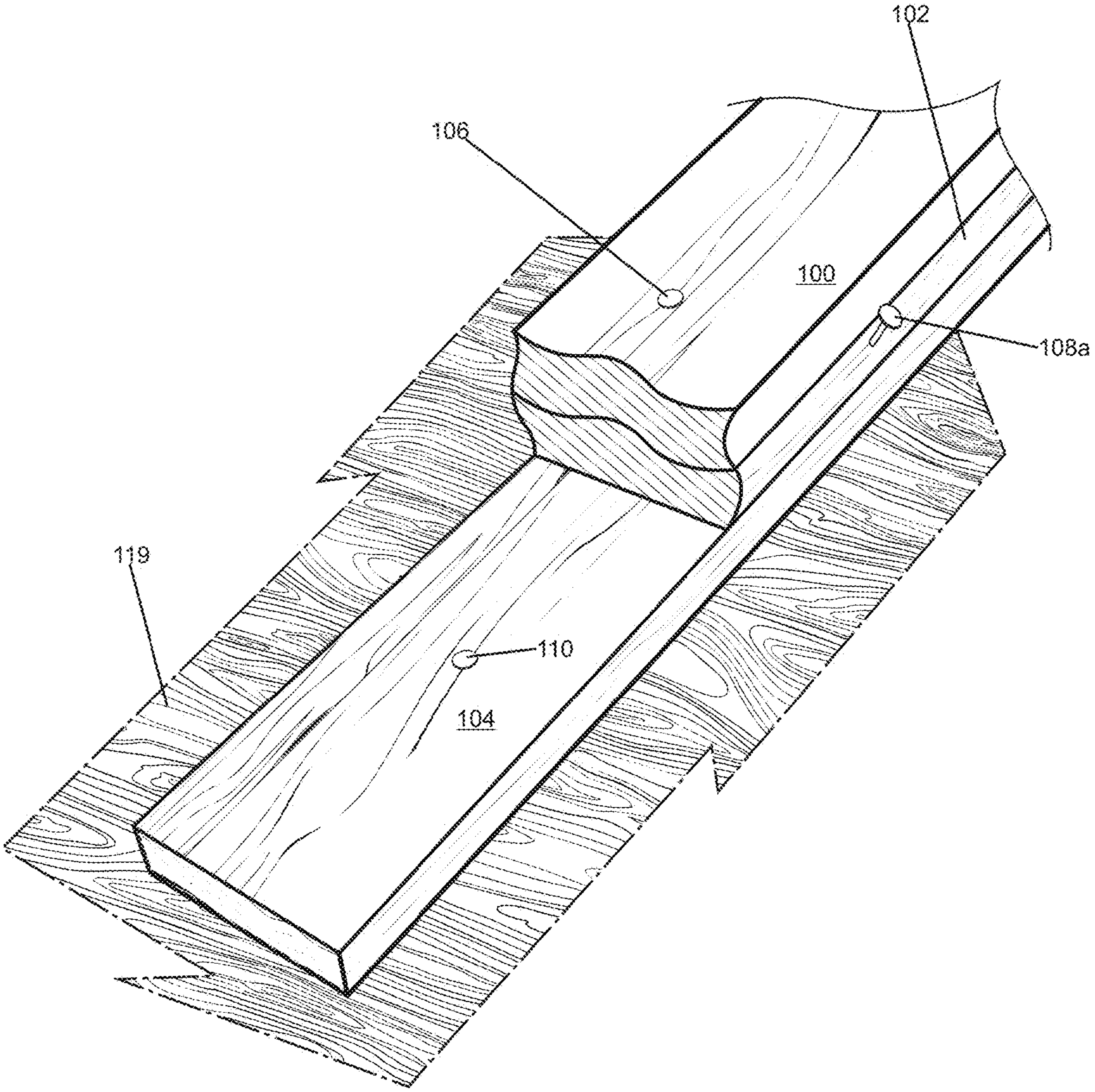
FIG. 2 is a top, front, and right perspective and partial cross section view of the first stack of three wood plates, wherein the first stack of wood plates is shown in FIG. 1.

The stud marker apparatus 1 further includes members 12 and 14 which are parallel to each other. FIG. 1 shows marking arm 16 (which typically has no spiked roller wheels) and stabilizing guide arms 18 and 20, having spiked roller wheels 18*f* and 20*f*, respectively, shown in FIG. 5;

FIG. 2 is a top, front, and right perspective and partial cross section view of the first stack of three wood plates 102, 104, and 106, wherein the first stack of wood plates is shown in FIG. 1. The wood beam 104 is fixed to a plywood subfloor 119 by a fastener or nail 110. The wood beam 100 is fixed to the wood beam 102 by the fastener or nail 106. The wood beam 102 is fixed to the wood beam 104 by the fastener or nail 108*a*.

Figure 3:
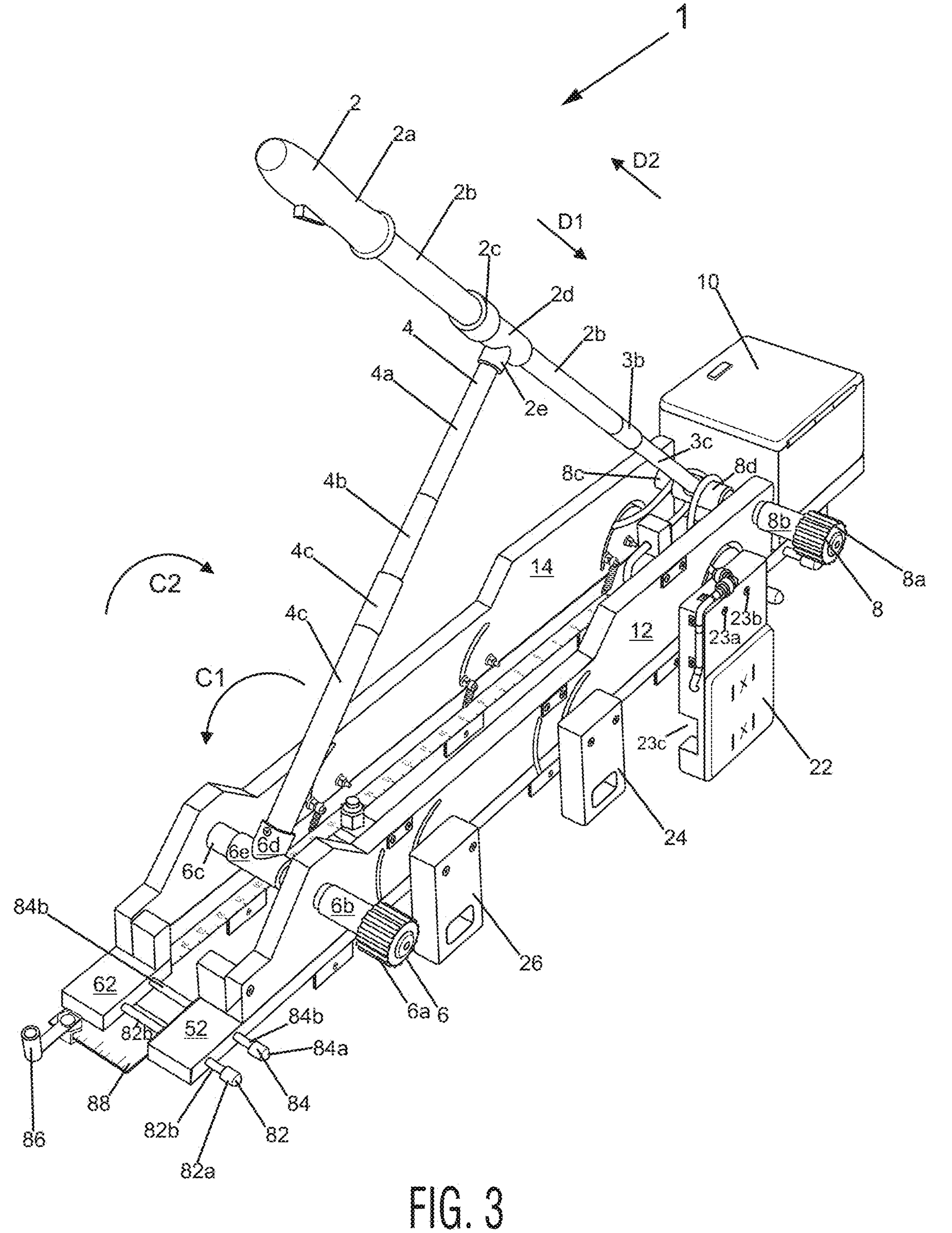
FIG. 3 is a top, rear, and right perspective view of the stud marker apparatus of FIG. 1, in the first state.

FIG. 3 is a top, rear, and right perspective view of the stud marker apparatus 1 of FIG. 1, in the first state. FIG. 3 shows marking arm 22, and stabilizing guide arms 24 and 26, which have spiked roller wheels 24*f* and 26*f*, respectively, shown in FIG. 8.

The stud marker apparatus 1 also includes handle 6 which includes outer handle 6*a*, tube 6*b*, tube 6*c*, and a T-shaped connector comprised of tube 6*d* integrated with tube 6*e*. Tube or outer handle 6*a* is a twist lock tube that expands and contracts to allow the machine to straddle and mark two inches by four inches or two inches by six inches walls. Tube 4*c* is shown connected to tube 6*d*. The tubes 4*c*, 4*b*, and 4*c* are configured to pivot with respect to pivot pin, tube or member 6*c*, in the counterclockwise (C1) and clockwise (C1) directions as the member 2*d* slides up and down member 2*b* in the directions D2 and D1, respectively as shown in FIG. 3.

The stud marker apparatus 1 also includes handle 8, which includes outer handle 8*a*, tube 8*b*, tube 8*c*, tube 8*d*. Tube 8*a* is a twist lock tube that expands and contracts the same as tube 6*a* to allow the machine to mark two inches by four inches or two inches by six inches walls. The member 3*c* is connected to tube 8*d*. The tube 3*c* is configured to pivot with respect to pivot pin, tube or member 8*c*, in the counterclockwise (C1) and clockwise (C2) directions as the member 2*d* slides down and up member 2*b* in the directions D1 and D2, respectively.

The stud marker apparatus 1 also includes members 52 (left side frame), and 62 (right side frame) and axles 82, and 84. The axles 82 and 84 allow the stud marker apparatus 1 to expand (i.e. for member 12 and 14 to move farther apart from each other, while typically remaining parallel to each other) and contract (i.e. for member 12 and 14 to move closer together while typically remaining parallel to each other) for two by four or two by six walls.

The stud marker apparatus 1 also includes ruler 88. Member 84 includes portion 84*a* and rod 84*b*. The member 82 includes portion 82*a* and rod 82*b*. The rods 82*b* and 84*b* connect the members 52 and 62 together so that members 52 and 62 can slide with respect to each other and members 12 and 14 can be brought closer together or farther apart, typically depending on whether we are dealing with two inches by four inches or two inches by six inches walls.

Figure 4:
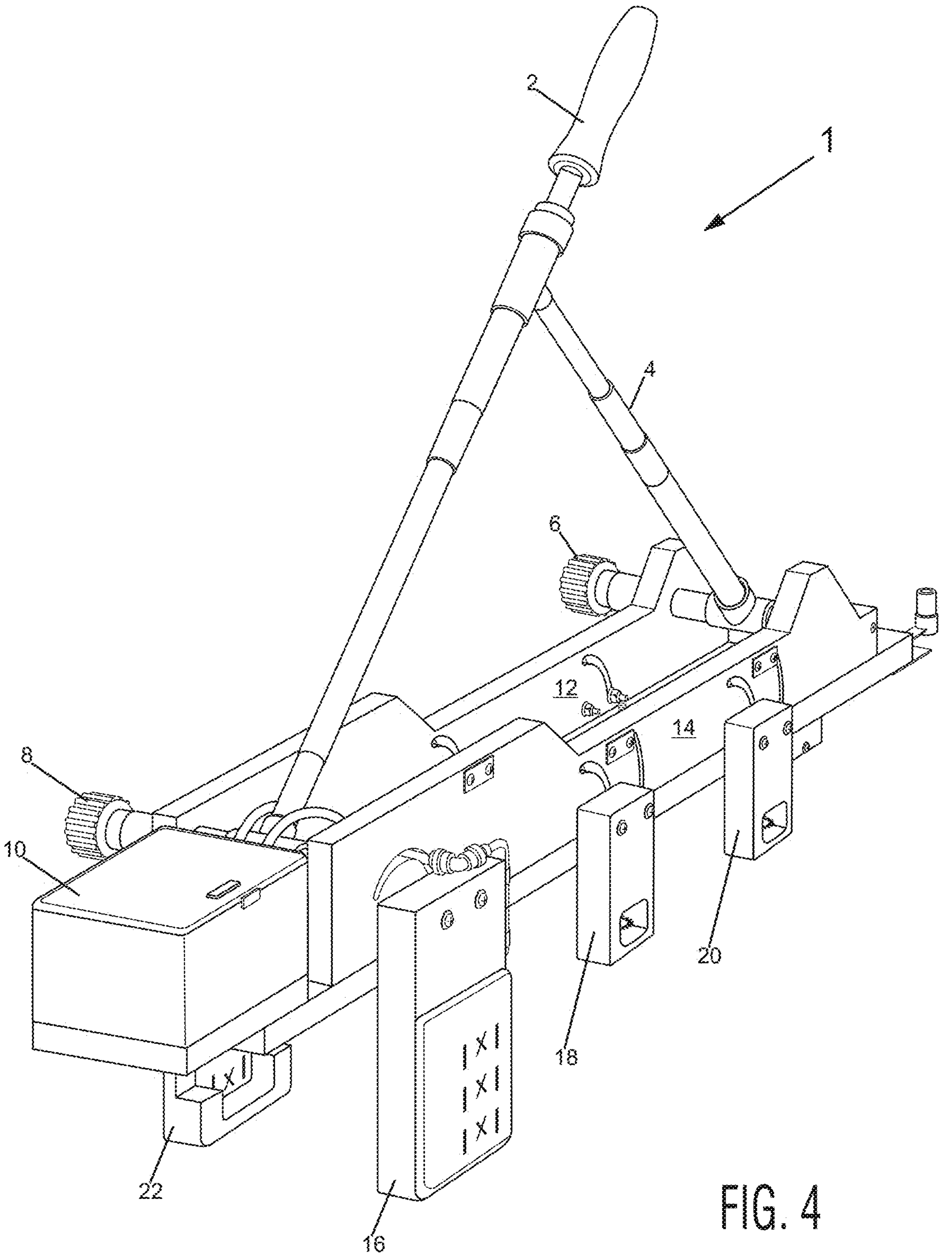
FIG. 4 is a top, front, and left perspective view of the stud marker apparatus of FIG. 1, in the first state.

FIG. 4 is a top, front, and left perspective view of the stud marker apparatus 1 of FIG. 1, in the first state.

Figure 5:
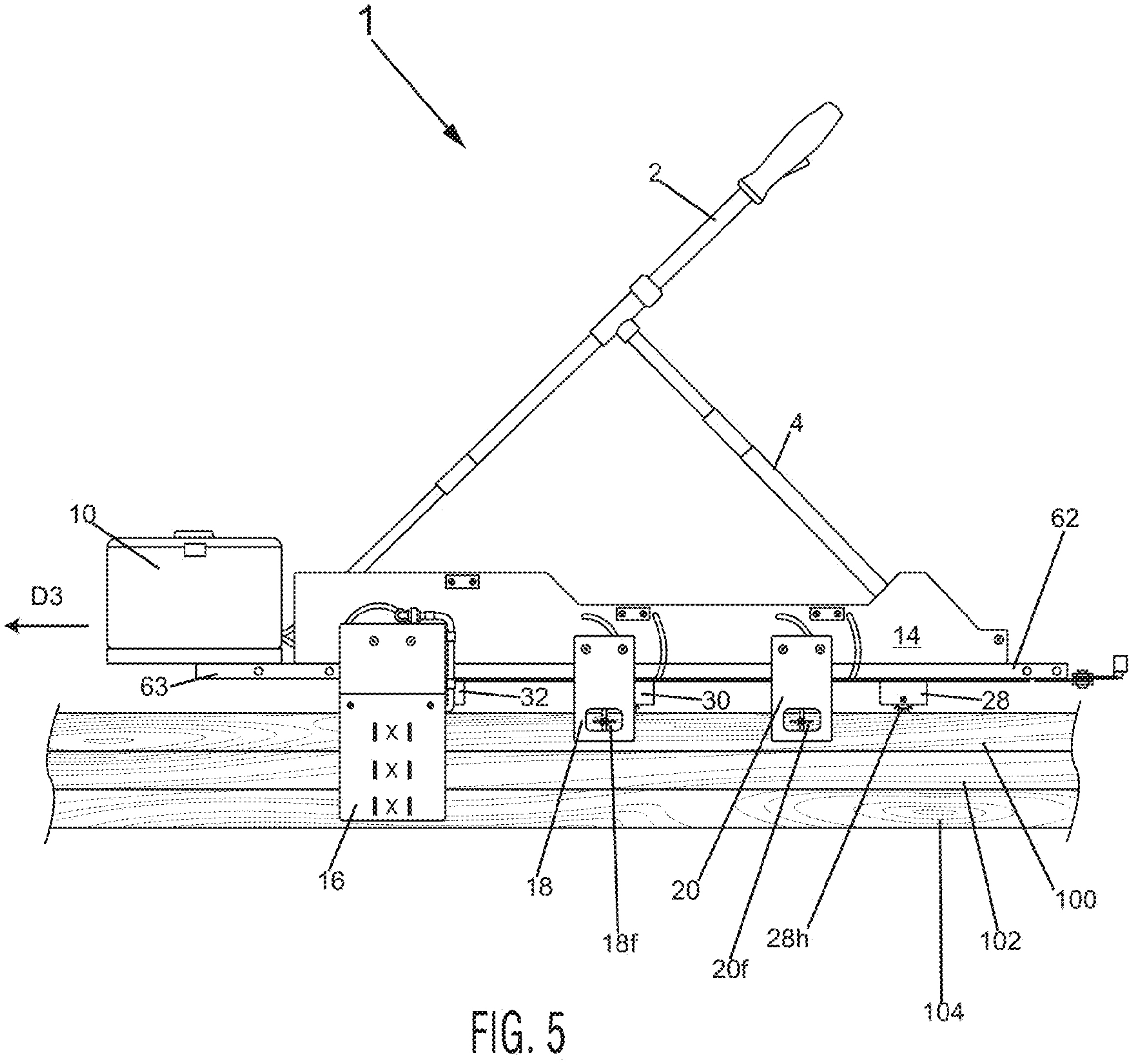
FIG. 5 is a left side view of the stud marker apparatus of FIG. 1 in the first state, along with the first stack of three wood plates.

FIG. 5 is a left side view of the stud marker apparatus 1 of FIG. 1 in the first state, along with the first stack of three wood plates, including wood plates 100, 102, and 104. FIG. 5 shows marking arm 16, and stabilizing guide arms 18, and 20 (with spiked roller wheels 18*f* and 20*f*, respectively) in an upright state, perpendicular and/or substantially perpendicular to wood beams 100, 102, and 104, and to members 63 and 62. The stud marker apparatus 1 is configured to be rolled in the direction D3 shown in FIG. 5

Figure 6:
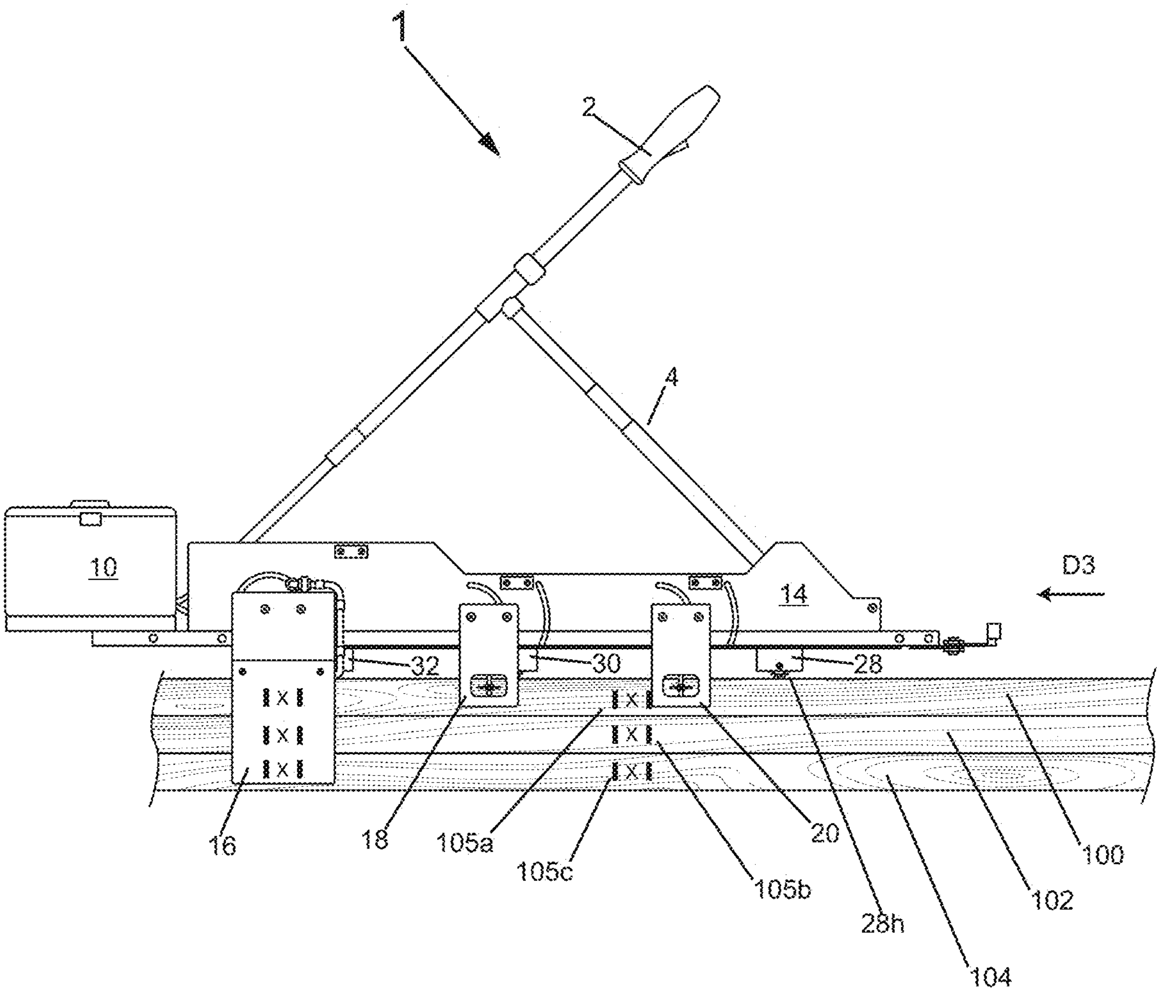
FIG. 6 is a left side view of the stud marker apparatus of FIG. 1 in the first state, along with the first stack of three wood plates, wherein the stud marker apparatus has been shifted to the left with respect to the first stack of three wood plates, compared to FIG. 5.
Figure 35:
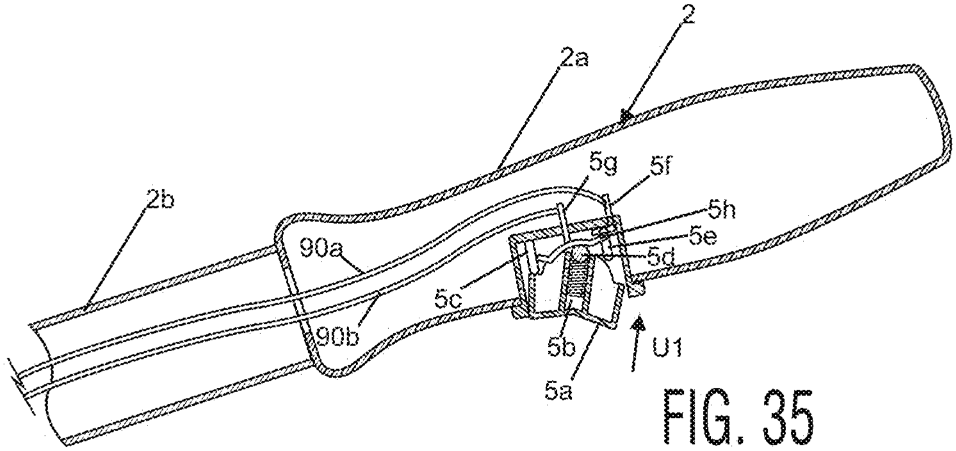
FIG. 35 is a closeup cross sectional view of the trigger in the handle and various switching components of the stud marker apparatus.

FIG. 6 is a left side view of the stud marker apparatus 1 of FIG. 1 in the first state, along with the first stack of three wood plates (100, 102, and 104), wherein the stud marker apparatus 1 has been shifted to the left, in the direction D3, with respect to the first stack of three wood plates 100, 102, and 104, compared to FIG. 5. In addition, the marking arm 16 has caused markings 105*a*, 105*b*, and 105*c* to be applied to the side of wood beams or plates 100, 102, and 104, respectively. Each of the markings 105*a*, 105*b*, and 105*c* is typically in paint/ink and is in the form "|X|" to indicate the exact stud location (where studs should be placed once the wall is assembled). Each of the markings 105*a*, 105*b*, and 105*c*, is provided by marking arm 16 when the operator engages the trigger, such as including portion 5*a*, in the direction U1, on the handle 2, as shown in FIG. 35.

Figure 23:
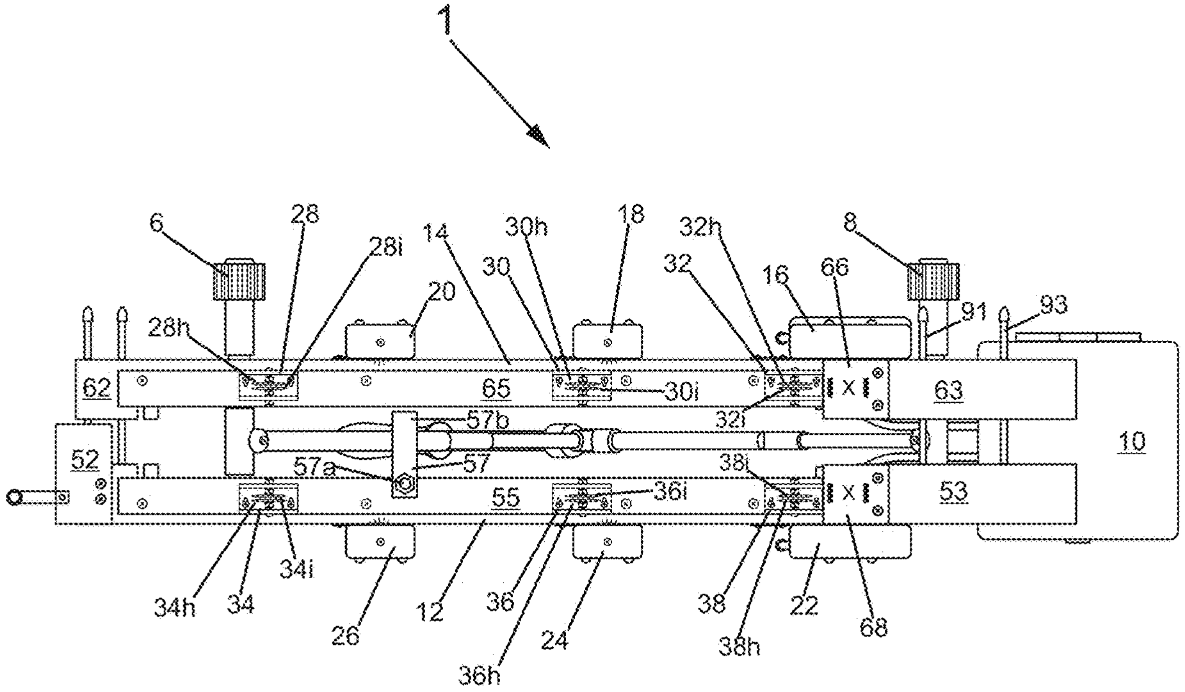
FIG. 23 is a bottom view of the stud marker apparatus of FIG. 1, with the stud marker apparatus in the first state.

As the stud marker apparatus 1 slides from the position of FIG. 5 to the position of FIG. 6, the spiked roller wheels 28*h*, 28*i*, 30*h*, 30*i*, 32*h*, 32*i*, 34*h*, 34*i*, 36*h*, 36*i*, 38*h*, and 38*i*, shown in FIG. 23, engage with and roll on and over the top surface 100*a* (shown in FIG. 1) of the plate or beam 100. Each of the spiked roller wheels 28*h*, 28*i*, 30*h*, 30*i*, 32*h*, 32*i*, 34*h*, 34*i*, 36*h*, 36*i*, 38*h*, and 38*i* has a plurality of teeth which are used to engage with the top surface 100*a* (shown in FIG. 1) of the wood plate 100 to allow the stud marker to roller over the top surface 100*a* during the marking process. The roller wheels are spiked to both grip the plate 100 without slippage and also to prevent smearing and disturbing of the wet paint/ink markings. Spiked wheels roll through the wet paint/ink markings without disturbing paint/ink. In addition, spiked roller wheels 18*f* and 20*f* (shown in FIG. 5) grip one side of the plate 100, while spiked roller wheels 24*f* and 26*f* (shown in FIG. 8) grip the opposing side of the plate 100, without slippage and also to prevent smearing and disturbing of the wet paint/ink markings. Spiked wheels roll through the wet paint/ink markings without disturbing paint/ink.

Figure 7:
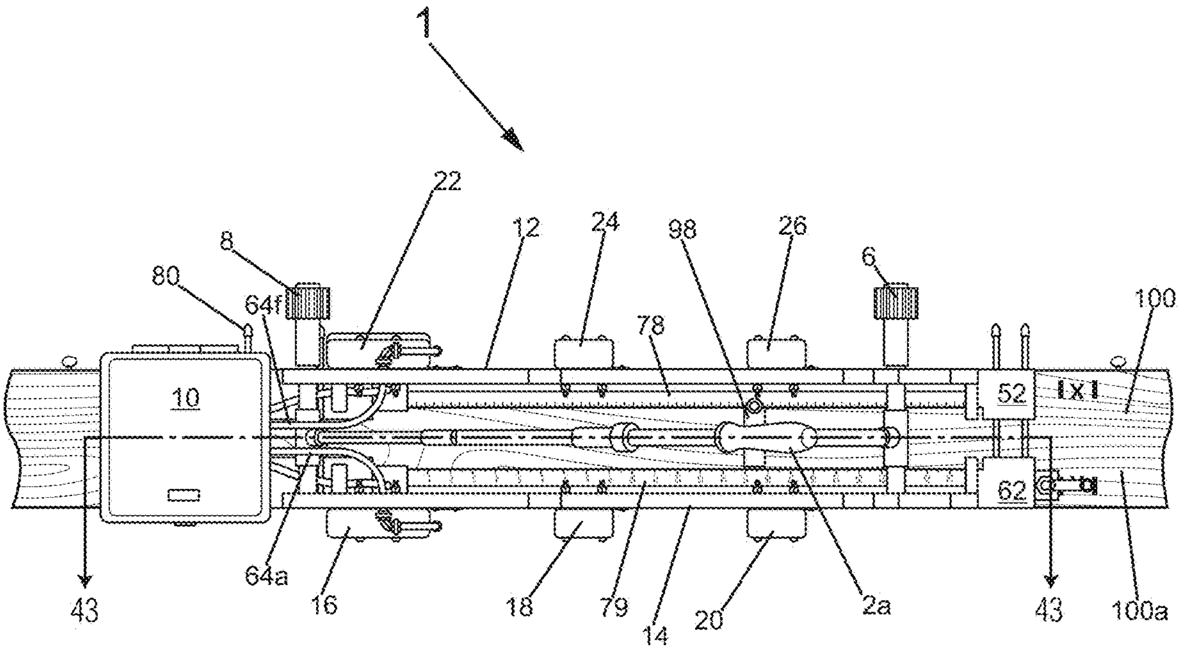
FIG. 7 is a top view of the stud marker apparatus of FIG. 1 in the first state, along with the first stack of three wood plates.

FIG. 7 is a top view of the stud marker apparatus 1 of FIG. 1 in the first state, along with the first stack of three wood plates 100, 102, and 104, with only wood plate 100 showing in FIG. 7. FIG. 7 shows tubes 64*a* and 64*f*, having first ends connected to device 10, and second ends connected to devices 16 and 22, respectively. The tubes 64*a* and 64*f* allow paint/ink to be provided from device 10 to the devices 16 and 22 for marking of one or more of wood plates 100, 102, or 104 or other wood plates. There are also tubes 64*b*, 64*c*, 64*d*, and 64*e*, shown in FIG. 29, which lead from the device 10 to the devices 16, 22, 66, and 68 respectively, for providing or delivering paint/ink from the device 10 to the device 16, 22, 66, and 68 for marking one or more of wood plates 100, 102, or 104 or other wood plates.

Figure 8:
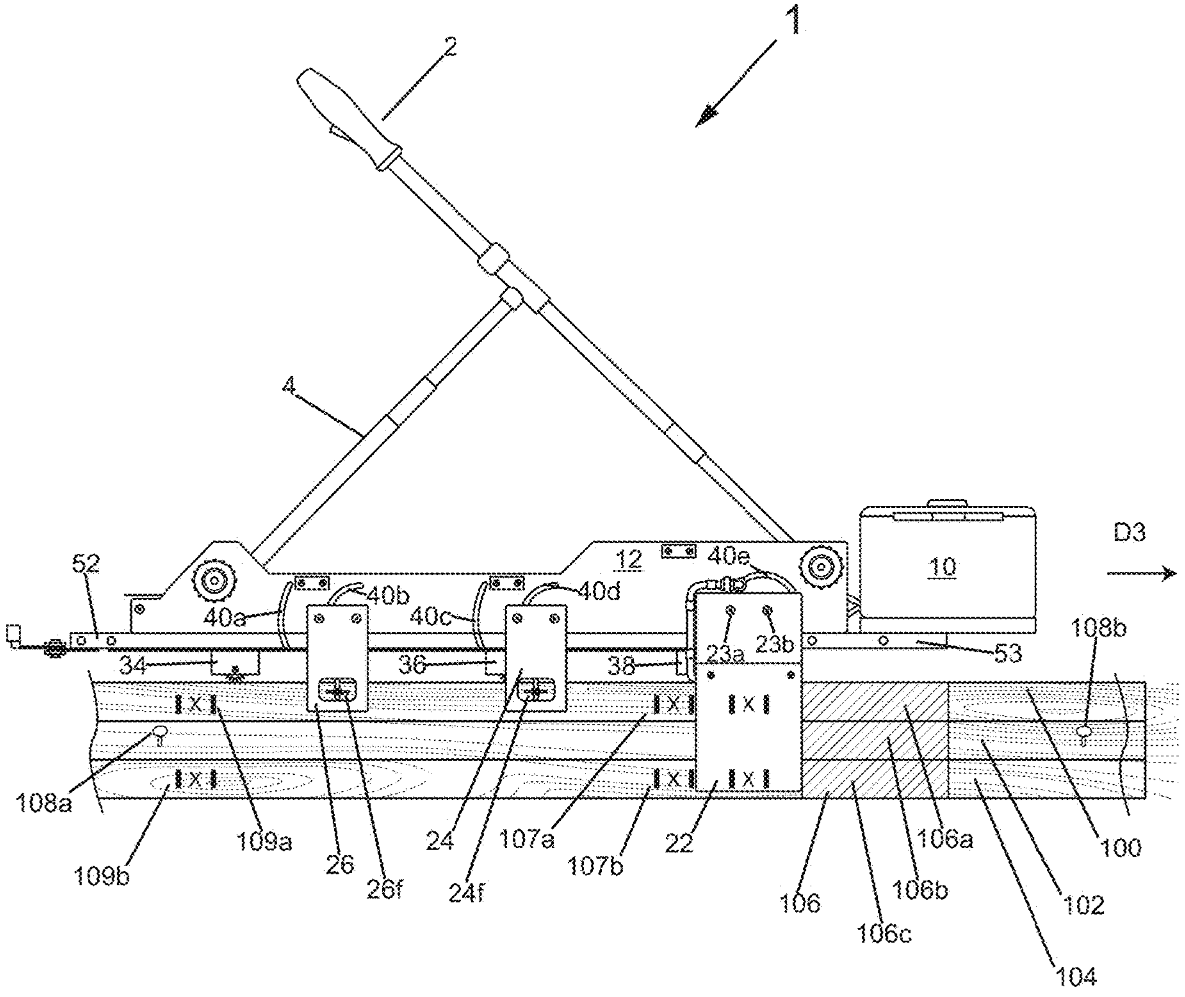
FIG. 8 is a right side view of the stud marker apparatus of FIG. 1 in the first state, along with the first stack of three wood plates, and with the stud marker apparatus at a first position with respect to a first region of the first stack of three wood plates, wherein a second stack of three wood plates, which is perpendicular to the first stack of three wood plates is located at the first region.

FIG. 8 is a right side view of the stud marker apparatus 1 of FIG. 1 in the first state, along with the first stack of three wood plates 100, 102, and 104, and with the stud marker apparatus 1 at a first position with respect to a first region 106 of a second stack of three wood plates (106*a*, 106*b*, and 106*c*), wherein the second stack of three wood beams, including plates 106*a*, 106*b*, and 106*c*, is perpendicular to the first stack of three wood plates and is located at the first region 106. The second stack of three wood beams 106*a-c* may be a perpendicular wall. FIG. 8 shows nail or fasteners 108*a* and 108*b* which fix the beam 102 to the beam 104. FIG. 8 shows the markings 109*a*, 109*b*, 107*a*, and 107*b*. Each of the markings 109*a*, 109*b*, 107*a*, and 107*b* is of the form "|X|". The markings 109*a*, 109*b*, 107*a*, and 107*b* are applied by device or marking arm 22 and similar or identical markings are done by device or marking arm 16 on the opposite side of the stack of wood beams or plates 100, 102, and 104.

FIG. 8 also shows slots 40*a*, 40*b*, 40*c*, 40*d*, and 40*e* in the member 12. The slots 40*b*, 40*d*, and 40*e* allow for rotation of the devices 26, 24, and 22, with respect to the member 12, and with respect to the plates 100, 102, and 104.

Figure 9:
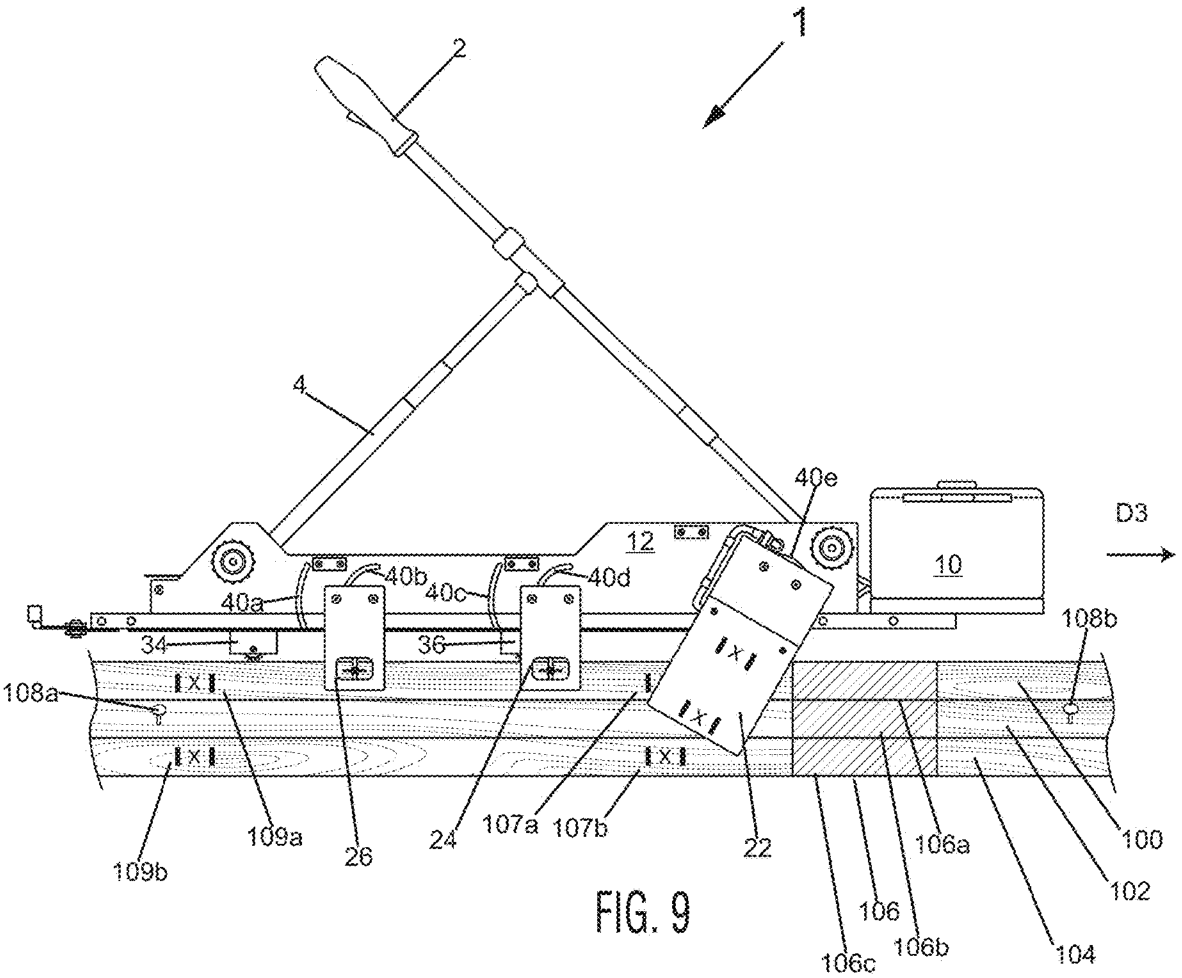
FIG. 9 is a right side view of the stud marker apparatus of FIG. 1 in a second state, along with the first stack of three wood plates, and with the stud marker apparatus at a second position with respect to the first region of the second stack of three wood plates.

FIG. 9 is a right side view of the stud marker apparatus 1 of FIG. 1 in a second state, along with the first stack of three wood plates (100, 102, and 104), and with the stud marker apparatus 1 at a second position with respect to the first region 106 of the second stack of three wood plates (106*a*, 106*b*, and 106*c*) In the second state shown in FIG. 9, the device or marking arm 22 is shown rotated so that is no longer perpendicular to the stack of wood plates 100, 102, and 104. This occurs as the stud marker apparatus 1 is moved in the direction D3 from the position of FIG. 8 to the position of FIG. 9, by the device or marking arm 22 colliding with the second stack of plates 106*a-c* (see FIG. 15) located at region 106. Once the stud marker apparatus 1 encounters a perpendicular wall plate (such as 106*a* as in FIG. 9) A "kill switch" 74 shown in FIG. 33 will turn off the device marking arm (such as device 22 in this example) that encountered the perpendicular wall (plate or beam, such as 106*a* in this example) and disable the print function (i.e. paint/ink will no longer be supplied to device 22 from device 10) to avoid errant paint/ink marking until the affected marking arm, such as device 22 in this example, returns to a vertical position at which time the print head will be turned back (i.e. paint/ink will again be supplied to device 22) on as noted in FIG. 13.

Figure 10:
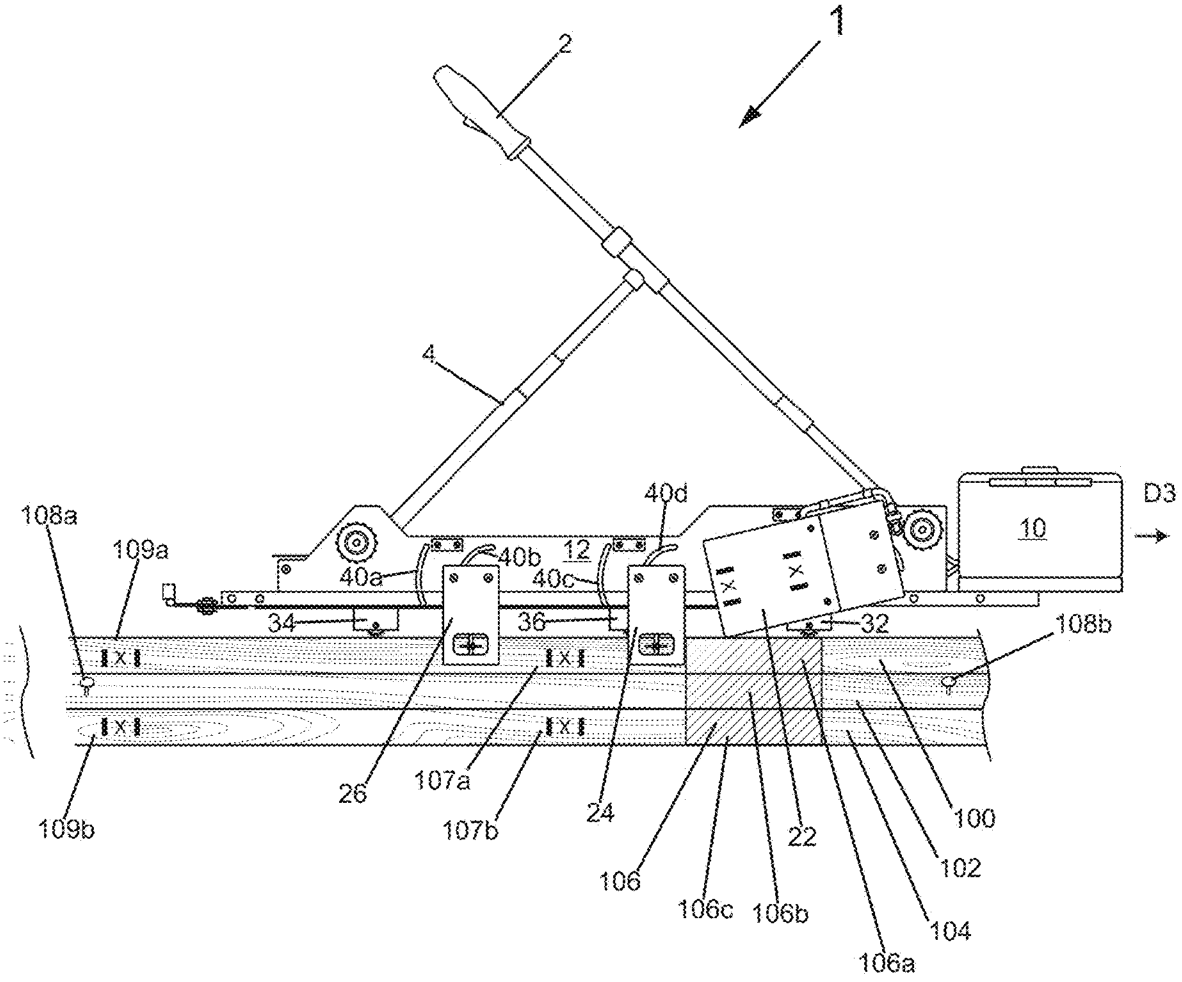
FIG. 10 is a right side view of the stud marker apparatus of FIG. 1 in a third state, along with the first stack of three wood plates, and with the stud marker apparatus at a third position with respect to the first region of the second stack of three wood plates.

FIG. 10 is a right side view of the stud marker apparatus 1 of FIG. 1 in a third state, along with the first stack of three wood plates (100, 102, and 104), and with the stud marker apparatus 1 at a third position with respect to the first region 106 of the second stack of three wood plates (106*a*, 106*b*, and 106*c*). In FIG. 10, the device 22 is rotated further from the position of FIG. 9, continuing to collide with the beams 106*a-c* and due to the movement in the direction D3 from the position of FIG. 9

Figure 11:
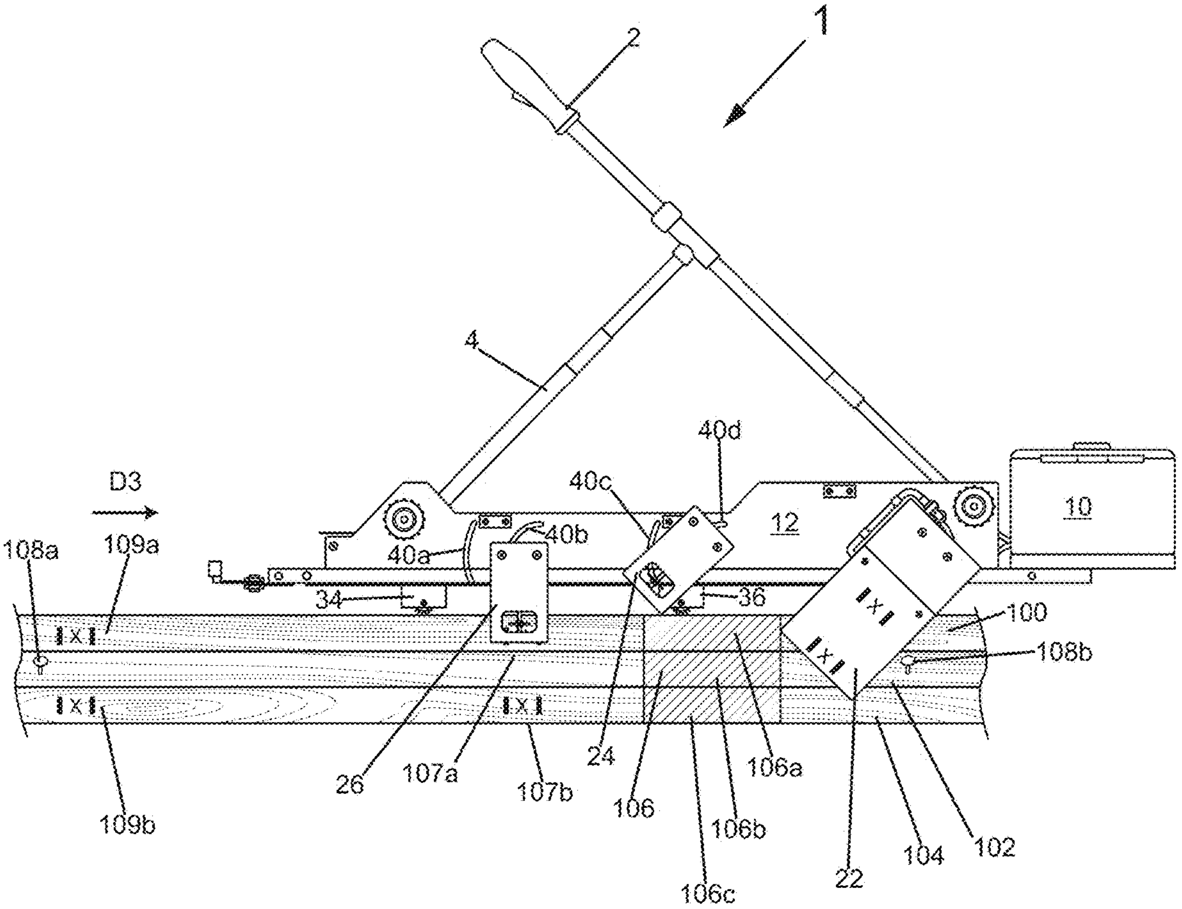
FIG. 11 is a right side view of the stud marker apparatus of FIG. 1 in a fourth state, along with the first stack of three wood plates, and with the stud marker apparatus at a fourth position with respect to the first region of the second stack of three wood plates.

FIG. 11 is a right side view of the stud marker apparatus 1 of FIG. 1 in a fourth state, along with the first stack of three wood plates (100, 102, and 104), and with the stud marker apparatus 1 at a fourth position with respect to the first region 106 of the second stack of three wood plates (106*a*, 106*b*, and 106*c*). In FIG. 11, the device 22 begins to rotate back as device 22 moves past the wood beams 106*a-c* as the stud marker apparatus 1 moves in the direction D3 from the position of FIG. 10. In addition, in FIG. 11, the device 24 has rotated due to collision with the beam 106*a* of the beams 106*a-c*, from the position of FIG. 10, and due to movement of the stud marker apparatus 1 in the direction D3. Marking arm 22 is turned off (i.e. paint/ink no longer supplied to device 22 by device 10) by the "kill switch" 74 or similar or identical kill switch, shown in FIG. 33, while the print head and/or device 22 is not vertical.

Figure 12:
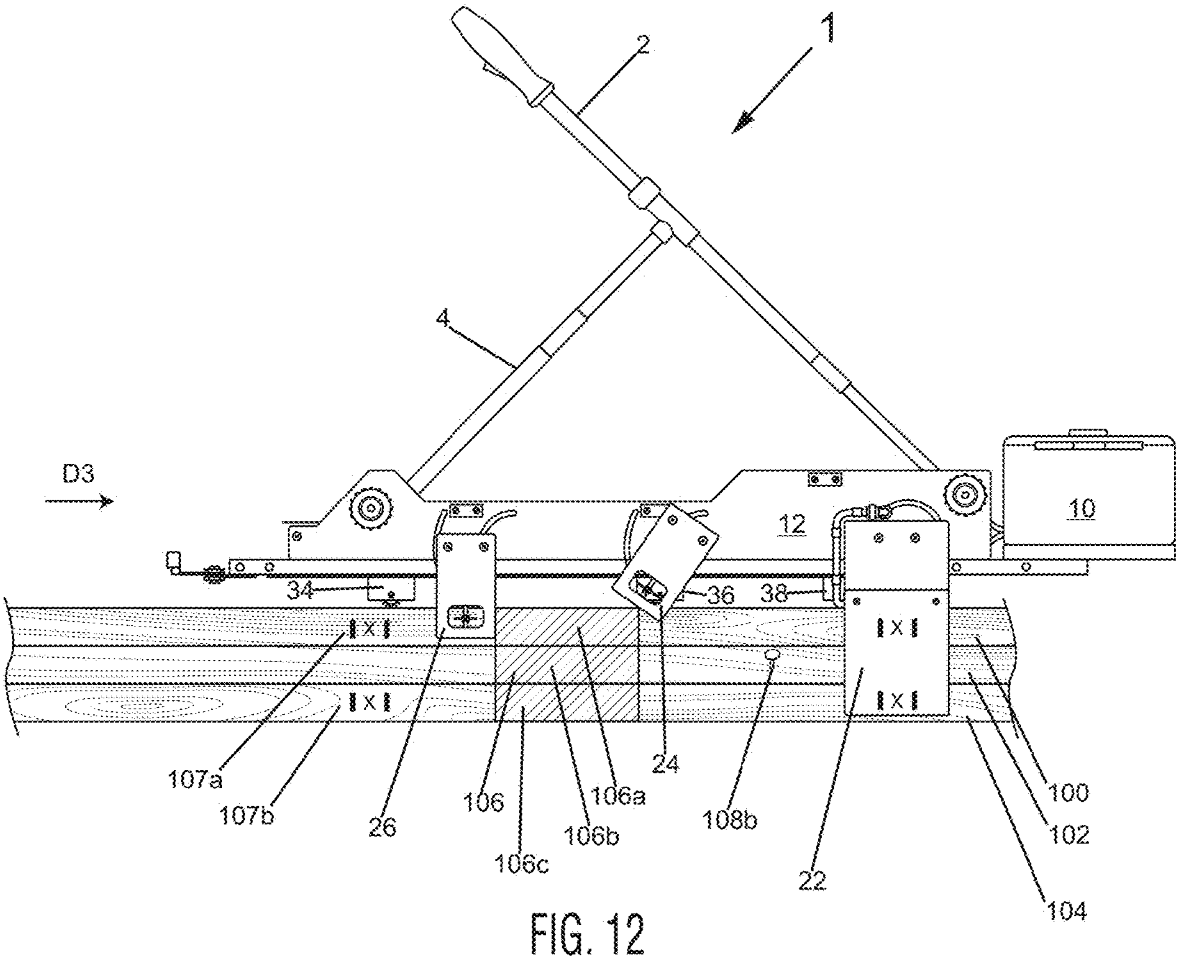
FIG. 12 is a right side view of the stud marker apparatus of FIG. 1 in a fifth state, along with the first stack of three wood plates, and with the stud marker apparatus at a fifth position with respect to a first region of the second stack of three wood plates.

FIG. 12 is a right side view of the stud marker apparatus 1 of FIG. 1 in a fifth state, along with the first stack of three wood plates (100, 102, 104, and 106), and with the stud marker apparatus 1 at a fifth position with respect to a first region 106 of the second stack of three wood plates (100, 106*a*, 106*b*, and 106*c*). In FIG. 12, the device 22 has rotated back into a perpendicular orientation with respect to the beams 100, 102, and 104, now that device 22 has passed the beams 106*a-c*, and due to the movement in the direction D3 by the stud marker apparatus 1 from the position of FIG. 11. In addition, the device 24 is beginning to rotate back as the device 24 passes the stack of wood beams 106*a-c*, and as the stud marker apparatus 1 moves in the direction D3 from the position of FIG. 11. Once the marking arm devices 22 and 16 return to vertical, the print function will re-activate (i.e. paint/ink will be supplied from device 10 to devices 22 and 16) and devices 16 and 22 will be able to mark when the trigger, including portion 5*a* on the handle is engaged by pushing in the direction U1, shown in FIG. 35.

Figure 13:
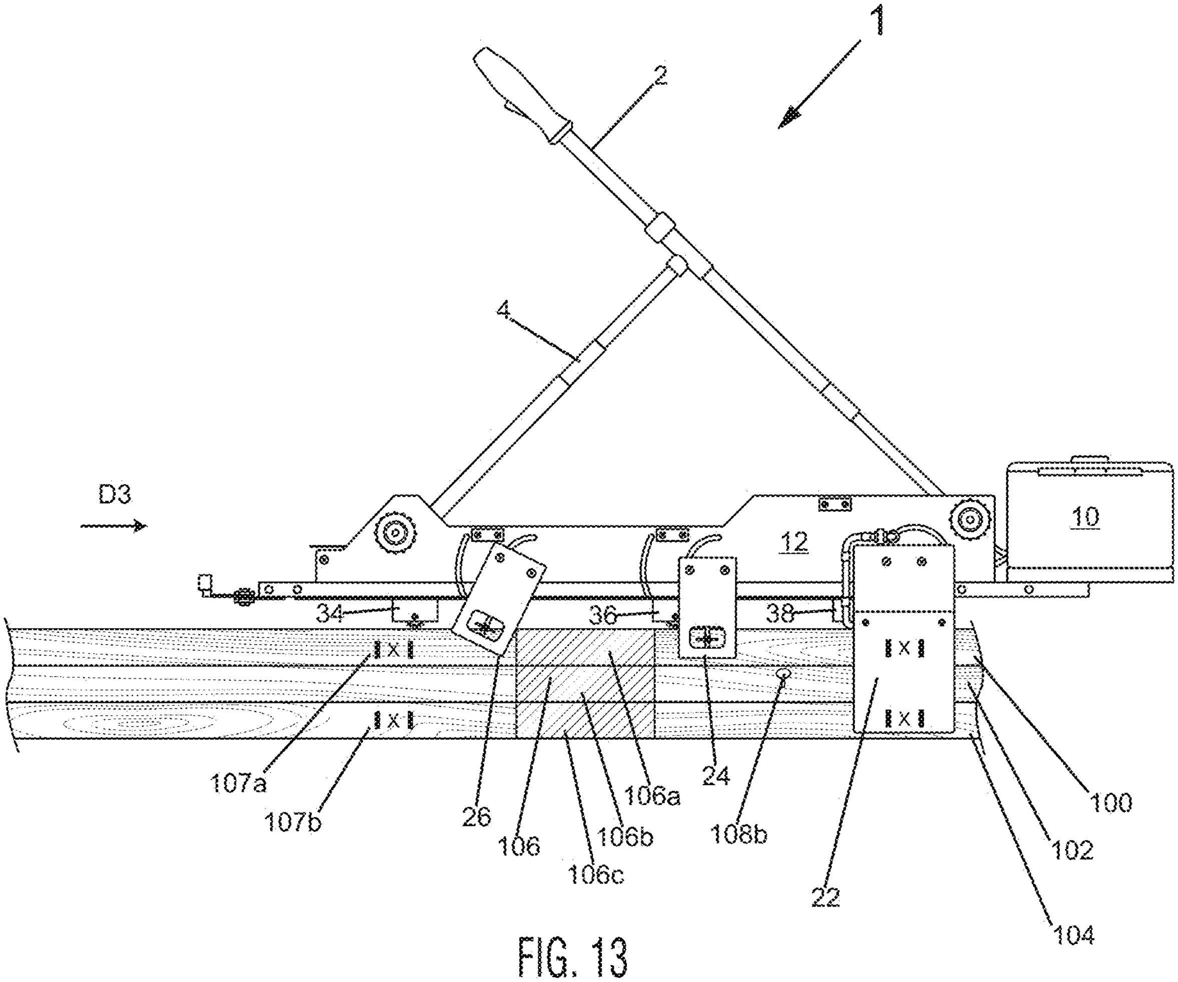
FIG. 13 is a right side view of the stud marker apparatus of FIG. 1 in a sixth state, along with the first stack of three wood plates, and with the stud marker apparatus at a sixth position with respect to a first region of the second stack of three wood plates.

FIG. 13 is a right side view of the stud marker apparatus 1 of FIG. 1 in a sixth state, along with the first stack of three wood plates (100, 102, 104, and 106), and with the stud marker apparatus 1 at a sixth position with respect to a first region 106 of the second stack of three wood plates (106*a*, 106*b*, and 106*c*). In FIG. 13, the device 24 has rotated back into a perpendicular orientation with respect to the plates 100, 102, and 104, now that device 24 has passed the plates 106*a-c*, and due to the movement in the direction D3 by the stud marker apparatus 1 from the position of FIG. 12. In addition, the device 26 has started to rotate, with respect to the plates 100, 102, and 104, as the device 26 collides with wood plate 106*a* of the stack 106*a-c*, and as the stud marker apparatus 1 moves in the direction D3 from the position of FIG. 12.

Figure 14:
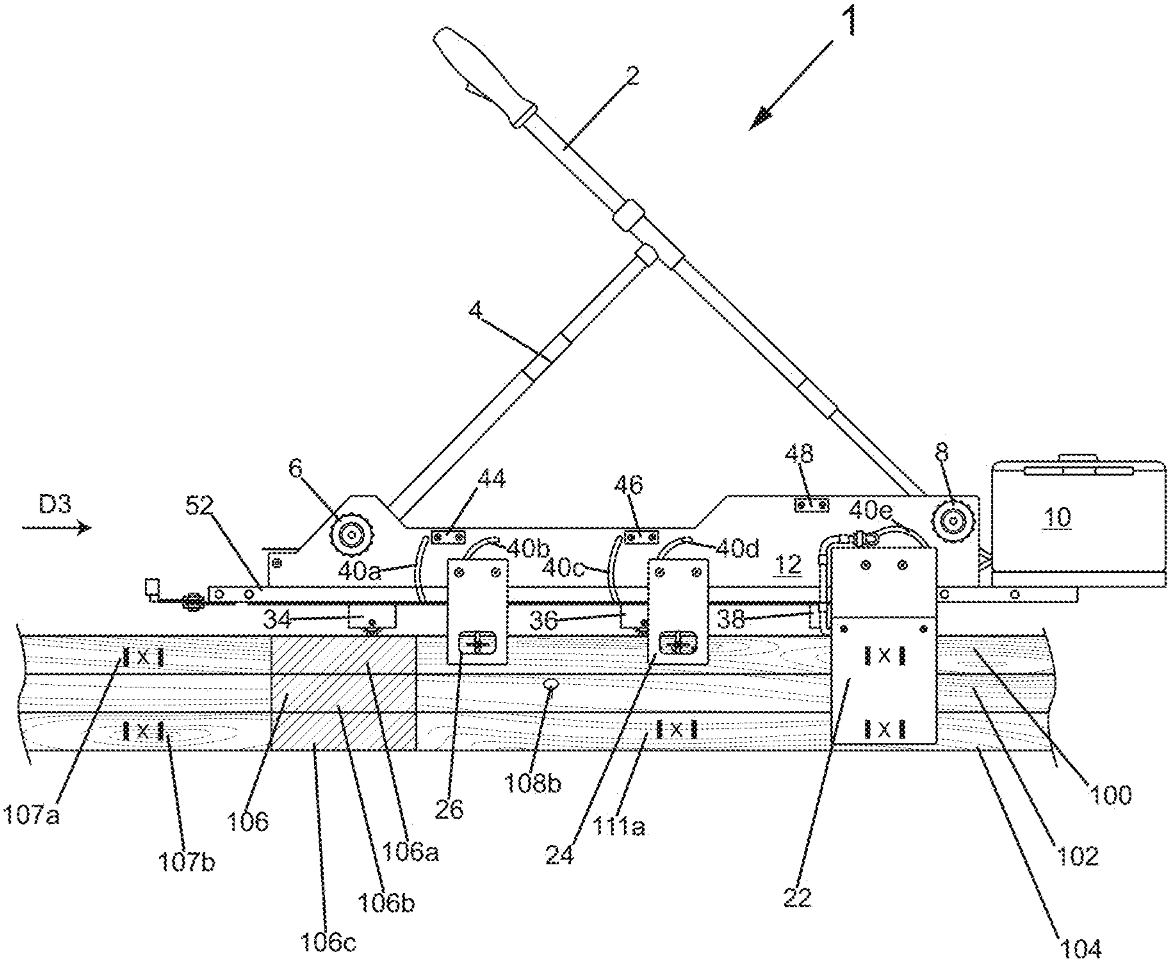
FIG. 14 is a right side view of the stud marker apparatus of FIG. 1 in the first state, along with the first stack of three wood plates, with the stud marker apparatus at a seventh position with respect to a first region of the second stack of three wood plates.

FIG. 14 is a right side view of the stud marker apparatus 1 of FIG. 1 in the first state, along with the first stack of three wood plates (100, 102, 104, and 106), with the stud marker apparatus 1 at a seventh position with respect to a first region 106 of the second stack of three wood plates (106*a*, 106*b*, and 106*c*). In FIG. 14, the device 26 has rotated back into a perpendicular orientation with respect to the plates 100, 102, and 104, now that device 26 has passed the beams 106*a-c*, and due to the movement in the direction D3 by the stud marker apparatus 1 from the position of FIG. 13. FIG. 14 also shows marking 111*a*, which is caused by marking arm or device 22, and a similar or identical marking is caused to be placed on the opposite side of plate or beam 104 at typically the same horizontal position on the plate or beam 104.

Figure 15:
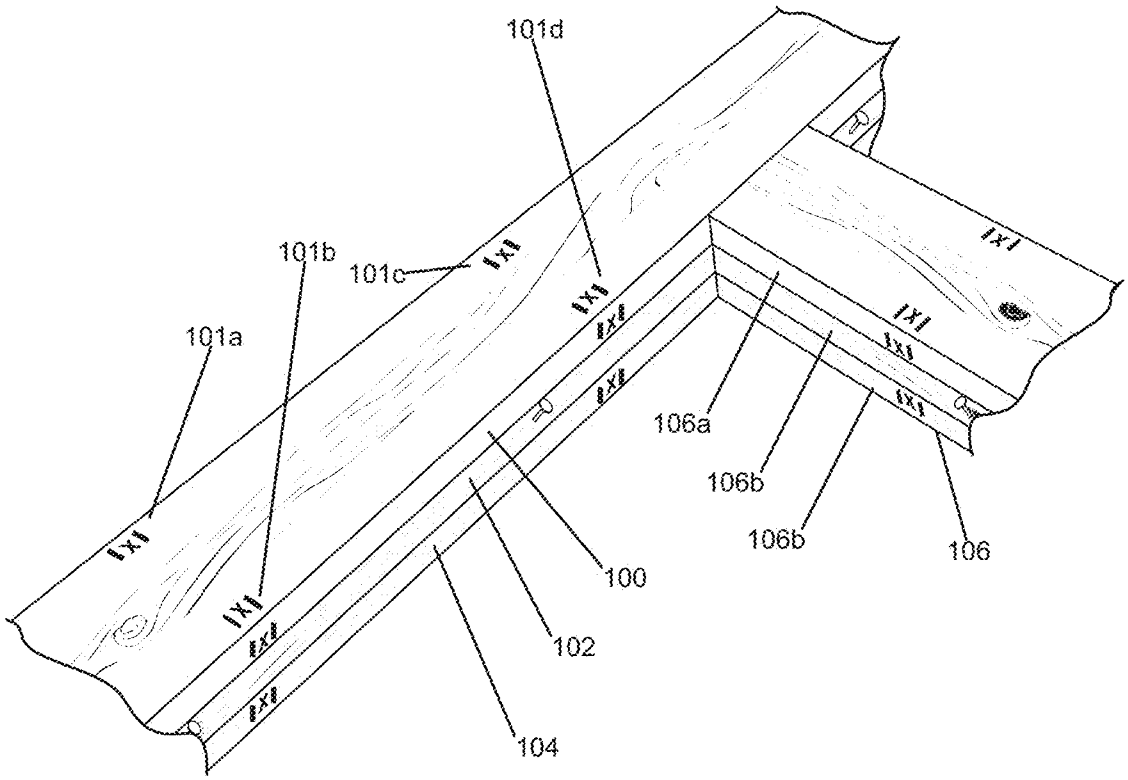
FIG. 15 is a top, front, and right side partial perspective view of the first stack of three wood plates, and the first region where the second stack of three wood plates, which are perpendicular to the first stack of three wood plates, are located.

FIG. 15 is a top, front, and right side partial perspective view of the first stack of three wood plates (100, 102, and 104), and the first region 106 where the second stack of three wood plates (106*a*, 106*b*, and 106*c*), which are perpendicular to the first stack of three wood plates (100, 102, and 104), are located.

Figure 16:
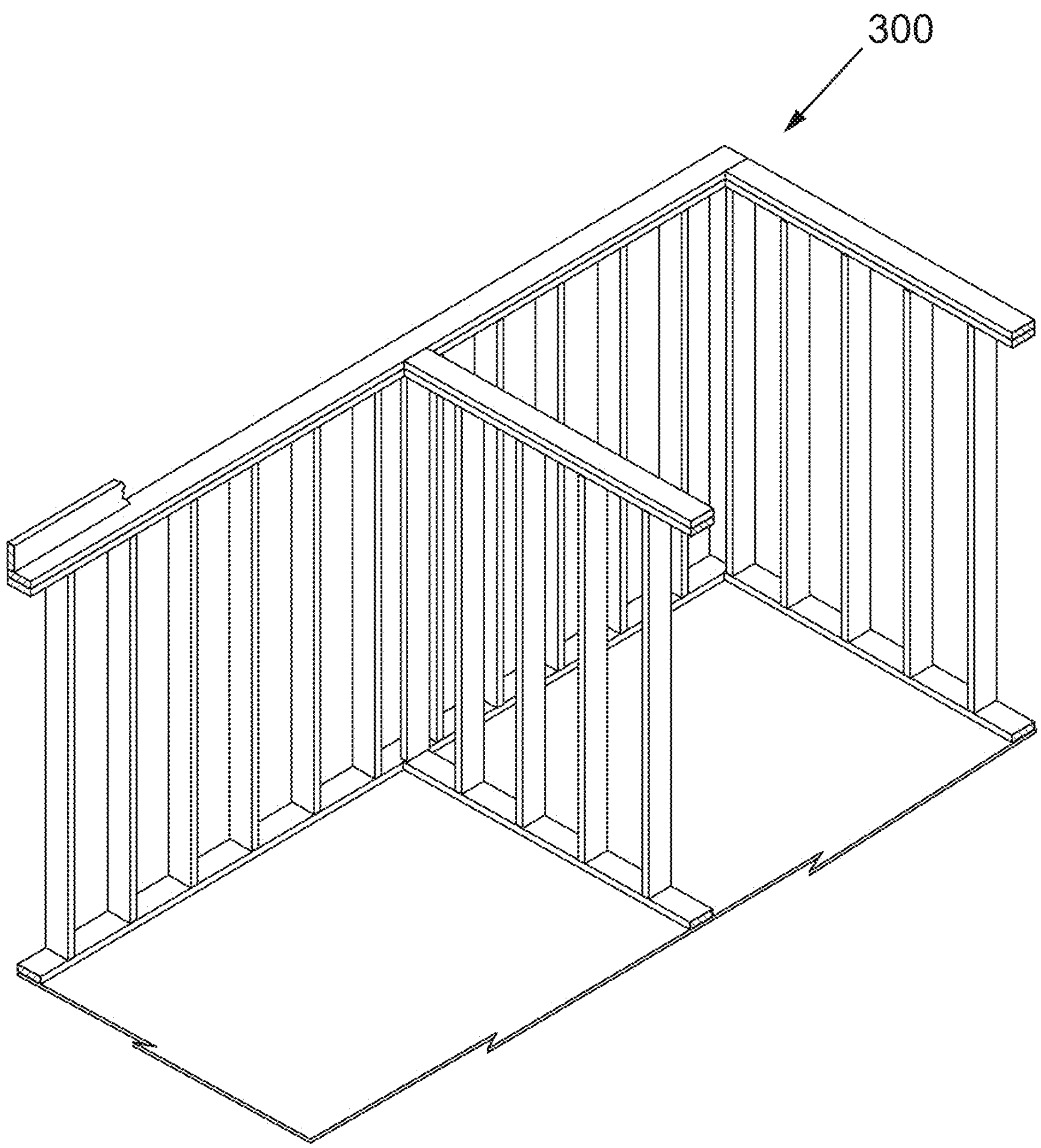
FIG. 16 is a top, front, and right side perspective view of a framed wall.

FIG. 16 is a top, front, and right side perspective view of a framed wall 300.

Figure 17:
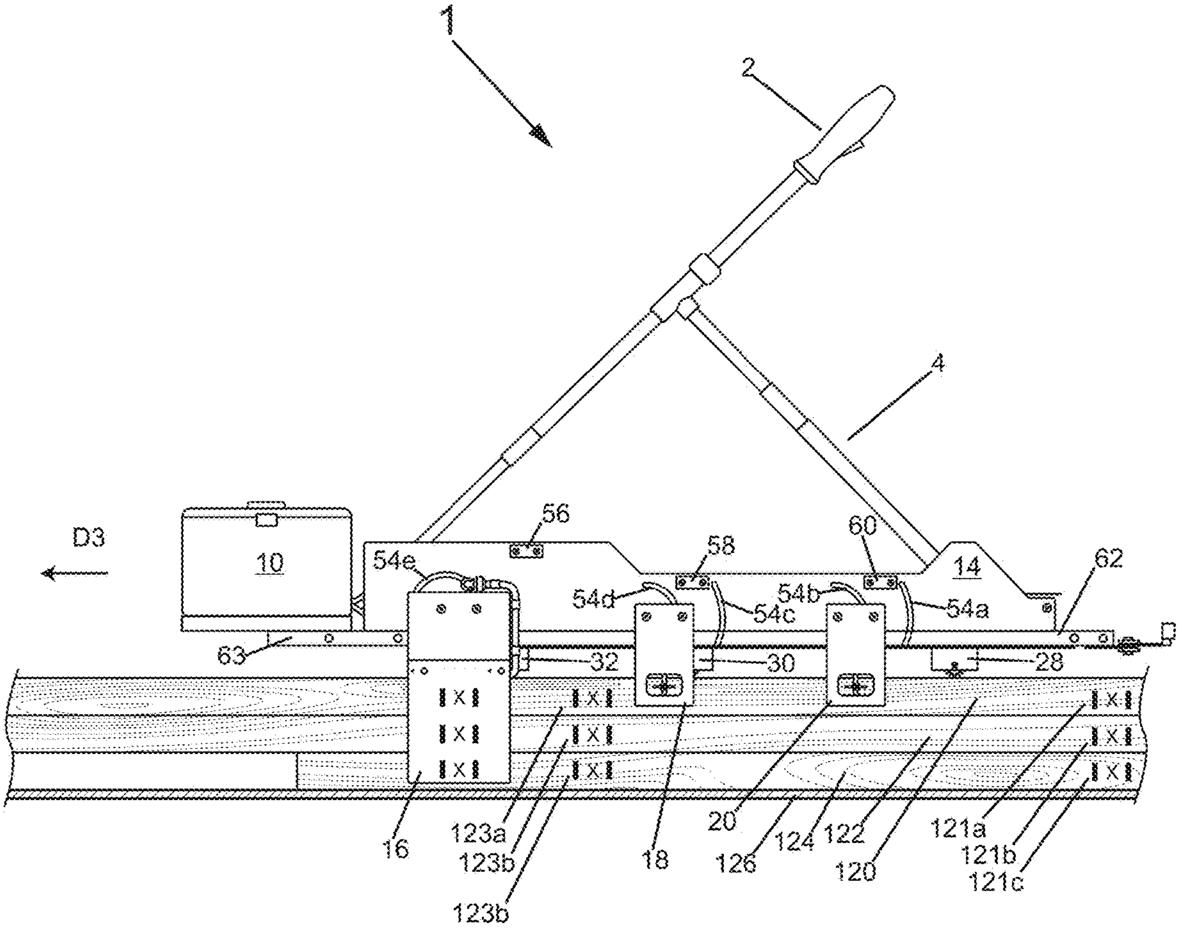
FIG. 17 is a left side view of the stud marker apparatus of FIG. 1 in the first state, along with a third stack of three wood plates, and a bottom plate, with the stud marker apparatus at a first position with respect to the third stack of wood plates.

FIG. 17 is a left side view of the stud marker apparatus 1 of FIG. 1 in the first state, along with a third stack of three wood plates (120, 122, and 124), and a subfloor panel 126, with the stud marker apparatus 1 at a first position with respect to the third stack of wood plates (120, 122, and 124). FIG. 17 shows markings 123*a*, 123*b*, 123*c*, 121*a*, 121*b*, and 121*c*, each of which is of the form "|x|". These markings are made by marking arms or device 16. Similar or identical markings are typically made on the opposite side of the third stack of three wood plates (120, 122, and 124) by marking arm or device 22, at typically the same horizontal location on the stack (120, 122, and 124) . . . . FIG. 17 also shows slots 54*a*, 54*b*, 54*c*, 54*d*, and 54*e*. The slots 54*b*, 54*d*, and 54*e* allow rotation of the devices 20, 18, and 16 respectively, with respect to the member 14 and with respect to the beams or plates 120, 122, and 124.

Figure 18:
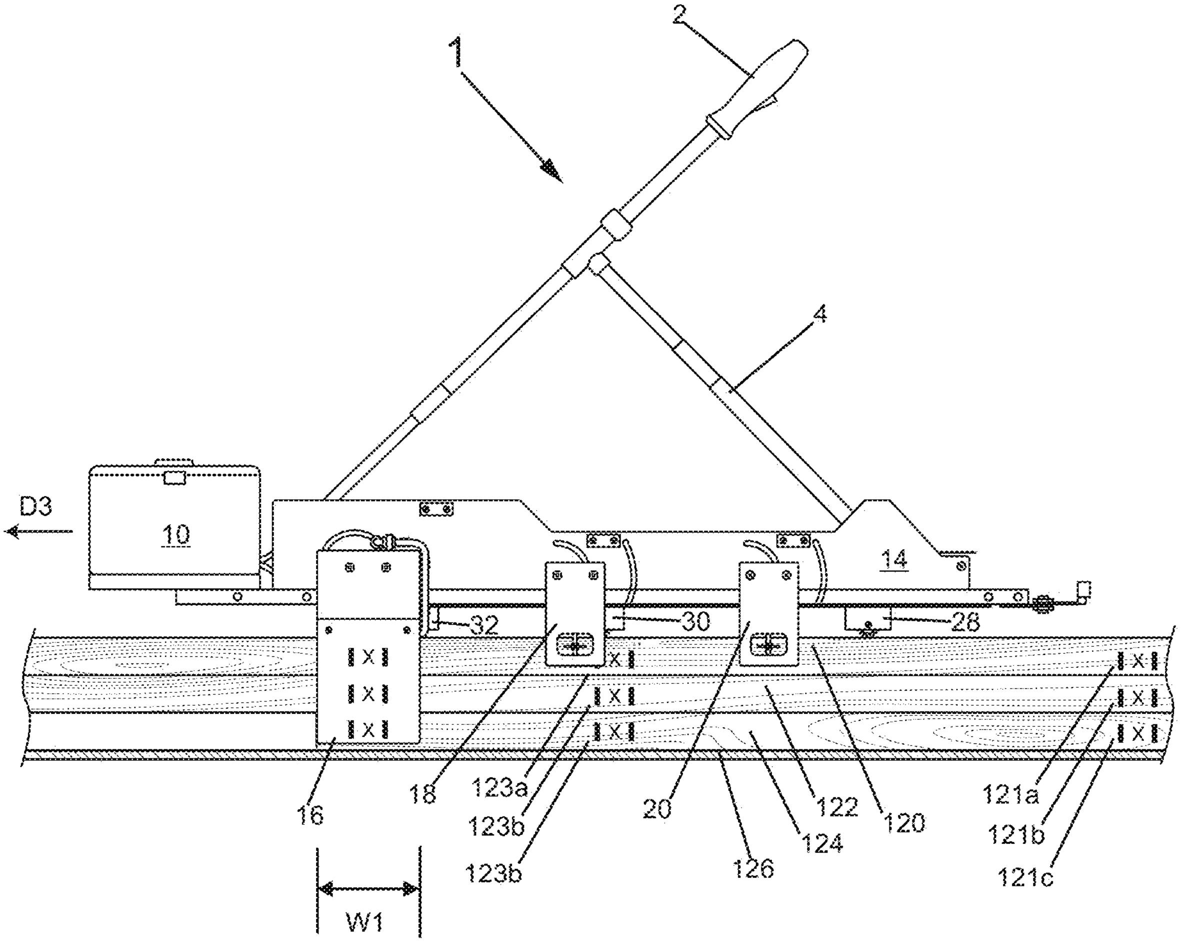
FIG. 18 is a left side view of the stud marker apparatus of FIG. 1 in the first state, along with the third stack of three wood plates, and the bottom plate, with the stud marker apparatus at a second position with respect to the stack of three wood plates.

FIG. 18 is a left side view of the stud marker apparatus 1 of FIG. 1 in the first state, along with the third stack of three wood plates (120, 122, and 124), and subfloor panel 126, with the stud marker apparatus 1 at a second position with respect to the third stack of wood plates (120, 122, and 124). In FIG. 18, the stud marker apparatus 1 has moved in the direction D3 from the position shown in FIG. 17 to the beginning of a door opening (there is typically no bottom plate at a door opening)

Figure 19:
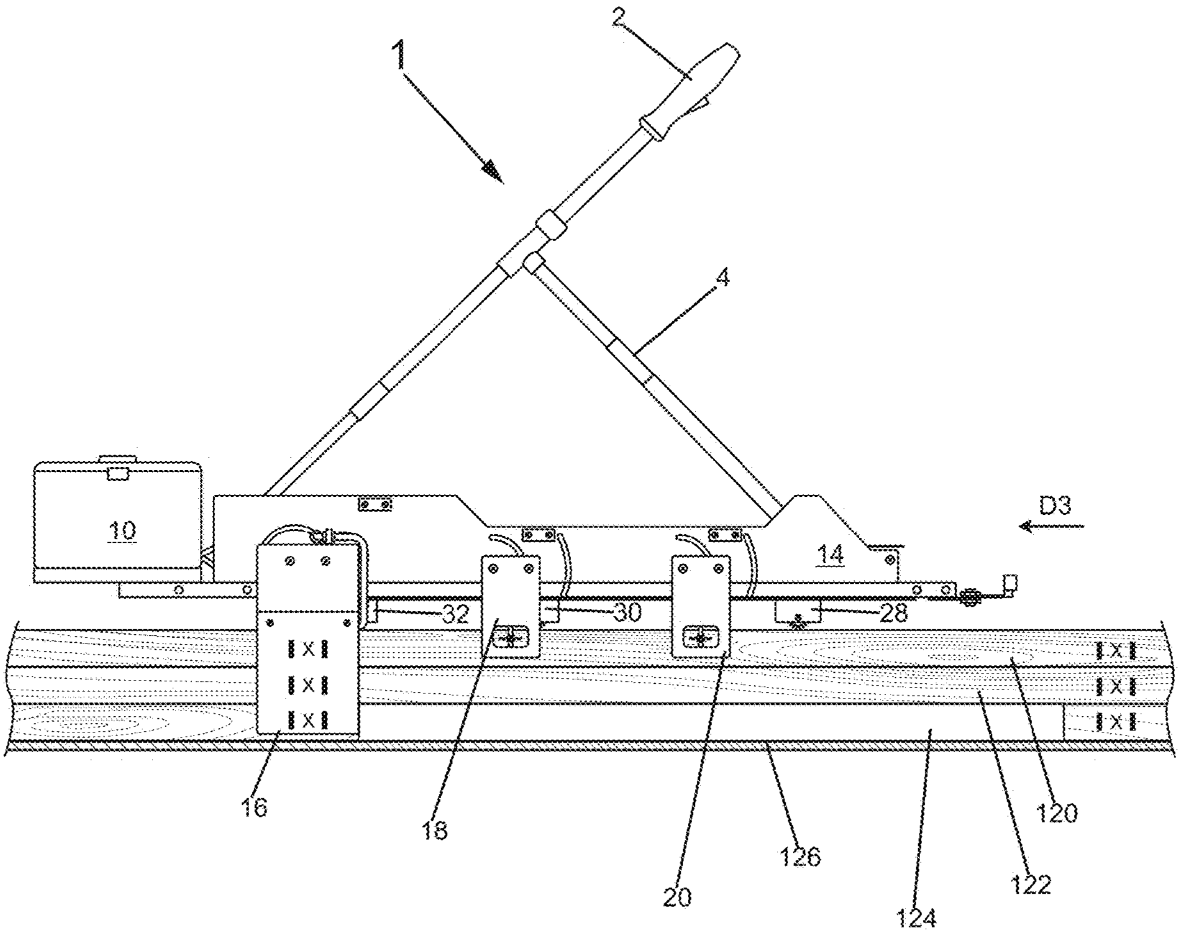
FIG. 19 is a left side view of the stud marker apparatus of FIG. 1 in the first state, along with the three wood plates, and with the stud marker apparatus at a third position with respect to the stack of three wood plates.
Figure 21:
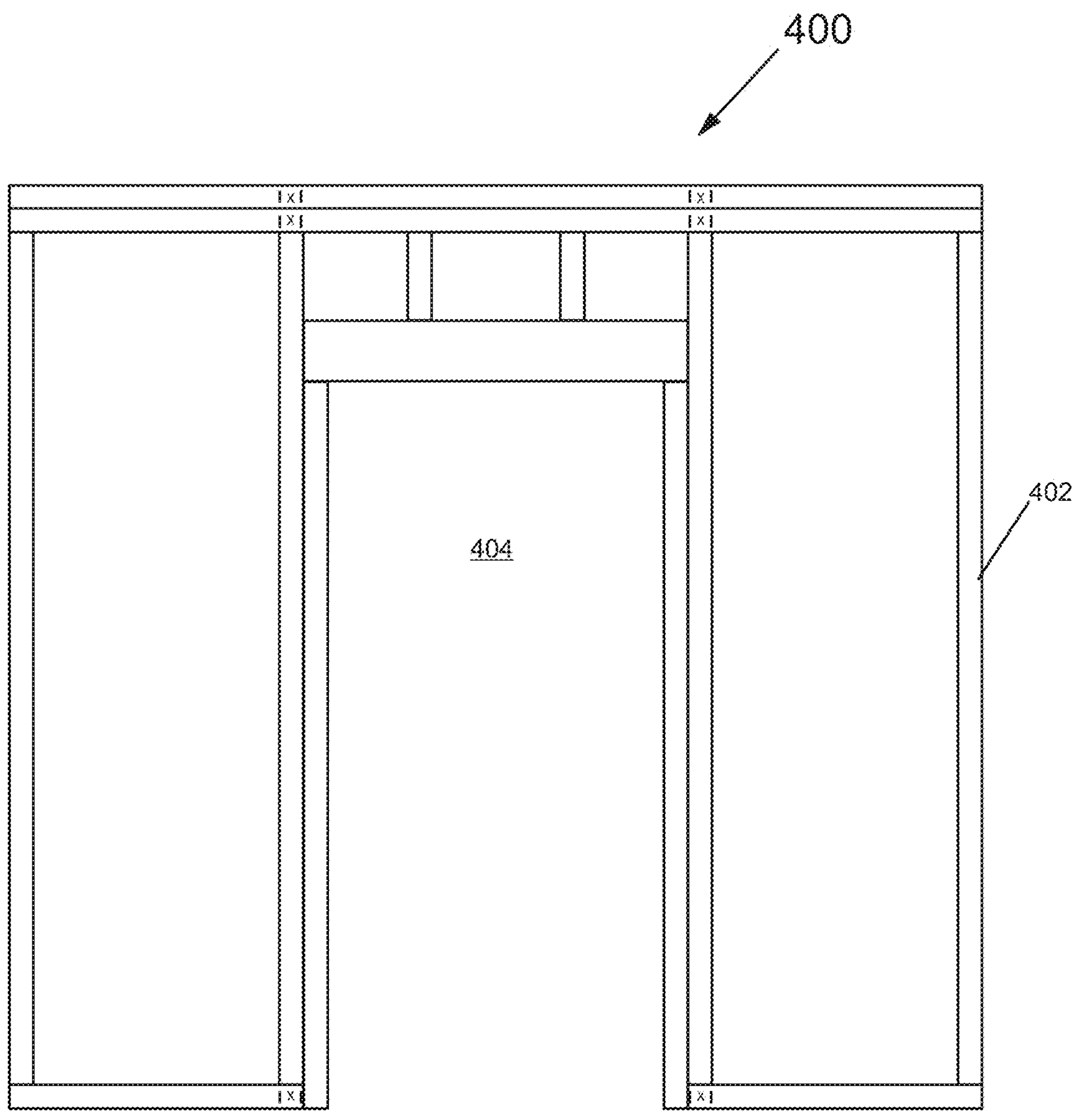
FIG. 21 is a side view of an apparatus comprised of wood framing with an opening for a door.

FIG. 19 is a left side view of the stud marker apparatus 1 of FIG. 1 in the first state, along with the third stack of three wood plates (120, 122, and 124), and the bottom plate 126, with the stud marker apparatus 1 at a third position with respect to the third stack of wood plates (120, 122, and 124) In FIG. 19, the stud marker apparatus 1 has moved in the direction D3 from the position shown in FIG. 18 to the end of a door opening, such as door opening 404 show in FIG. 21.

Figure 20:
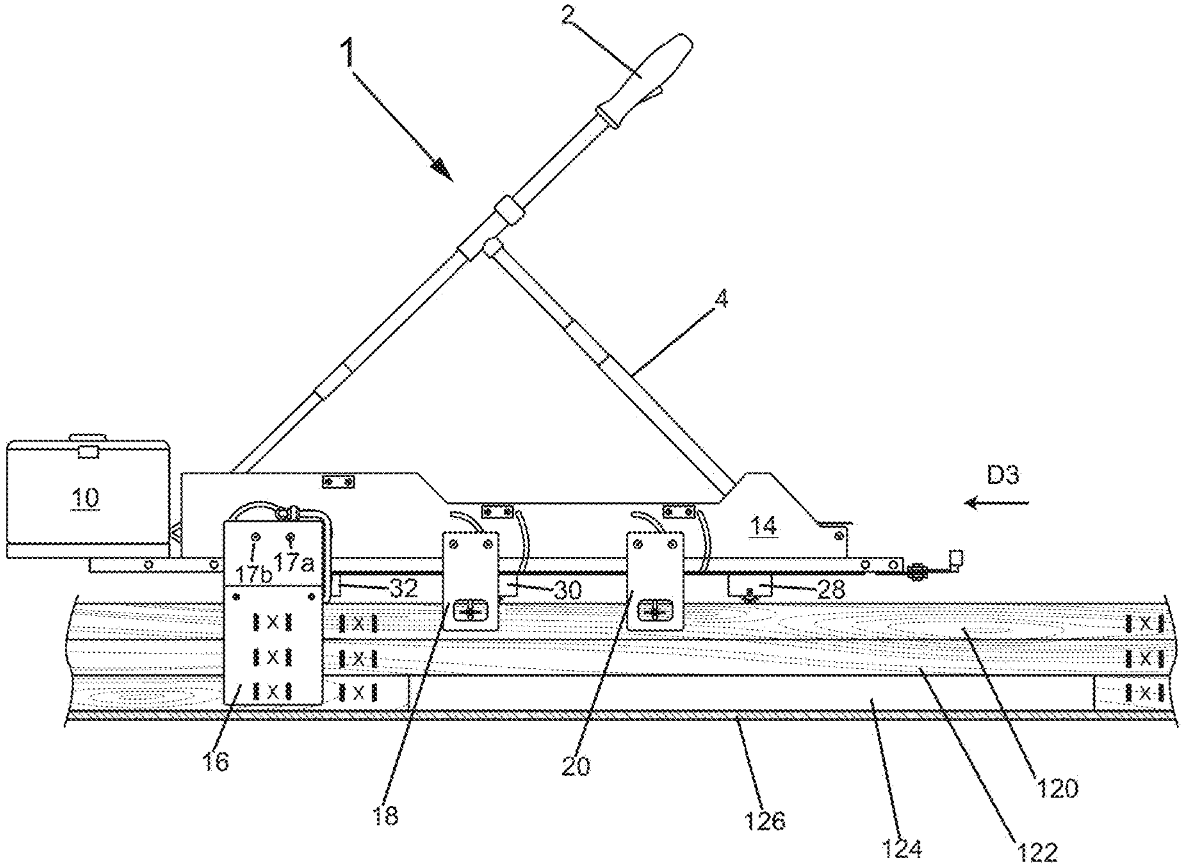
FIG. 20 is a left side view of the stud marker apparatus of FIG. 1 in the first state, along with the third stack of three wood plates, and the bottom plate, with the stud marker apparatus at a fourth position with respect to the stack of three wood plates.

FIG. 20 is a left side view of the stud marker apparatus 1 of FIG. 1 in the first state, along with the third stack of three wood plates 120, 122, and 124, and the subfloor or bottom plate 126, with the stud marker apparatus 1 at a fourth position with respect to the third stack of wood plates (120, 122, and 124.) In FIG. 20, the stud marker apparatus 1 has moved in the direction D3, beyond the door opening 404, shown in FIG. 21, from the position shown in FIG. 19.

FIG. 21 is a side view of an apparatus 400 comprised of wood framing 402 with a door opening 404.

Figure 22A:
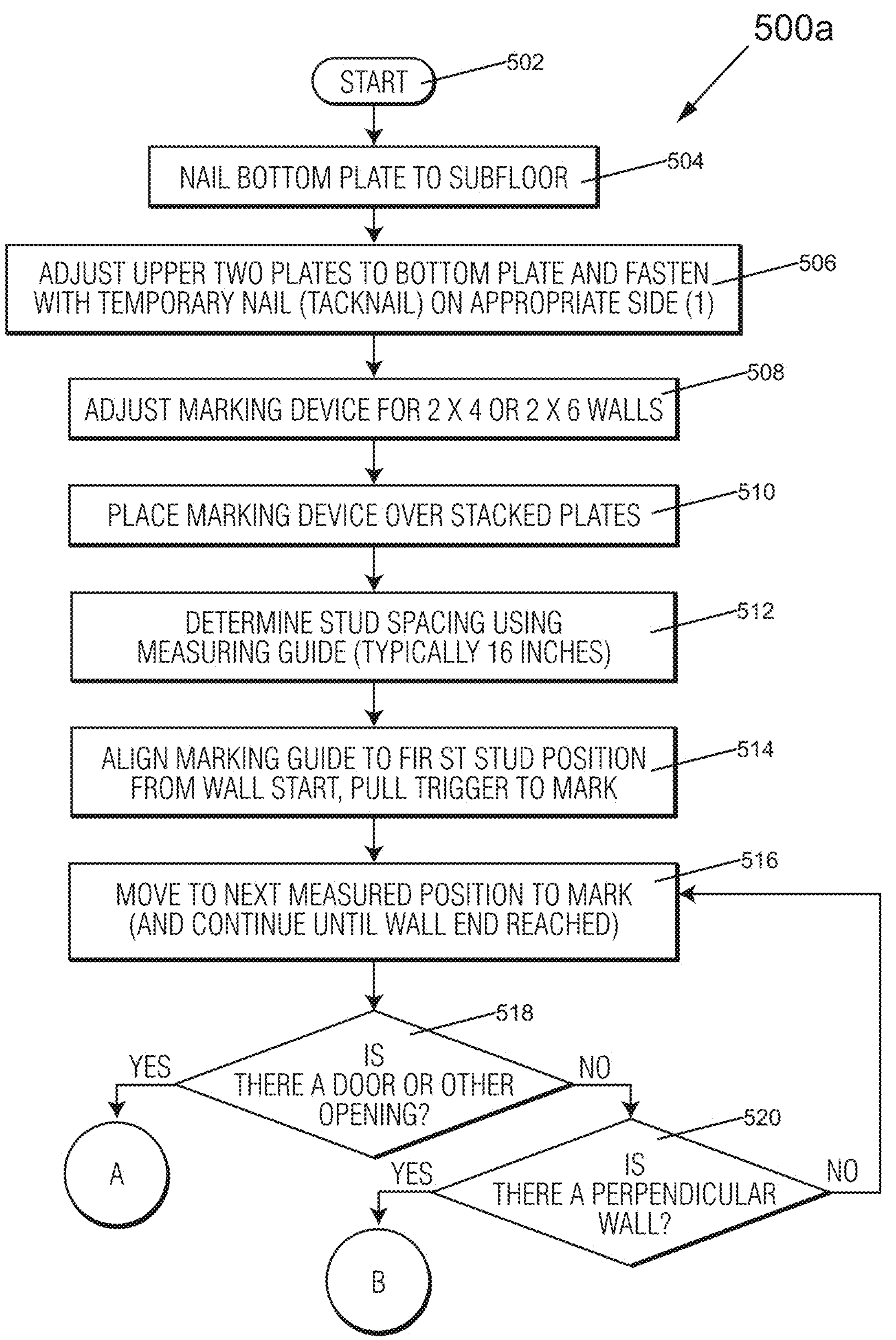
FIG. 22A is a first part of a first flow chart for a first method in accordance with an embodiment of the present invention.
Figure 22B:
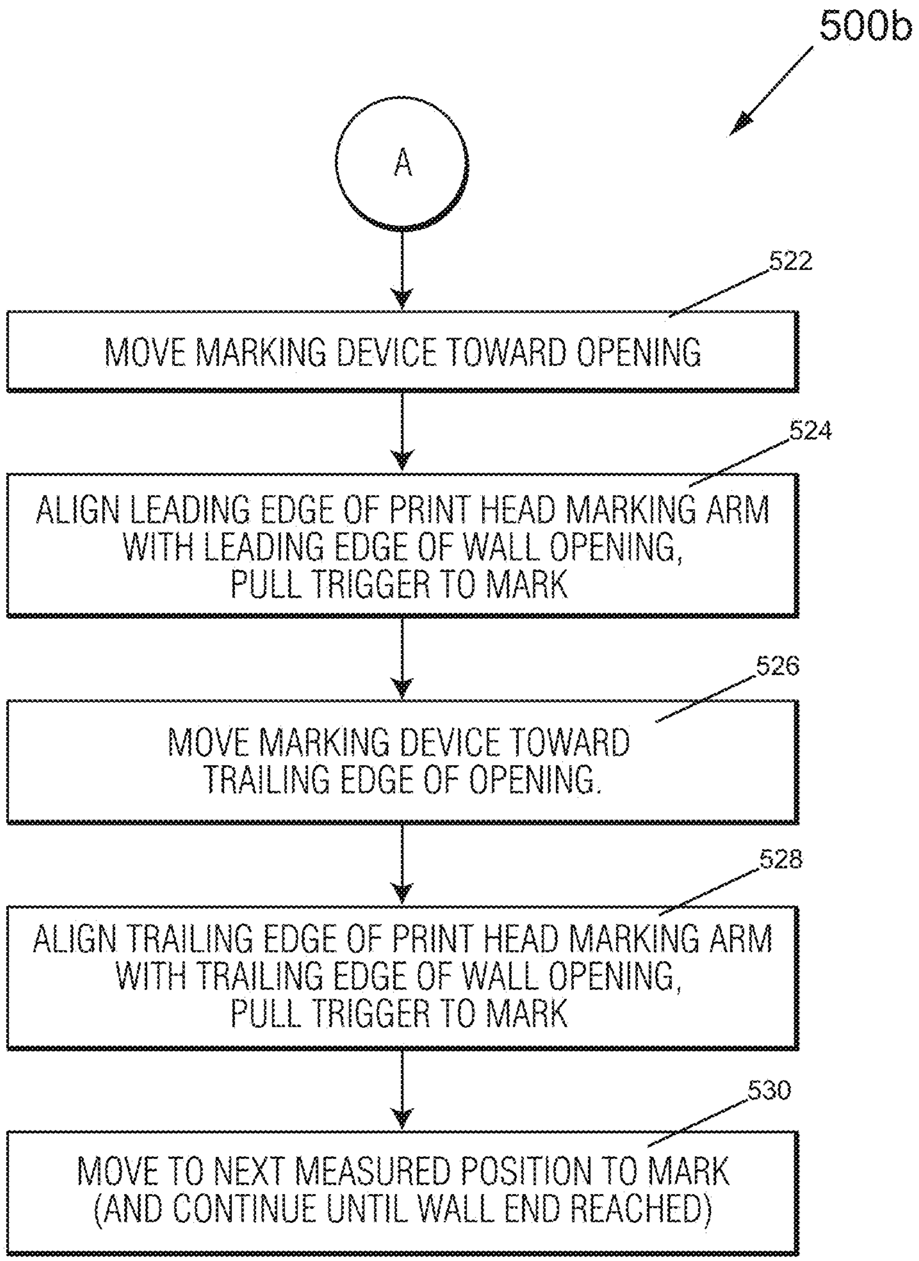
FIG. 22B is a second part of the first flow chart for the first method.
Figure 22C:
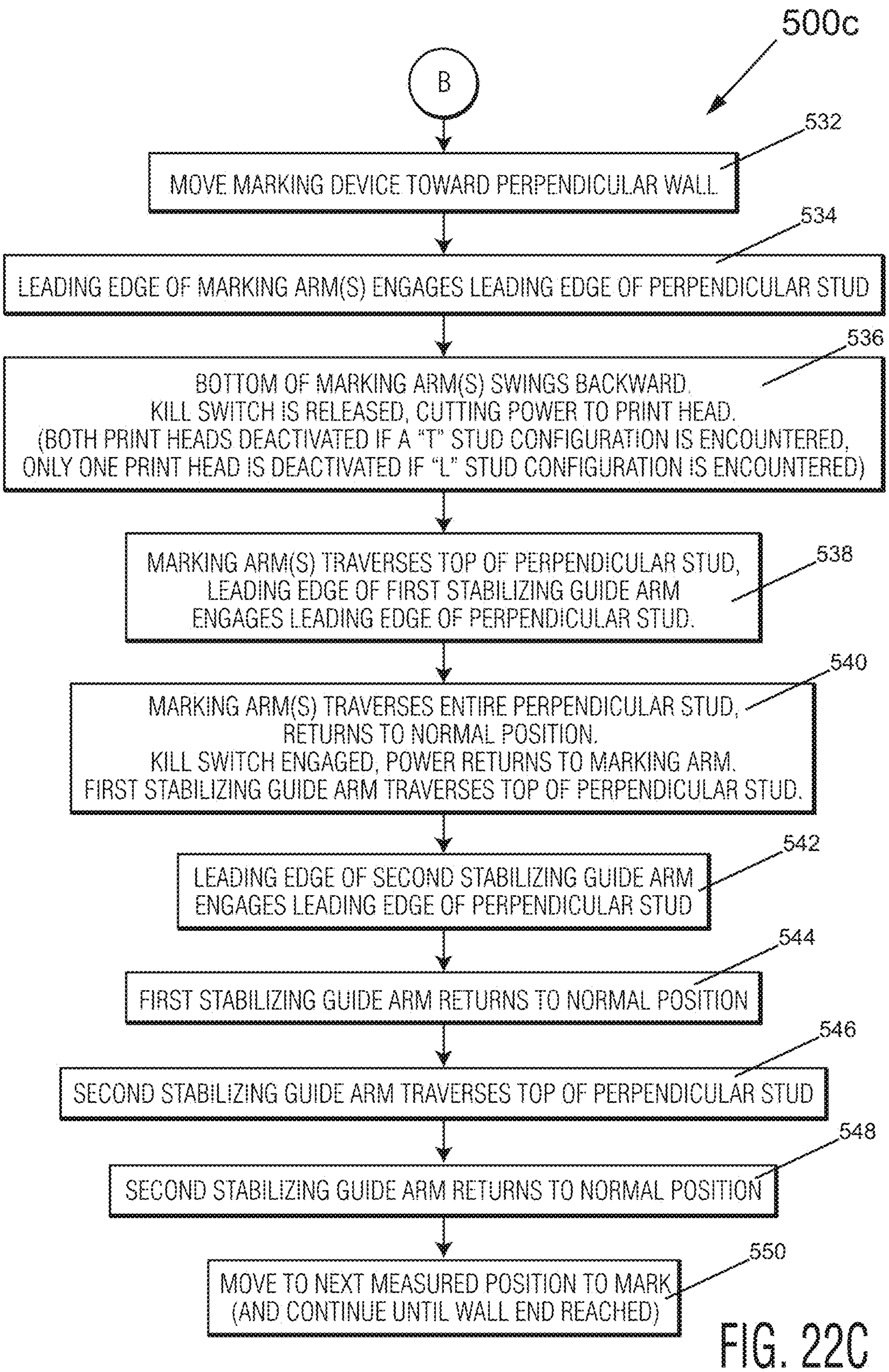
FIG. 22C is a third part of the first flow chart for the first method.

FIG. 22A is a first part 500*a* of a first flow chart for a first method in accordance with an embodiment of the present invention. FIG. 22B is a second part 500*b* of the first flow chart for the first method. FIG. 22C is a third part 500*c* of the first flow chart for the first method.

The first method of the first flow chart shown in FIGS. 22A-C begins at step 502 which is the start in FIG. 22A. Next at step 504, a bottom plate or wood beam 104, such as shown in FIG. 2 is nailed to a subfloor or panel 119, by at least fastener or nail 110. Next, at step 506, two upper plates or wood beams 100 and 102 are attached with a temporary nail to bottom plate 104, and fastened with one or more temporary nails or tacknails, such as tacknail 108*a* (holding plate 102 to plate 104). Nail 106 typically permanently attaches plate 100 to plate 102. Once all studs are marked, tacknail 108*a* is removed to allow the wall to be framed full height. Plate 104 remains attached to subfloor 119, plates 100 and 102 are typically permanently attached to an upper wall assembly once the wall is framed.

Next at step 508 the stud marker apparatus or marking device 1 is adjusted for either two inches by four inches or two inches by six inches walls by unlocking the adjustable locking tubes 8 and 6 shown in FIG. 3, by counter clock wise C1 rotation and manually spreading the width or distance between members 12 and 14 shown in FIG. 3 to two inches×six inches (maximum width) or two inches by x four inches (minimum width) and locking the adjustable locking tubes 8 and 6, in the clockwise direction C2 once the desired width is achieved. Each of locking tubes 8 and 6 unlocks when rotated in the counterclockwise direction C1, which allows the tubes 8 and 6 to freely expand or contract. Turning either of tubes 8 and 6 in the clockwise direction C2 locks the particular tube of 8 and 6, so it cannot expand or contract. Next at step 510, the stud marker apparatus or marking device 1 is placed over stacked plates or beams 100, 102, and 104 as shown in FIG. 1.

Figure 40:
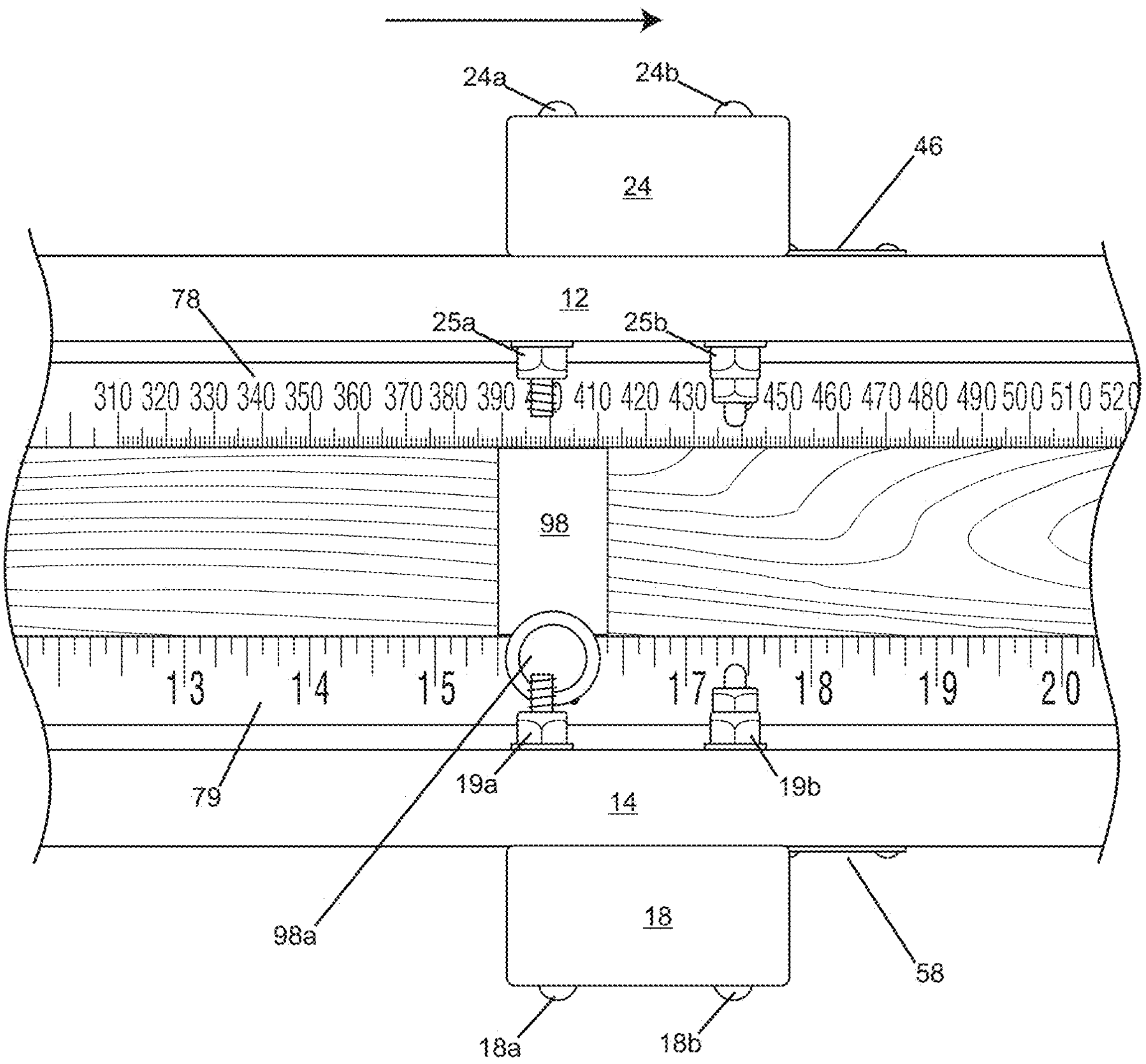
FIG. 40 is a closeup top view of part of the stud marker apparatus in the first state and also shows an adjustable guide in the middle of the stud marker apparatus for stud spacing.

Next at step 512 stud spacing is determined using measuring guide 98 shown in FIG. 40. by loosening lockscrew 98*a*. The measuring guide 98 may be used to set stud spacing to sixteen inches, however, the stud spacing can be adjusted by the user to calibrate the measuring guide from six to twenty-four inches for stud spacing. In at least one embodiment, the stud marker apparatus 1 has calibration in inches and also in metric units. Adjustable sight measuring guide 98, shown in FIG. 40 is configured to be loosened by lockscrew 98*a* to slide the measuring guide 98 to the desired stud spacing, as indicated on either the metric ruler 78 or the inches ruler 79, and then guide 98 is typically locked in place by tightening lockscrew 98*a*. In FIG. 40, the measuring guide 98 is shown placed so that the stud spacing is sixteen inches.

Next at step 514, the adjustable sight guide 98, shown in FIG. 40 is aligned to a first stud position, as shown in FIG. 5, as determined by a carpenter in the field, and then trigger 5*a*, shown in FIG. 35, is pushed upwards in the direction U1 into housing 2*a*, to cause an electrical circuit to be completed through wires 90*a* and 90*b*, to cause marking of one or more of wood plates or beams 100, 102, and 104, with paint/ink to occur through the marking arms or devices 16, 22, 66, and 68, as shown in FIG. 23, in order to mark the stud locations on the top of plate 100, shown in FIG. 2 and left (shown in FIG. 5) and the right (shown in FIG. 1) side of plates 100,102, and 104.

Next at step 516, the stud marker apparatus or marking device 1 is moved in the direction D1, such as from position in FIG. 5 to the position in FIG. 6. The stud marking apparatus 1 will be moved in increments, until the end of the wall is reached.

Next at step 518, it is determined whether there is a door or other opening, such as door opening 404 shown in FIG. 21. If there is no door or other opening, the first method then continues at step 520. If there is a door or other opening, the first method continues at node A, which continues in FIG. 22B.

From node A, the stud marker apparatus or marking device 1 is moved towards the door or other opening, such as door opening 404 shown in FIG. 21, at step 522. Following step 522, at step 524, the leading edge of each of the marking arm(s) or devices 16, and 22, shown in FIG. 23 is aligned with leading edge of door opening 404, as shown in FIG. 18, and then trigger 5*a* is forced into housing 2*a* to cause marking through the marking arms or devices 16, and 22, shown in FIG. 23. In at least one embodiment, the marking arms or devices 16, and 22, shown in FIG. 23, are both engineered to have a width W1, shown in FIG. 18, which is exactly (or approximately in other embodiments) four and ½ inches wide (four and a half inches=the width of three one and one half inch thick studs) for a specific reason. The marking device inside a print head, included in each of devices 16, and 22, is typically positioned dead center of the width W1, shown in FIG. 18 and of the print head, so that the carpenter can line up the leading and/or trailing edge of the print head(s) of devices 16, and 22, for door openings, such as door opening 404 shown in FIG. 21, such that the marking on each of the wall plates (of walls plates 100, 102, and 104) is typically one and one half inches away from the actual door opening. Typically, when a carpenter stacks the wood plates 100, 102, and 104 the door openings, such as door opening 404, are already cut out of the sill plate 124 shown in FIG. 17 for the exact door rough opening. This one and one half inch offset is done to delineate a full stud connection to the door header above.

Following step 524, at step 526, the stud marker apparatus or marking device 1 is moved toward trailing edge of the door opening, such as door opening 404 shown in FIG. 21. Following step 526, at step 528, the trailing edge of the marking arm(s) 16, and 22 is aligned with trailing edge of a wall opening, such as shown in FIG. 19 and the trigger 5*a* is forced into the housing 2*a* to cause marking through marking arm(s) or devices 16, and 22, shown in FIG. 23. Following step 528, at step 530, the stud marker apparatus or marking device 1 is moved to next measured position to mark and this process of moving and marking is continued until a wall end is reached.

At step 520 it is determined if there is a perpendicular wall. If there is no perpendicular wall then the stud marker apparatus of marking device 1 is moved to a next position until a wall end is reached. If there is a perpendicular wall, the first method continues as shown at node B which continues in FIG. 22C.

Figure 33:
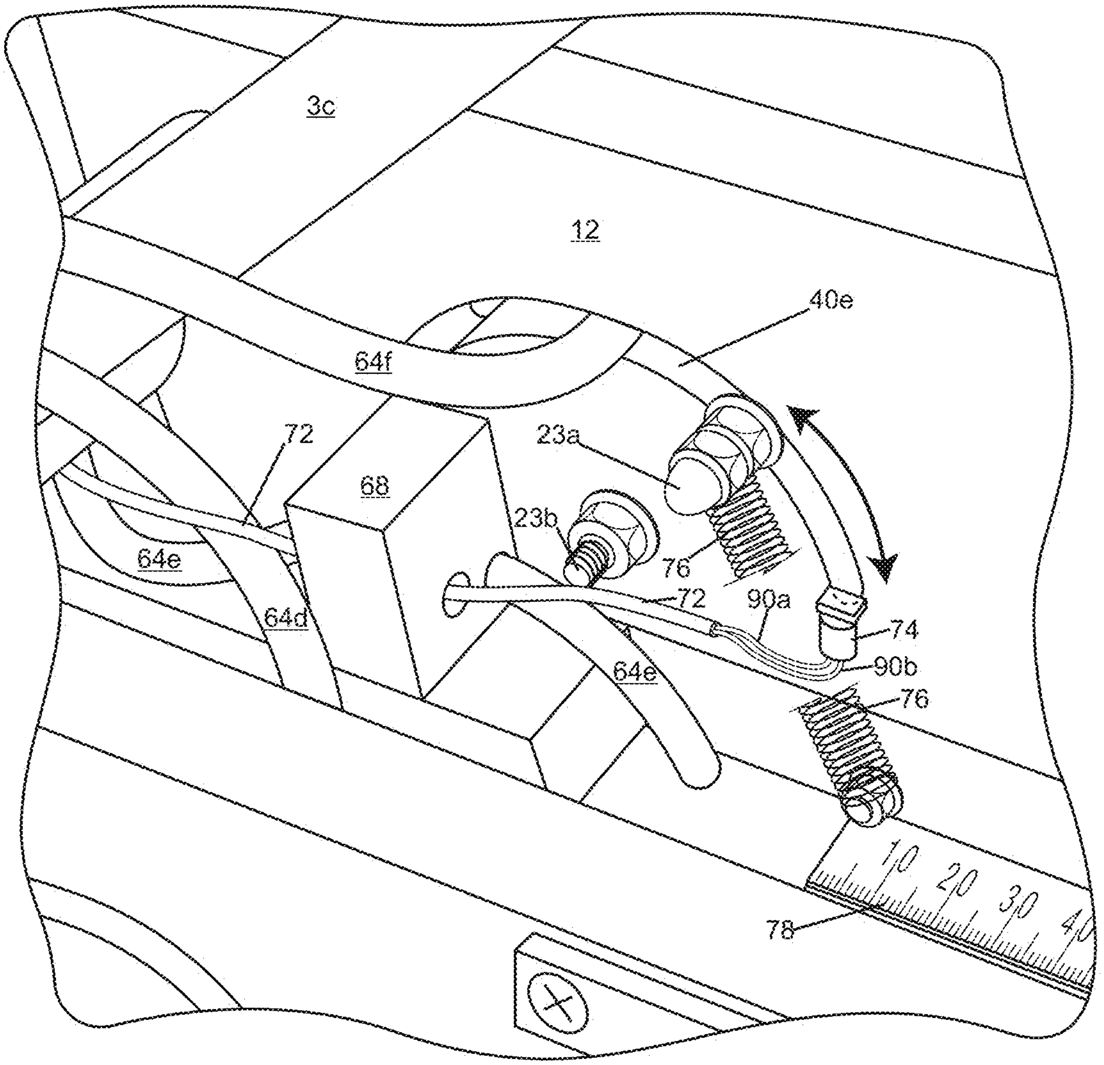
FIG. 33 is a closeup right side, top, rear interior view of part of the stud marker apparatus, with three tubes, and a electrical cord having two wires showing the "kill switch" that turns off the print function temporarily when the marking arm is lifting and crossing over a perpendicular wall.

From node B, shown in FIG. 22C, at step 532, the stud marker apparatus or marking device 1 is moved towards a perpendicular wall. Following step 532, at step 534, the leading edge of marking arms(s) 16, and 22, engages the leading edge of perpendicular wall plates 106, 106*b*, 106*c*, as shown in FIG. 8. Following step 536, the bottom of each of marking arm(s) 16, and 22 swings backward. Kill switch 74, shown in FIG. 33 is released, cutting power to whichever marking arm, of marking arms 16, or 22, encounters a perpendicular wall. Kill switch 74 only disables the marking arm 16, 22 on the side that encounters a perpendicular wall. If a "T" configuration is encountered where a perpendicular wall is on both sides of the machine then both marking arms 16, and 22 are killed until passing beyond the perpendicular wall. The same applies to intersecting walls that are not ninety degree intersections (forty-five degree wall as an example). Both marking arms 16, and 22 are deactivated if a "T" stud configuration is encountered. Only one printhead, of either marking arm or device 16 or 22, is deactivated if an "L" stud configuration is encountered.

Following step 536, at step 538, the marking arms 16, and 22 traverse the top of a perpendicular wall, and the leading edge of the first stabilizing guide arm of arms 24, and 26, shown in FIG. 8 engages leading edge of perpendicular stud wood plates 106,106*b*, and 106*c*, shown in FIG. 8.

Following step 538 at step 540, marking arm(s) 16, and 22 traverse an entire perpendicular wall, and return to normal position as shown in FIG. 1. The kill switch 74, shown in FIG. 33 is engaged when the marking arms 16, and 22 contact a perpendicular wall and power is "killed" or shut off to the particular marking arm of marking arms 16, and 22. Once the marking arm (one or both of marking arms 16 and 22) passes over the perpendicular wall and returns to a vertical position, as shown in FIG. 12, the power returns to marking arms 16, and 22. First stabilizing guide arm 24, shown in FIG. 8 traverses the top of perpendicular wall plates 106, 106*b*, and 106*c*, shown in FIG. 8.

Following step 540, at step 542, a leading edge of the second stabilizing guide arm 26, shown in FIG. 8, engages a leading edge of a perpendicular wall (includes 106,106*b*, and 106*c*, show in FIG. 12. Following step 542, at step 544, the first stabilizing arm 24, shown in FIG. 13 returns to normal position. Following step 544, at step 546, the second stabilizing arm 26, shown in FIG. 13 traverses top of a perpendicular stud. Following step 546, at step 548, a second stabilizing guide arm 26, shown in FIG. 14 returns to normal position Following step 548, at step 550, the stud marker apparatus 1 is moved to a next measured position to mark and this process of moving and marking continues until a wall end is reached.

FIG. 23 is a bottom view of the stud marker apparatus 1 of FIG. 1, with the stud marker apparatus 1 in the first state. FIG. 23 shows devices 28, 30, 32, 34, 36, and 38 which are used to allow the stud marker apparatus 1 to roll. Spiked roller wheels 28*h*, 28*i*, 30*h*, 30*i*, 32*h*, 32*i*, 34*h*, 34*i*, 36*h*, 36*i*, 38*h*, and 38*i* are spiked to allow the wheels to roll through wet paint/ink and not smear or disturb the markings, such as markings 109*b*, and 107*b*, shown in FIG. 9 as well as markings 101*a*, 101*b*, 101*c*, and 101*d* made on the top plate 100, as shown in FIG. 15 that are generated by the marking arms or devices 16, and 22. FIG. 23 shows devices or marking arms 16, and 22 which mark the studs on the sides of the wood plates. FIG. 23 also shows devices 18, 20, 24, and 26 which are stabilizing guide arms to keep the stud marker apparatus 1 parallel and square during the marking process.

The stud marker apparatus 1, as shown in FIG. 23, also includes bottom members 62, 63, 65, 52, 53, and 55 which are the frame of the stud marker apparatus 1. FIG. 23 also shows handles 6 and 8, which are the adjustable locking tubes that expand the machine for two inches by six inches walls and contract the stud marker apparatus 1 for two inches by four inches walls. Apparatus 1 also includes housing 10 which is the control panel and housing for pump 11*c*, ink or cleaner 11*b*, and on/off switch 11*a*, shown in FIG. 39.

Figure 24:
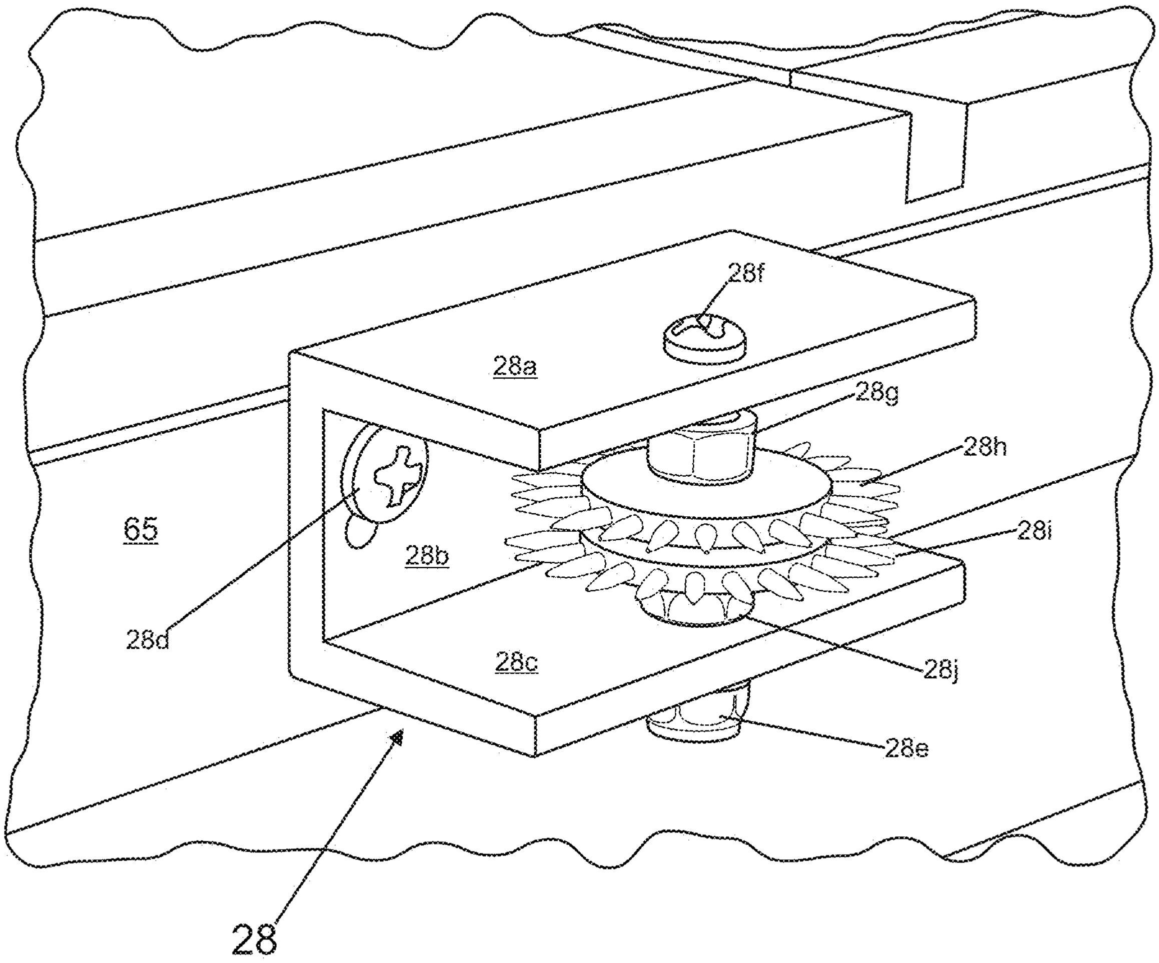
FIG. 24 is a closeup bottom, right side, rear perspective view of part of the stud marker apparatus with spiked roller wheels that allow the stud marker apparatus to roll through wet paint/ink without disturbing the paint/ink.

FIG. 24 is a closeup bottom, right side, rear perspective view of part of the stud marker apparatus 1, including a spiked roller wheel 28*h*, and 28*i* of a first set of one of six spiked roller wheels (including 28*h* and 28*i*, 30*h* and 30*i*, 32*h* and 30*i*, 34*h* and 34*i*, 36*h* and 36*i*, and 38*h* and 38*i*, shown in FIG. 23) of the stud marker apparatus 1. The spiked roller wheel device 28 includes plates 28*a* and 28*c* which are fixed to and perpendicular to plate 28*b*. The plate 28*b* is fixed to bottom member 65 by screw or bolt 28*d*. The device 28 includes spiked roller wheels 28*h* and 28*i*, which rotate on pivot pin, screw or bolt 28*f*, and spacers or nuts 28*g*, 28*j*, and 28*e* are provided. Each of the devices 30, 32, 34, 36, and 38 is identical or substantially the same as device 28, except for location of connection.

Figure 25:
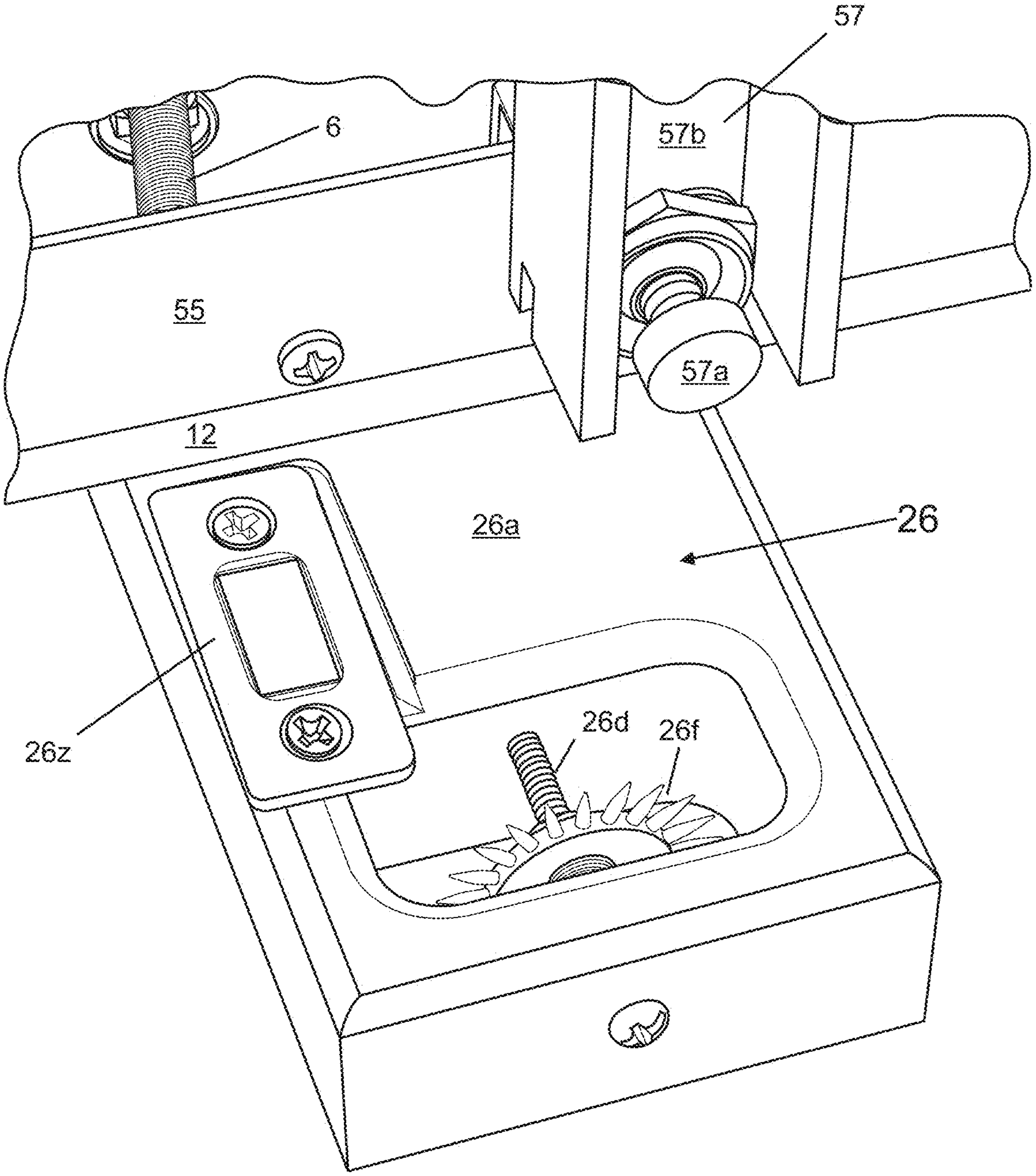
FIG. 25 is a closeup bottom, left side, and rear perspective view of part of the stud marker apparatus, including a stabilizing guide arm with a spiked roller wheel to keep the stud marker apparatus parallel with the wood plates.

FIG. 25 is a closeup bottom, left side, and rear and underside perspective view of part of the stud marker apparatus 1, including a single spiked roller wheel mounted in stabilizer arm 26, shown in FIG. 7. The roller wheel 26*f*, shown in FIG. 25 is spiked so as not to disturb wet paint/ink. There are two stabilizing guide arms on each side of the stud marker apparatus 1. Stabilizing guide arms 18 and 20 on one side and stabilizing guide arms 24 and 26 on the other side of the stud marker apparatus 1. The stabilizing guide arms or devices 18, 20, 24, and 26 are used to maintain parallel alignment with the wood plates 100, 102, and 104. Each of the four stabilizer guide arms 18, 20, 24, and 26 has one spiked roller wheel, similar or identical to roller wheel 26*f* shown in FIG. 25. The spiked roller wheel 26*f* rotates on a pin, screw, or bolt 26*b*. The spiked roller wheel 26*f* includes a housing 26*c*, which is connected to member 12, through pins, screws or bolts, such as shown in FIGS. 7-14, in a manner to allow rotation of spiked roller wheel 26*f* with respect to member 12. All four stabilizer arms 18, 20, 24, and 26 FIG. 23 have a similar or identical spiked roller wheel (similar or identical to wheel 26*f*) attached in a similar or identical manner. Each of the four stabilizer arms 18, 20, 24, and 26 and each of both marking arms 16, and 22, shown in FIG. 23, possesses a magnetic catch to secure the arms in the stored position shown in FIG. 42 for when the stud marker apparatus 1 is in the stored position.

Figure 26:
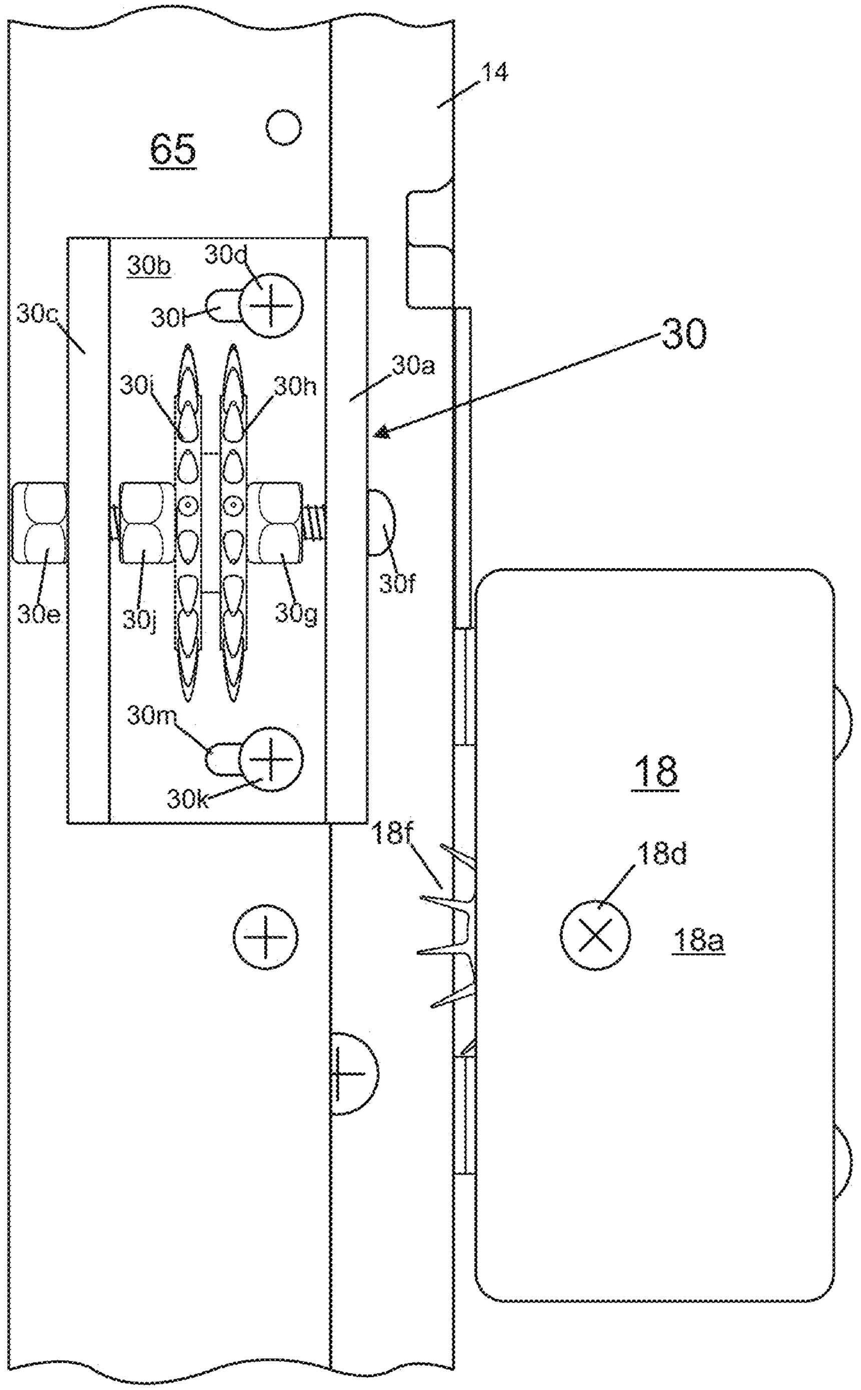
FIG. 26 is a closeup bottom view of part of the stud marker apparatus including the spiked roller wheel on the bottom of the stud marker apparatus and a second spiked roller wheel in a stabilizer guide arm.

FIG. 26 is a closeup bottom view of part of the stud marker apparatus 1 including spiked roller wheels 30*i* and 30*h* of the first set of spiked roller wheels typical of device 30. A spiked roller wheel 18*f* shown in stabilizer arm 18 is typical of all four stabilizer arms 18, 20, 24, and 26, shown in FIG. 23, of the stud marker apparatus 1. FIG. 26 shows plates 30*a*, 30*b*, 30*c*, screw or bolts 30*d* and 30*k* which fix the device 30 to bottom member 65. FIG. 26 also shows nuts 30*e*, 30*j*, and 30*k*, and screw or bolt 30*f* on which the gears or spiked roller wheels 30*i* and 30*h* rotate. Slots 301 and 30*k* are provided to adjust the location of the device 30 on the bottom member 65. Devices 28, 32, 34, 36, and 38 may be identical to device 30, except for location where each device is fixed.

FIG. 26 also shows device 18, which has a housing 18*a*, and a spiked roller wheel 18*f*. The spiked roller wheel 18*f* rotates on a pin, bolt, or screw 18*d*, which is fixed to housing 18*a*. The devices 16, 18, 20, 22, 24, and 26, may be identical, except for as will be described.

Figure 27:
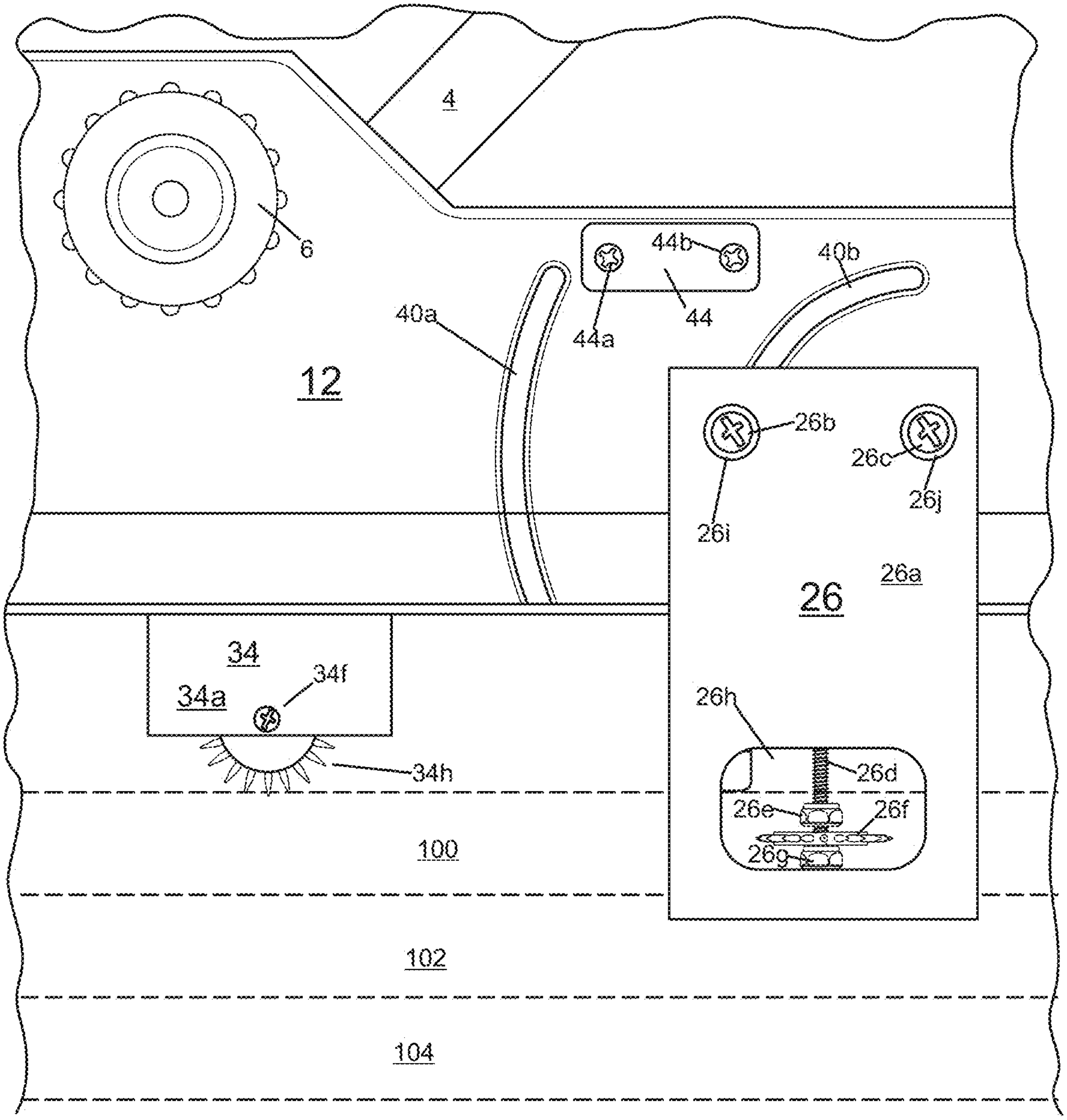
FIG. 27 is a closeup right side view of part of the stud marker apparatus including the spiked roller wheel on the bottom of the stud marker apparatus and a second spiked roller wheel in the stabilizing guide arm, with the stabilizing guide arm shown in a down/operating position.

FIG. 27 is a closeup left side view of part of the stud marker apparatus 1 including spiked roller wheel device 34 typical of the first set of spiked roller wheel devices (28, 30, 32, 34, 36, and 38, shown in FIG. 23). There is a single spiked roller wheel 26*f*, or similar or identical, in each of the stabilizer arms 18, 20, 24, and 26 shown in FIG. 23, that are secured by machine screw 26*d* and nuts 26*e* and 26*g* (or similar or identical), which allow height adjustment of spiked roller wheel 26*f*. This assembly is typical of all four stabilizer arms 18, 20, 24, and 26. The spiked roller wheel device 34 includes a plate 34*a*, a spiked roller wheel 34*h* and a pin, screw or bolt 34*f*, on which the spiked roller wheel 34*h* rotates.

FIG. 27 also shows slot 40*a* (slot for roller wheel 26*f* to travel in) and slot 40*b* (slot/guide for stabilizer arm 26 to travel in), plate 44 (magnetic catch for storage), screws or bolts 44*a* and 44*b* to secure the magnetic catch 44 to the frame or member 12 of the stud marker apparatus 1. Also shown in FIG. 27 is handle 6 which is the adjustable locking tube that allows the distance between members 12 and 14 to be adjusted for two by four inches or two by six inches walls. Member 4 is or is part of an adjustable locking tube for the handle assembly for the stud marker apparatus 1. Also shown in FIG. 27 is device 26 which has housing 26*a*, and screws or bolts 26*b* and 26*c* which connect housing 26*a* with member 12. The bolt 26*b* is inserted through opening 26*i* in housing 26*a*, and through slot 40*b* allowing device 26 to rotate about pin, screw, or bolt 26*c* (which remains stationary with respect to member 12, as pin, screw or bolt 26*b* moves in slot 40*b*. The device 26 also has an opening 26*h* to allow spiked roller wheel 26*f* to protrude out and contact the beam 100 to keep the stud marker apparatus 1 aligned with respect to stack of beams 100, 102, and 104 The device 26 also includes screw or bolt 26*d* on which spiked roller wheel 26*f* rotates, and nuts 26*e* and 26*g* which provide spacing.

Figure 28:
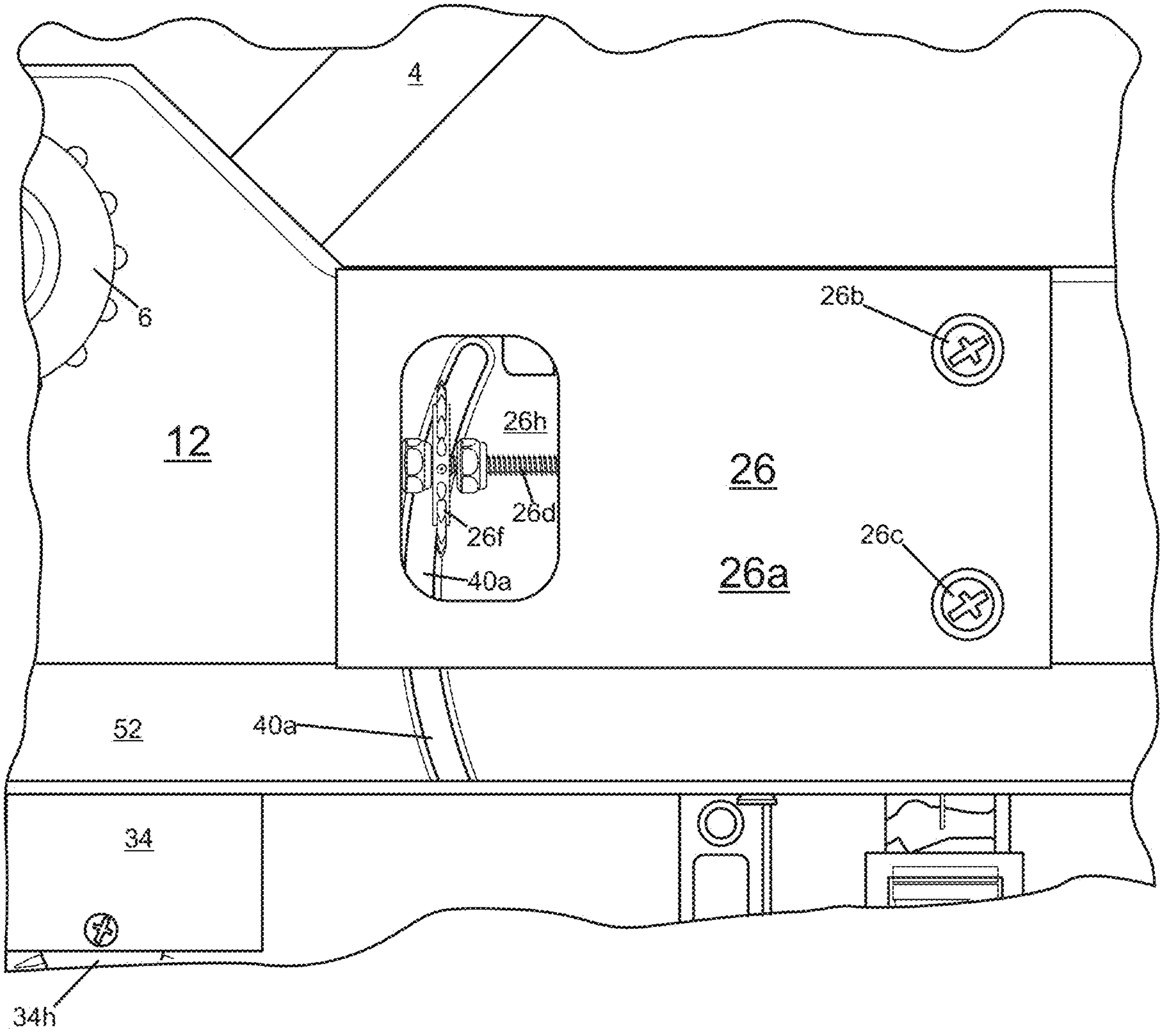
FIG. 28 is a closeup right side view of part of the stud marker apparatus including the stabilizing guide arm in the "up" and stored position.

FIG. 28 is a closeup right side view of part of the stud marker apparatus 1 including a spiked roller wheel device 34 typical of the first set of gear devices (28, 30, 32, 34, 36, and 38, shown in FIG. 23). The spiked roller wheel 26*f* in stabilizer arm 26 of the second set of spiked roller wheels located in stabilizer arms (18, 20, 24, and 26, shown in FIG. 23), is shown with stabilizer arm 26 in the upright, stored position with the magnetic catch or plate 44, shown in FIG. 27, engaged to keep the stabilizer arm or device 26 in the up position for storage. This is typical of all four stabilizer arms 18, 20, 24, and 26. Both print heads 16, and 22 also have a similar or identical magnetic catch assemblies (including plates similar or identical to plate 44) for storage in the up position.

In FIG. 28, the stabilizer arm 26 has been rotated from the orientation shown in FIG. 27, with respect to the member 12, so that in FIG. 28, the device 26 is now parallel to the wood plates 100, 102, and 104, and the member 52. The screw or bolt 26*b* has been moved in the slot 40*b* to cause the rotation of the device 26 from the orientation shown in FIG. 27 to the orientation shown in FIG. 28.

Figure 29:
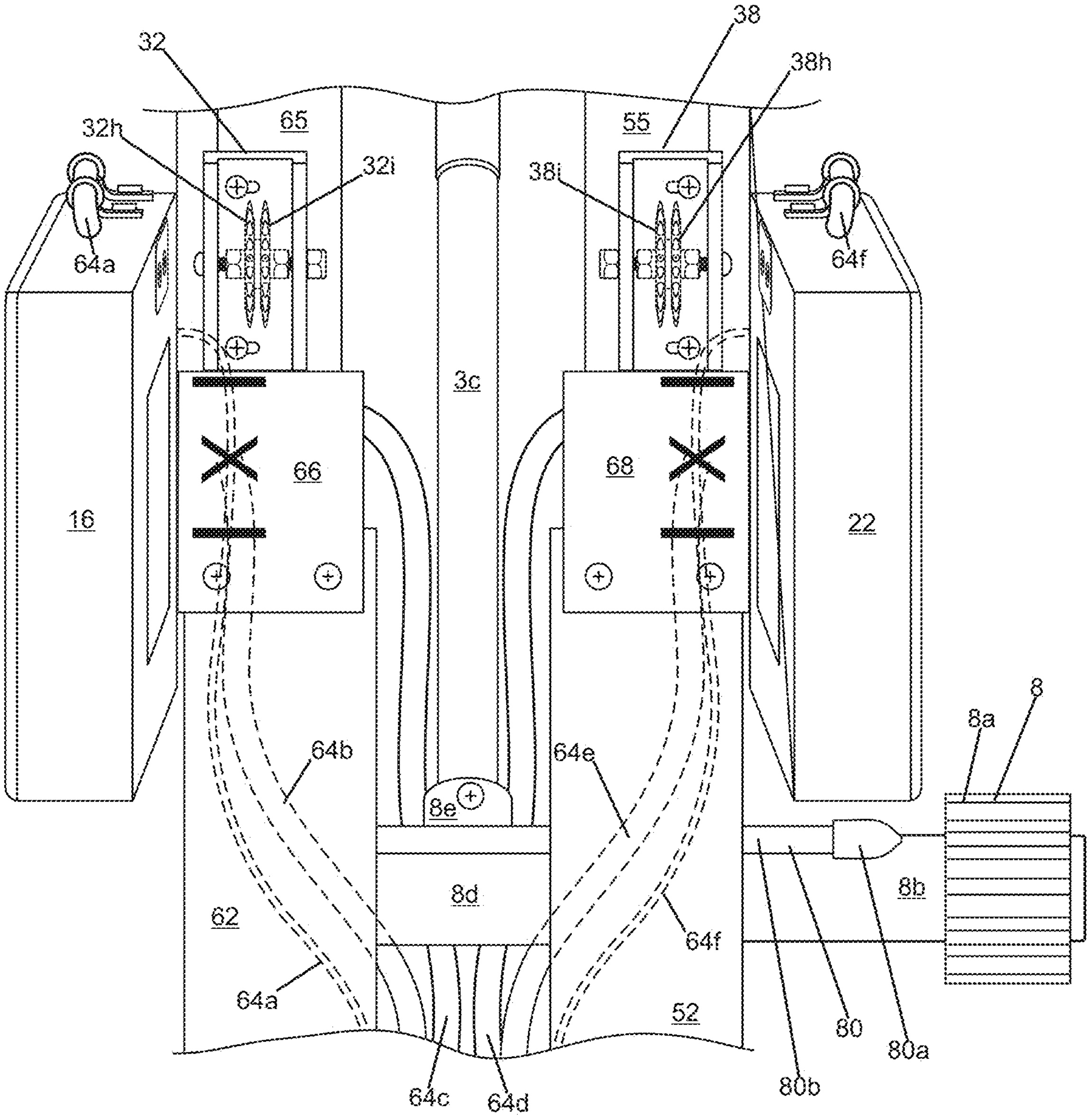
FIG. 29 is a closeup bottom interior perspective view of part of the stud marker apparatus including the bottom spiked roller wheels and the left and right side marking arms, which mark the left and right sides of the plates as well as the print head(s) under the stud marker apparatus that mark the top of the top plate.

FIG. 29 is a closeup bottom interior perspective view of part of the stud marker apparatus 1 including marking arms(s) 16 and 22. Typically, there are no spiked roller wheels, inside marking arms 16 and 22 Inside marking arms 16 and 22 are the marking devices that deliver paint/ink to mark both left & right sides of plates 124, 122,120, FIG. 18 for the stud locations. FIG. 29 also shows spiked roller wheels 32*h* and 32*i*, and 38*h* and 38*i*, on the bottom of the stud marker apparatus 1.

FIG. 29 also shows bottom members 66 and 68, which are the marking devices to mark studs and/or floor joists on the top of plate 100, shown in FIG. 15. FIG. 29 also shows spiked roller wheels 32*h* and 32*i* of device 32 and spiked roller wheels 38*i* and 38*h* of device 38. FIG. 29 also shows tubes 64*b*, 64*c*, 64*d*, and 64*e*. The four tubes 64*b*, 64*c*, 64*d*, and 64*e* deliver paint/ink to the print heads of devices 16, 66, 68, and 22 when the trigger 5*a*, shown in FIG. 35 is pushed in, in direction U1. Component 64*a* shown in FIG. 29 is a wire to a kill switch (similar or identical to kill switch 74) in a print head which is part of device 16; component 64*f* is a wire for a kill switch (similar or identical to kill switch 74) in a print head which is part of device 22.

In FIG. 29, print heads or output ports for printing ink or paint, for devices 66 and 68 are represented in a simplified form by the "X"s and/or the regions "|X|". The print heads or output ports of 66 and 68 are connected to tubes 64*b* and 64*e*, respectively, which are connected to ink or paint reservoir 11*b* shown in FIG. 39, which is pumped out from 11*b* through tubes 64*b* and 64*e* to ports or print heads of device 66 and 68, respectively, during operation.

Figure 30:
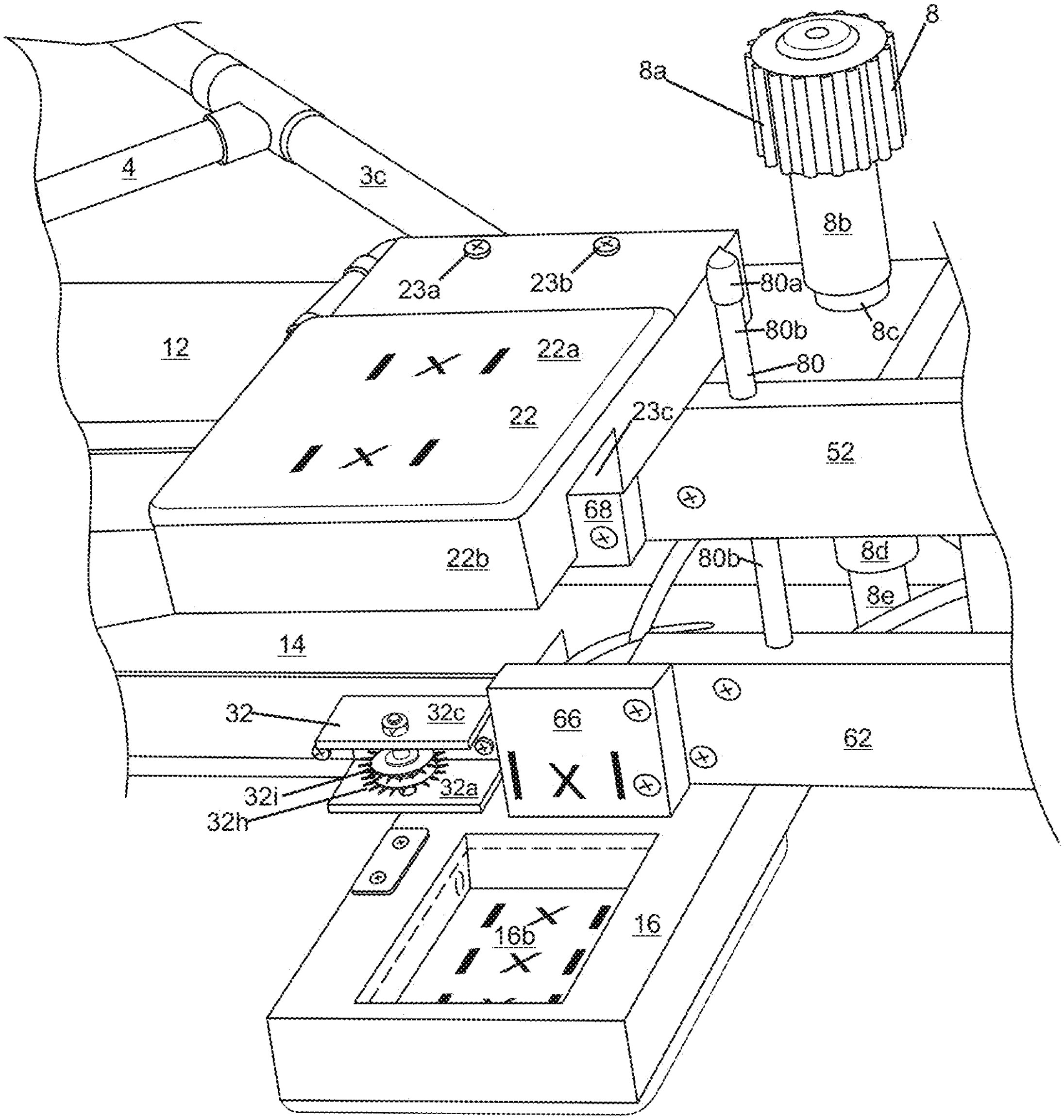
FIG. 30 is a closeup bottom, right side, front perspective view of part of the stud marker apparatus including spiked roller wheels under the machine and left and right side marking arms.

Somewhat similarly, or identically, in FIG. 30, print head or output port for printing ink or paint for marking device 16 is represented by "X" or the region "|X|" and the marking device 22 may be similar or identical to the marking device 22. The dashed lines shown in FIG. 30 within a recess 16*b* of the device 16, indicate the location of print heads and ink or paint feed. The three "X"'s within the recess 16*b* indicate that there are three print heads or output ports, so that three markings or "|X|" s, such as markings 105*a*, 105*b*, and 105*c* shown in FIG. 6, can be simultaneously made by three print heads of the device within the recess 16*b*.

FIG. 29 also shows member 80 which includes section 80*a* and rod 80*b*. The rod 80*b* is an axle which holds both halves of the stud marker apparatus 1 together, at the front of the apparatus 1, near device 10, shown in FIG. 1, i.e. holds members 12 and 14 together. There is another rod, similar or identical to rod 80*b*, which holds the members 12 and 14 together near the rear of the apparatus 1, i.e. near member 4*c* shown in FIG. 1.

The axle or rod 80*b* at the front and the axle or rod similar or identical at the back allow the stud marker apparatus 1 (or the space between members 12 and 14) to expand and contract to mark two by four inch walls in the contracted position and two by six inch walls in the expanded position. Member or tube 3*c*, shown in FIG. 29 is also shown in FIG. 29 connected to member 8*e* of handle 8. Member 8*e* is connected to member 8*d*, which is connected to member 3*c* (shown in FIG. 35), which is connected to member 3*b*, which is connected to member 3*a*. which is the main handle to operate the machine. The trigger switch 5*a*, shown in FIG. 35, is mounted to the top of tube 2*b*.

FIG. 30 is a closeup bottom, right side, front perspective view of the bottom of the stud marker apparatus 1 including marking arm(s) 16 and 22.

FIG. 30 also shows two markings "|x|" on the outside surface 22*a* of marking arm 22, one marking "|x|" on print head 66, and there are three markings "|x|" on the inside surface 16*b* of the marking arm 16. The marking arms 22 and 16 may be identical, except for position and the following exception: Marking arm 16 (left side of the stud marker apparatus 1) produces an "|X|" marking on the left side of all three plates 104,102, and 100, shown in FIG. 5. Marking arm 22 produces two markings "|x|" on the right side of plates 104 and 100, but not the middle plate 102. Plate 102 on the right side of the stud marker apparatus 1 has no marking function as this is the location of the temporary nail 108*a*, shown in FIG. 2 that holds all three plates 100, 102, and 104 together during the marking process. There is a relief slot 23*c*, shown in FIG. 30, on the inside of the right marking arm 22 to allow temporary nail(s) 108*a*, shown in FIG. 2 to pass through the print marking arm or device 22 with no contact to print marking arm or device 22. Temporary nail(s) 108*a* pass through gap 23*c* and are critical, in at least one embodiment, to keeping all three plates 104,102, and 100 properly aligned during the marking process, as shown by FIG. 31.

The marking arm or device 22 is fixed to the member 12 by screw or bolts 23*a* and 23*b* as shown in FIG. 30, however, while the screw or bolt 23*b* remains stationary, the screw or bolt 23*a* can move in a slot in member 12 as shown by FIGS. 8-11, in order to rotate the marking arm or device 22 with respect to the member 12. Similarly or identically, the device 16 is fixed to the member 14 by screw or bolts 17*a* and 17*b* as shown in FIG. 20, however, while the screw or bolt 17*b* remains stationary, the screw or bolt 17*a* can move in a slot in member 14, in order to rotate the marking arm or device 16 with respect to member 14.

Figure 31:
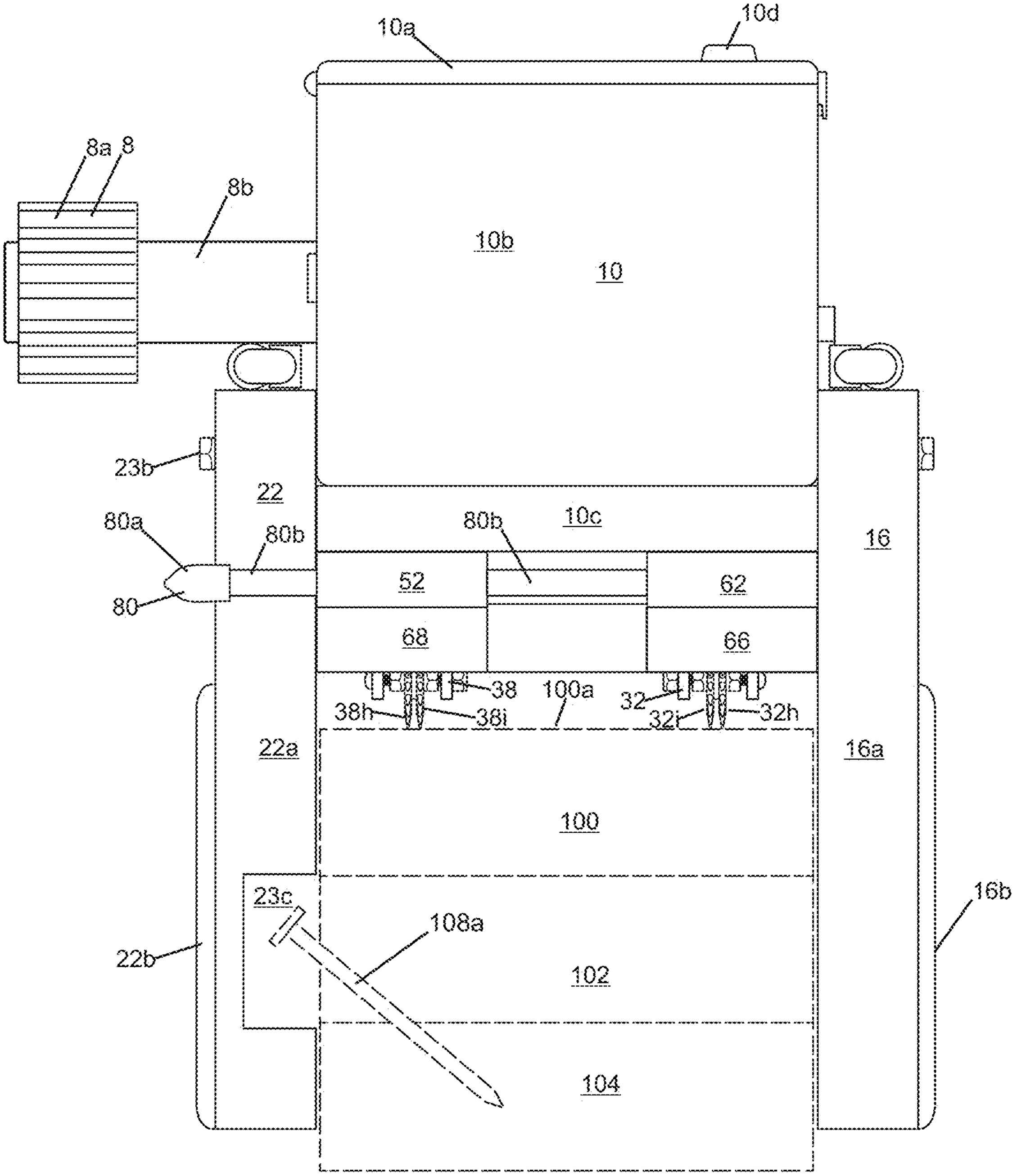
FIG. 31 is a front view of the stud marker apparatus, shown in the first state, and along with the first stack of three wood plates.

There is a gap 23*c* shown in the housing 22*b* of the device 22, and this gap 23*c* is for allowing the stud marker apparatus 1 to move past a fastener, such as fastener 108*a* as shown in FIG. 31.

FIG. 31 is a front view of the stud marker apparatus 1, shown in the first state, and along with the first stack of three wood plates, including wood beams or plates 100, 102, and 104.

FIG. 31 also shows the handle 8, handle member 8*a*, tube 8*b*, device 10, top 10*a*, side 10*b*, device 16, section 16*a*, section 16*b*, device 22, section 22*a*, section 22*b*, fastener 108A, gap or indentation 23*c*, member 80 including section 80*a* and rod 80*b*, screw or bolt 23*b* members 52, 62, 66, 68, and part of devices 32 and 38. Spiked roller wheels 38*h*, 38*i*, 32*h*, and 32*i* are shown contacting the top surface 100*a* of the wood beam or plate 100. The weight of the entire apparatus 1 rests on the top surface 100*a*, via the spiked roller wheels 28*h*, 28*i*, 30*h*, 30*i*, 32*h*, 32*i*, 34*h*, 34*i*, 36*h*, 36*i*, 38*h*, and 38*i* (see FIG. 23). Spiked roller wheels 28*h*, 28*i*, 30*h*, 30*i*, 32*h*, and 32*i* are rotatably mounted to bottom member 65; and Spiked roller wheels 34*h*, 34*i*, 36*h*, 36*i*, 38*h*, and 38*i* are rotatably mounted to bottom member 55, as shown in FIG. 23.

Figure 32:
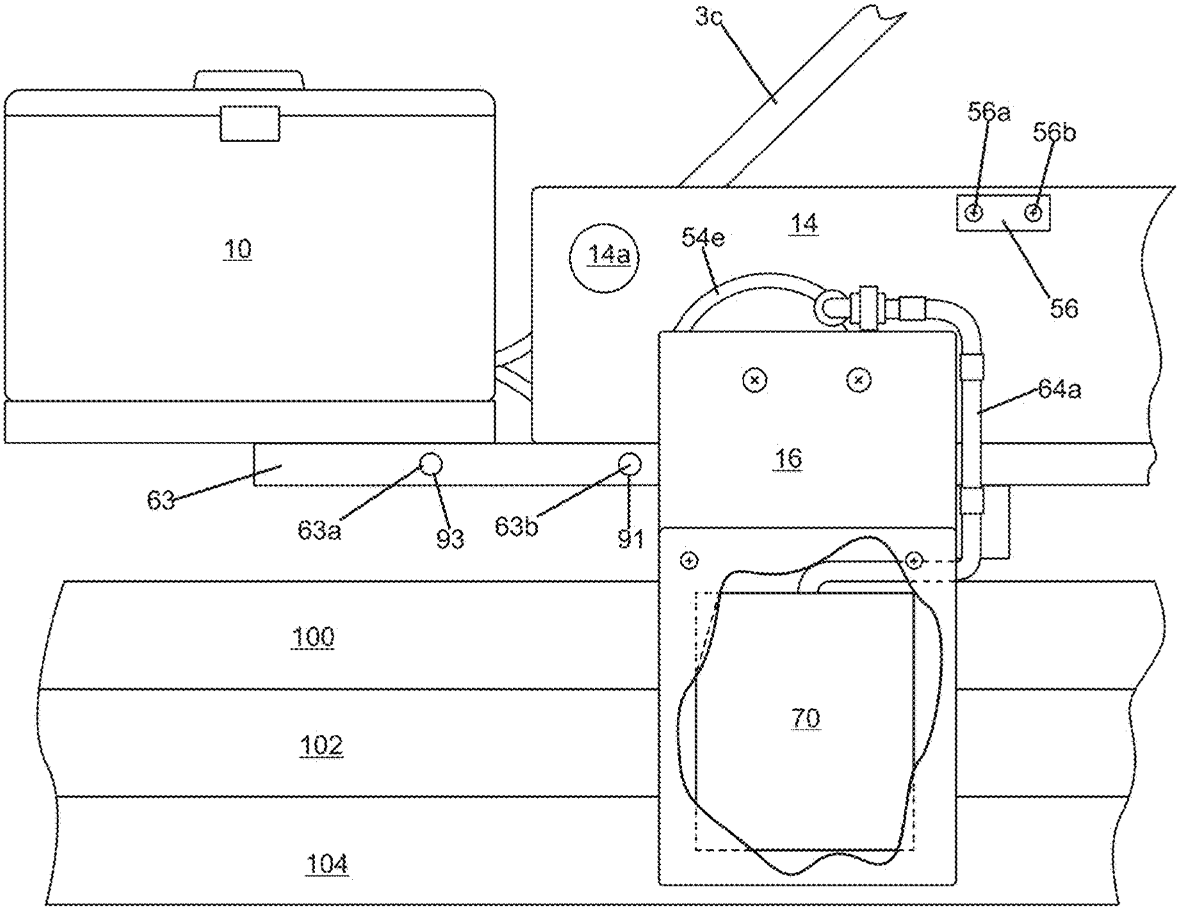
FIG. 32 is a closeup left side view of part of the stud marker apparatus showing a cut-away view of the left marking arm.

FIG. 32 is a closeup left side view of part of the stud marker apparatus 1, with a portion of the print arm or device 16 cut away, to show interior components. FIG. 32 shows a connection at one end of tube 64*a* to a reservoir 70, which may contain paint/ink for marking studs, wood beams, or plates, such as plates 100, 102, and 104. FIG. 32 also shows openings 63*a* and 63*b* in member 63 which are for the two front axles, 91 and 93, shown in FIG. 23 to join both sides of the stud marker apparatus 1 (and to join members 53 and 63 shown in FIG. 23), and an opening 14*a*, which is at a location where a portion of the handle device 8 would be inserted. FIG. 32 also shows a plate 56, which is fixed by screws or bolts 56*a* and 56*b* to the member 14, and the plate is a receiving magnetic plate that engages the print arm or device 16 to lock the print arm or device 16 in the "up" position for storage. The inside of the print arm or device 16 has a matching magnetic plate, as part of the print arm 16, which may be similar or identical to magnetic plate 26*z* for print arm 26, shown in FIG. 25.

There are no spiked roller wheels in either marking arms 16 or 22, as shown by FIG. 23.

FIG. 33 is a closeup right side, top, rear interior view of part of the stud marker apparatus 1, with three tubes 64*d*, 64*e*, and 64*f*, and an electrical cord 72 having two wires 90*a* and 90*b* shown.

Figure 39:
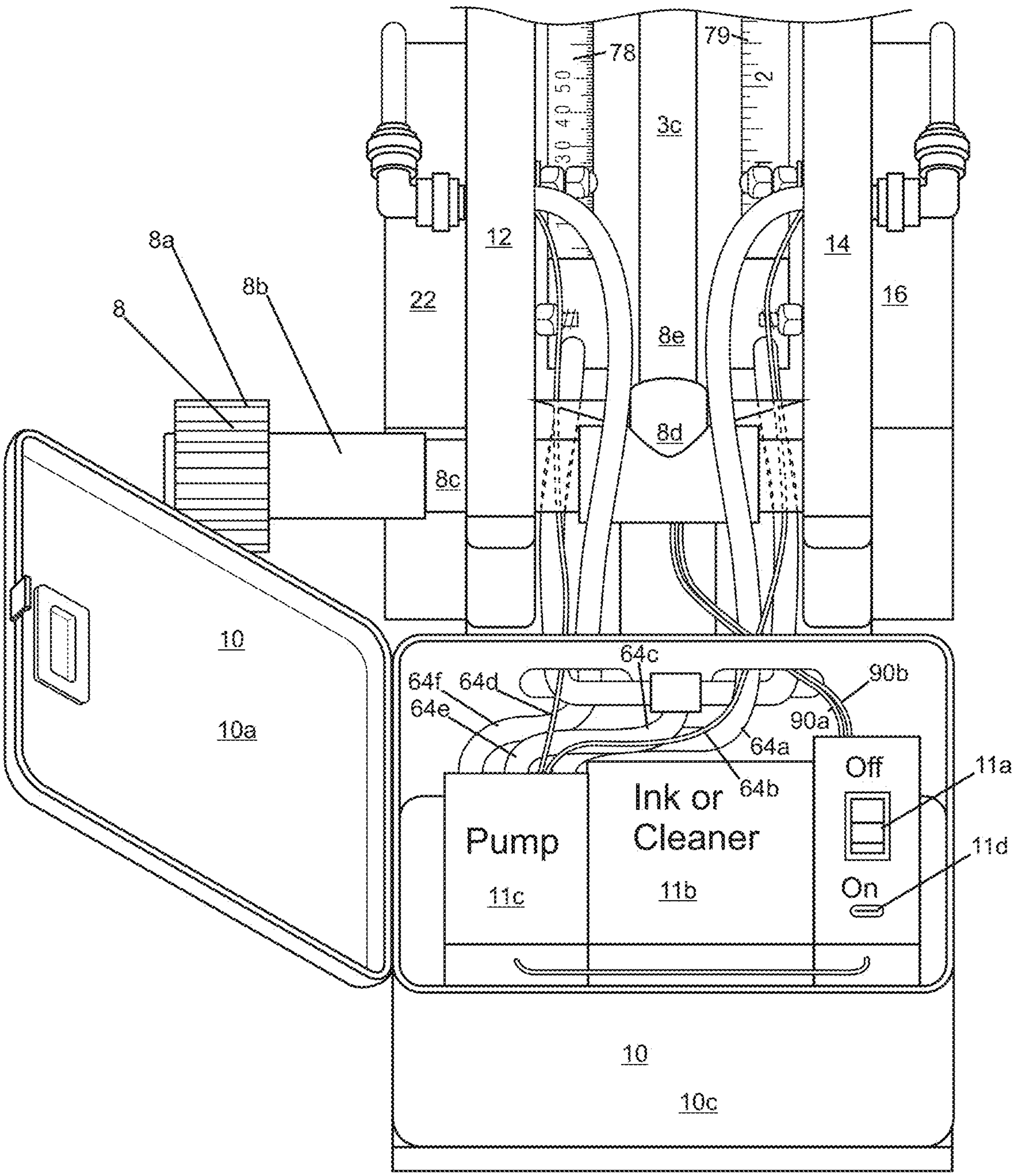
FIG. 39 is a closeup front, and top perspective view of part of the stud marker apparatus where an access door to a stud marker control panel is shown open.

FIG. 33 also shows slot 40*e*, in which the screw or bolt 23*a* moves when the device 22 rotates with respect to member 12. Also shown are portions of a spring 76 wherein the spring 76 tensions the print arm to stay in the down position (Plumb and square to plates 104,102, and 100), as shown in FIG. 32 during marking function. "Kill Switch" 74 turns off the print head it is wired to by wires 90*a* and 90*b* which communicate with the control panel, which is part of device or housing 10, as shown in FIG. 39, when the print head of the particular arm or device (of devices 16, 22, 68, and 68) engages a perpendicular wall so as not to make any paint/ink markings while the particular print arm is travelling over a perpendicular wall and not vertical. Pushing trigger 5*a* in the direction U1, as shown in FIG. 35, initiates the marking function for all marking/print arms 16, 22, 68, and 66, shown in FIG. 31, at the same time.

Figure 34:
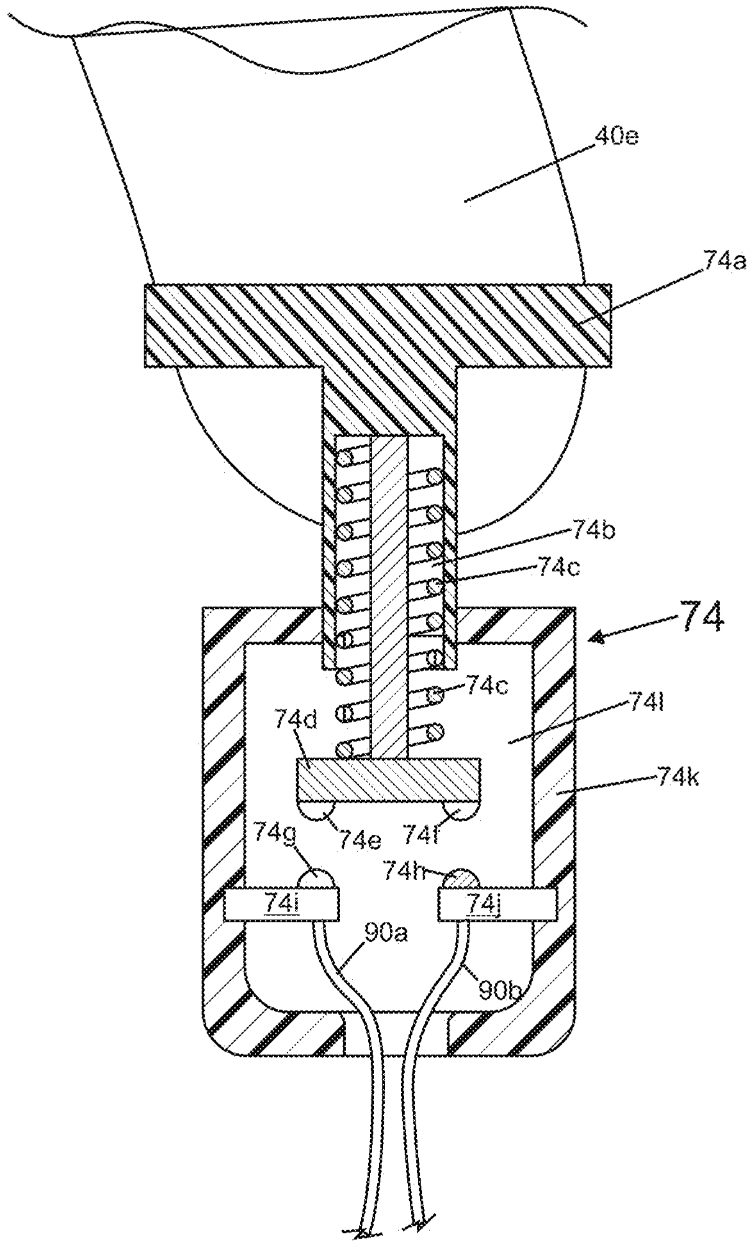
FIG. 34 is a closeup cross sectional view of the trigger switch of the stud marker apparatus on the upper handle of the stud marker apparatus which initiates the print heads to mark all plates when triggered.

FIG. 33 also shows paint/ink tubes 64*d*, 64*e*, and 64*f*, and "Kill switch wire" 72 in which wires 90*a* and 90*b* are located. FIG. 33 also shows the ruler 78 that the adjustable sight guide 98 FIG. 40 attaches to for the desired stud spacing (typically sixteen inches on center but the stud marker apparatus 1 can be adjusted from six inches on center to twenty-four on center and also in metric units). FIG. 33 also shows tube section 3*c*, which is typically the main handle attachment. The user marks the first stud, moves the stud marker apparatus 1 to align the sight guide 98 directly over the stud previously marked and presses the trigger 5*a* to mark the next stud again and again until the end of the wall is reached FIG. 34 is a closeup cross sectional view of an electrical switch component 74 of the stud marker apparatus 1. The electrical switch component 74 includes "T" shaped member 74*a*, spring 74*c* which sits in recess 74*b*, member 74*d*, contacts 74*e*, 74*f*, 74*g*, and 74*h*, members 74*i* and 74*j*, and wires 73*a* and 73*b*. The electrical switch component 74 also includes housing 74*k* and there is a recess 741 in housing 74*k*. The user presses trigger 74*a* to initiate the marking of the studs.

FIG. 35 is a closeup cross sectional view of a handle 2 and various switching components of the stud marker apparatus 1. FIG. 35 shows handle housing 2*a* attached to a hollow tube 2*b*. The wires 90*a* and 90*b* are partially located in the housing 2*a* and in the tube 2*b*. The wires 90*a* and 90*b* are connected to contacts 5*f* and 5*g*, respectively. The trigger 5*a* is shown which has a recess in which is located a spring 5*b*. The spring 5*b* biases the trigger 5*a* partially outside of a recess in the housing 2*a*. When the trigger 5*a* is forced in the direction U1, the spring 5*b* compresses, and the contacts 5*g* and 5*f* are electrically connected by member 5*h* to form a closed circuit with wires 90*a* and 90*b* to signal the print heads which are in and/or part of devices 16, 22, 66, and 68, shown in FIG. 31 to mark the wood plates, such as 100, 102, and 104. The member 5*h* has an end which moves in slot 5*e*. FIG. 35 also shows members 5*c* and 5*d* which are part of the trigger mechanism.

Figure 35A:
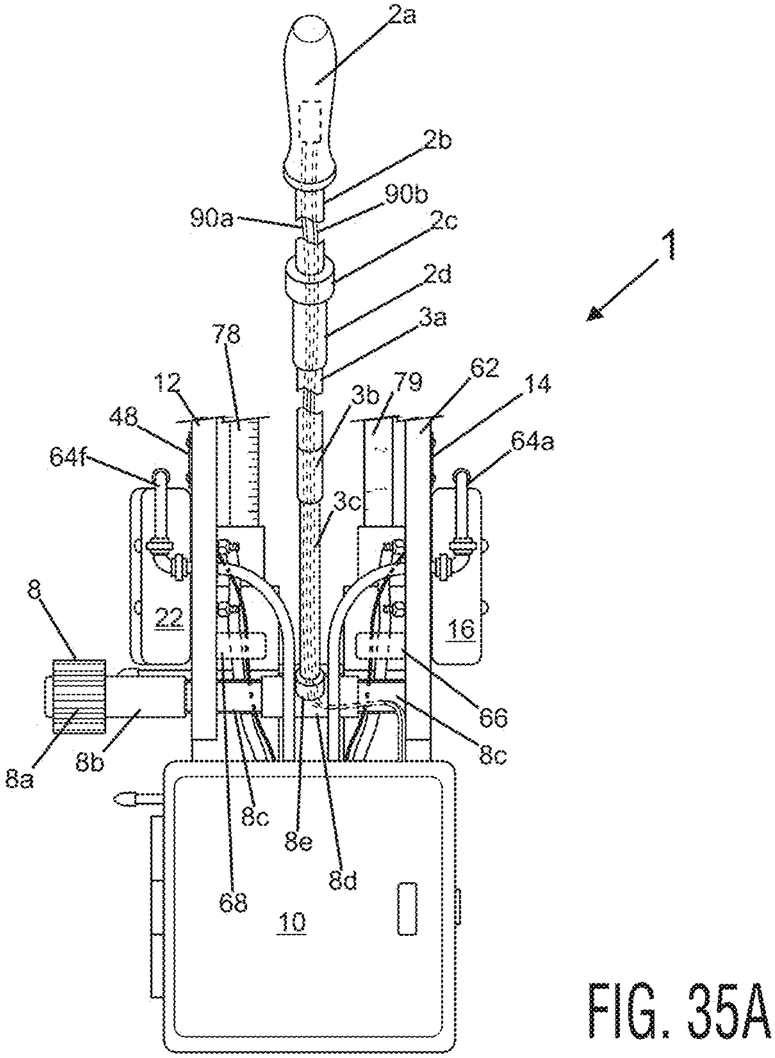
FIG. 35A is a front and top view of the stud marker apparatus, which shows the locating of various interior electrical components in dashed lines.
Figure 36:
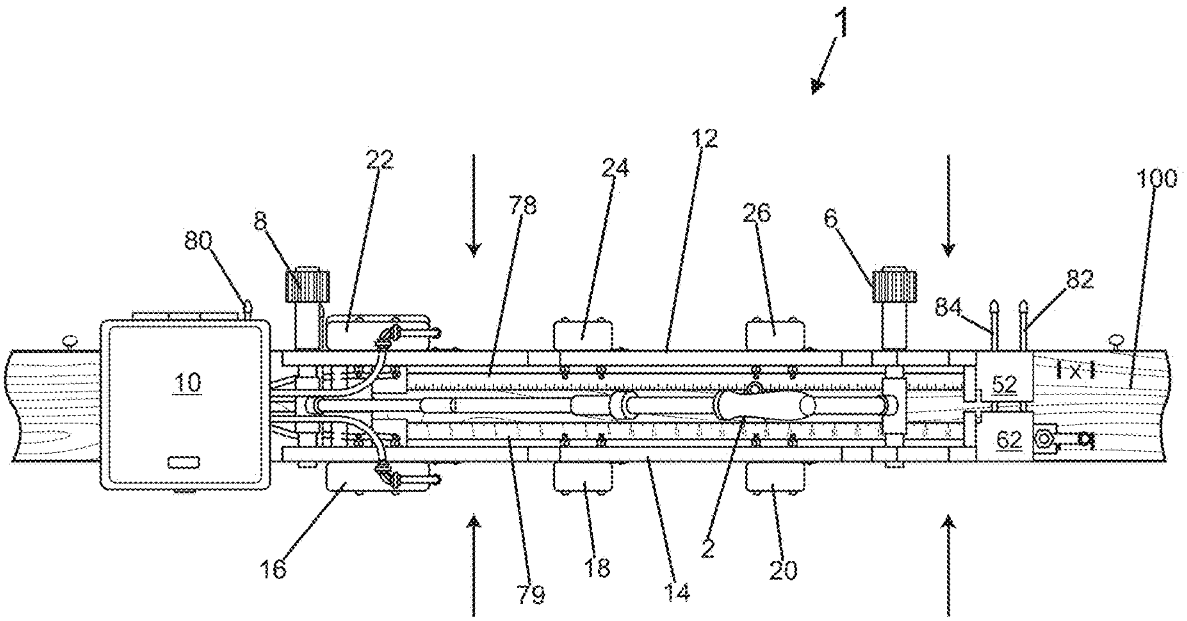
FIG. 36 is a top view of the stud marker apparatus, along with the first stack of three wood plates.

FIG. 35A is a front-top view of the stud marker apparatus 1, which shows the location of various interior electrical components in dashed lines. The electrical wires 90*a* and 90*b* are shown passing through hollow components 2*a*, 2*b*, 2*c*, 3*a*, 3*b*, 3*c*, 8*e*, 8*d*, and 8*c*, and into component 10 Control panel FIG. 36 is a top view of the stud marker apparatus 1, along with the first stack of three wood beams, with only wood beam or plate 100 visible. The handle 2 and the devices 16, 18, 20, 22, 24, and 26 are also shown in FIG. 36.

Figure 37:
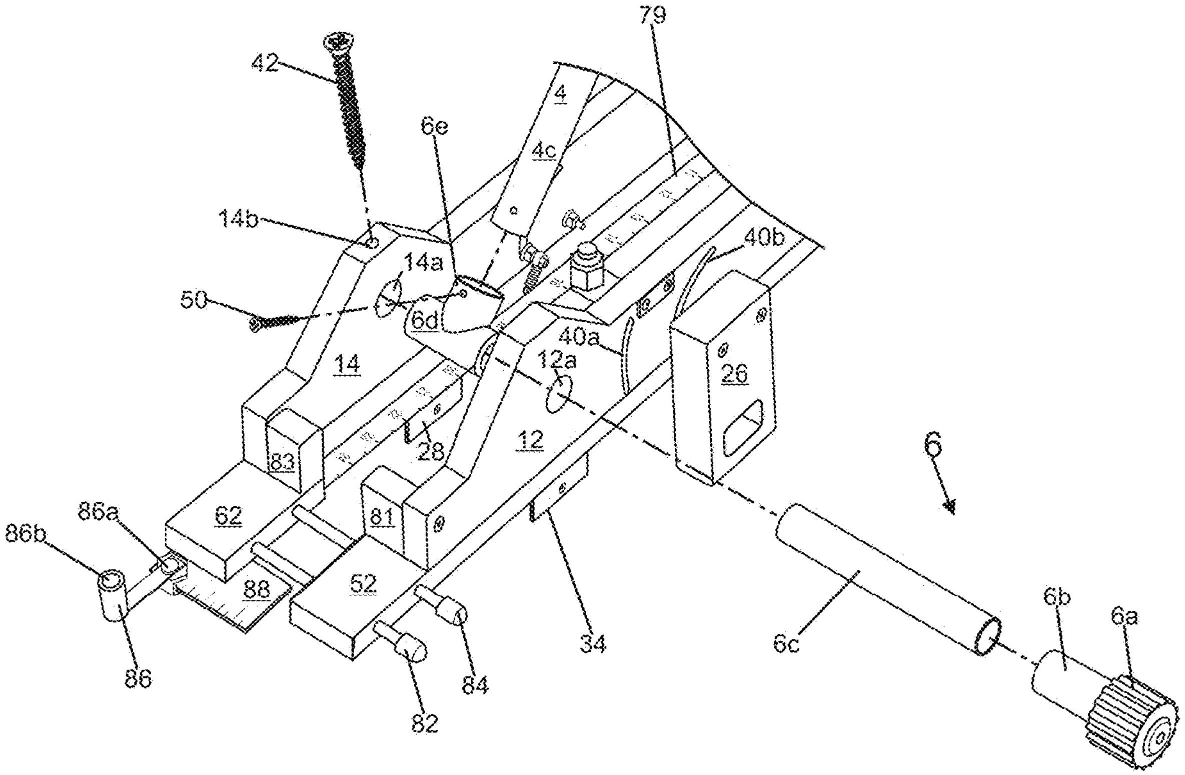
FIG. 37 is a closeup top, rear, and right side view of part of the stud marker apparatus.

FIG. 37 is a closeup top, rear, and right side view of part of the stud marker apparatus 1. FIG. 37 shows parts of members 12 and 14 having openings 12*a* and 14*a* through which tube 6*c* is configured to be inserted. The tube 6*c* has a first end which is inserted into tube 6*b* of which is connected to handle or cap 6*a*. The tube 6*c* has a second end which opposes the first end which is inserted through opening 12*a* in member 12, then through an opening in tube or member 6*d*, to attach to member 6*d*, and then through opening 14*a* of the member 14, and then thereafter a screw 62 is inserted through an opening 14*b* and into the second end of member 6*c* to hold it in place within opening 14*a*. The member 4*c* is inserted into an opening of the hollow member 6*e*, and then fixed in place by a screw 50. The member 6*e* is typically integral and connected to the member 6*d*. This configuration allows the member 4*c* to pivot, using the member 6*c* and 6*d* as a pivot pin.

FIG. 37 also shows members 52, 62, 81, 83, which are parts of the frame for the stud marker apparatus 1. The components 82 and 84 are the rear axles that join frames or members 52 and 62 and allow members 52 and 62 to expand and contract for two inch by four inch walls and/or two inch by six inch walls. The component 86 is an adjustable box beam scriber that attaches to a ruler 88, (on the trailing edge of the stud marker apparatus 1), that holds, through an opening 86*b*, shown in FIG. 37, a standard ⅜" magic marker 87 (with a writing point 87*a*) shown in FIG. 41, to produce a linear marking down the length of top plate 100, shown in FIG. 2. As the stud marker apparatus 1 travels the marker 87 (and point 87*a*) in the component or scriber 86 scribes a line on the upper plate 100 to mark the wood box beam that will attach to the top of the wall in the floor system above. The box beam scriber 86 is adjusted for the box beam thickness by an adjustment screw on 86*a*, shown in FIG. 41 that allows the box beam scriber 86 to be secured to the ruler 88 at the desired box beam thickness.

Figure 38:
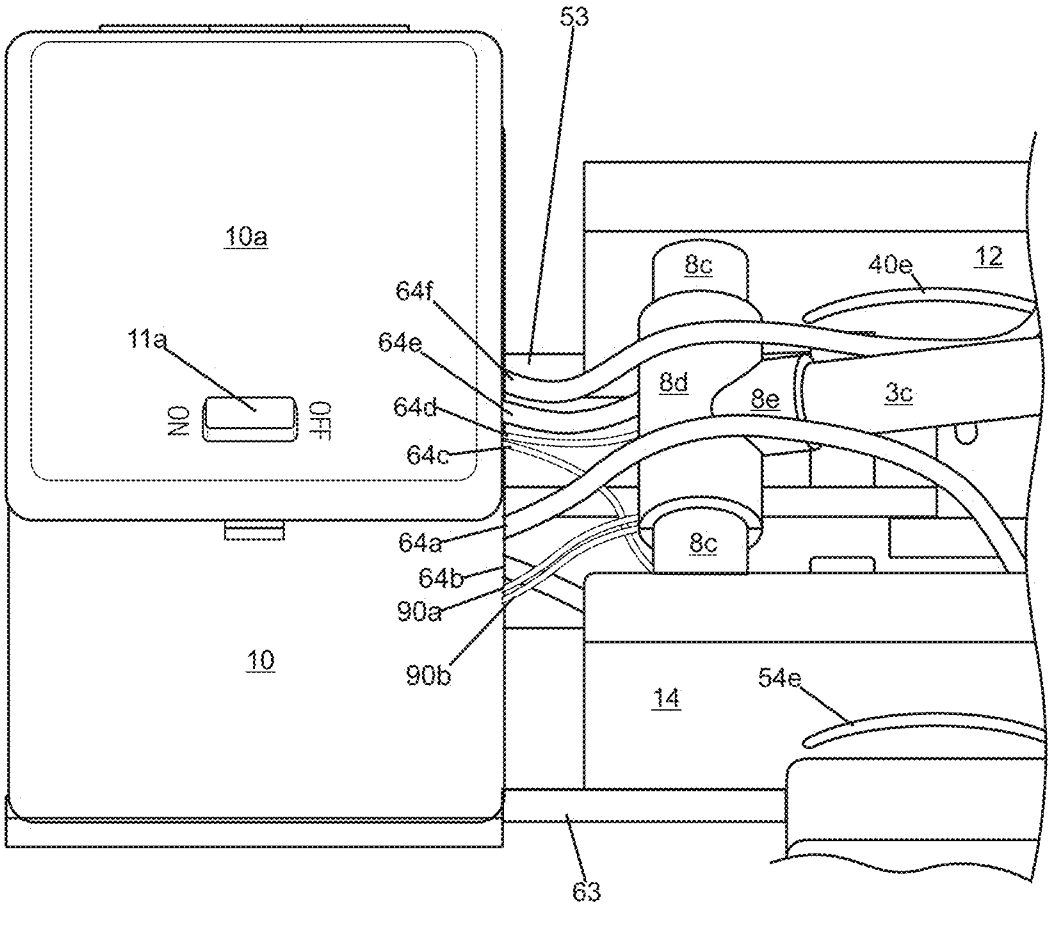
FIG. 38 is a closeup front and left side, and top perspective view of part of the stud marker apparatus.

FIG. 38 is a closeup left side, and top perspective view of part of the stud marker apparatus 1. FIG. 38 also shows a top cover 10*a*, and an on off switch 11*a* of the device 10. FIG. 38 also shows members 80, 8*d*, 8*e*, and 3*c*. FIG. 38 also shows tubes 64*a*, 64*b*, 64*e*, and 64*f* for delivering paint/ink from device 10, which has wires 90*a*, 90*b*, 64*c*,64*d* that wire both "kill switch(s)" 74, FIG. 33. One kill switch 74 goes to marking arm 16 and a second kill switch, which may be similar and/or identical to kill switch 74, goes to marking arm 22.

FIG. 38 also shows slot 40*e* in member 12, and slot 54*e* in member 14, and bottom members 53 and 63.

FIG. 39 is a closeup front, and top perspective view of part of the stud marker apparatus 1 where the top door 10*a* of the device 10 of part of the stud marker apparatus 1 is shown open. FIG. 39 also shows the on off switch 11*a*, an ink or cleaner tank or reservoir 11*b* and a pump 11*c*. The tubes 64*a*, 64*b*, 64*e*, and 64*f* are connected to the pump 11*c* which pumps out paint/ink or cleaner from the reservoir 11*b* to the tubes 64*a*, 64*b*, 64*e*, 64*f*, typically, in at least one embodiment, all at once when trigger 5*a*, shown in FIG. 35, is pushed upwards in the direction U1 and with switch 11*a* in FIG. 39 in the "On" position. To turn the stud marker apparatus 1 "off", the switch 11*a* is put in the "Off" position. The stud marker apparatus 1 may be powered by rechargeable battery pack which may be part of the device 10, within a housing 10*c*, or the stud marker apparatus 1 may be plugged into a power source through a typical extension cord. The stud marker apparatus 1 may be supplied power through port 11*d*, which may be a USB port. Alternatively or additionally, the port 11*d* may include or may be replaced by electrical prongs, or a port, to which an extension cord is configured to be connected for connecting the switch 11*a* to an electrical wall outlet for powering the pump 11*c*.

FIG. 40 is a closeup top view of part of the stud marker apparatus 1 in the first state. FIG. 40 shows rulers 78 (metric) and 79 (Inches) of the stud marker apparatus 1. FIG. 40 also shows stabilizer arm 24 connected to member 12 through screws or bolts 24*a* and 24*b* and nuts 25*a* and 25*b*, respectively, with screw 24*a* able to move in slot 40*d* shown in FIG. 8, so that stabilizer arm 24 can rotate with respect to member 12. FIG. 40 also shows stabilizer arm 18 connected to member 14 through screws or bolts 18*a* and 18*b* and nuts 19*a* and 19*b*, respectively, with screw 18*a* able to move in slot 54*d*, shown in FIG. 17, so that stabilizer arm 18 can rotate with respect to member 14. FIG. 40 shows adjustable sight guide 98 which is what the user adjusts for desired distance between studs.

The adjustable sight guide 98 is also shown in FIG. 7.

FIG. 40 and FIG. 7 also show rulers 78 (metric) and 79 (inches) (which are mounted at the proper and exact distance behind the marking arms 16, and 22 and print heads 66, and 68, shown in FIG. 29. Marking arms 16, and 22 and print heads 66, and 68, shown in FIG. 29, in at least one embodiment, are all perfectly aligned with each other for plumb and square markings on the wood plates, such as wood plates 100, 102, and 104. For example, when the adjustable sight guide 98 leading edge is moved to sixteen inches and locked in place by tightening the locking screw 98*a*, as shown in FIG. 40. In at least one embodiment, it is critical and preferred that the user moves the stud marker apparatus 1 until the adjustable sight guide 98 is directly over and aligned exactly with the paint/ink marking just made a moment earlier on the wood plate 100 (visually aligned by eye). Once aligned, the user pulls or pushes in the direction U1, the trigger, 5*a*, shown in FIG. 35 and the stud marker apparatus 1 will mark the next stud exactly sixteen inches apart from the prior marking. This process is done repeatedly down the length of the stack of wall plates 100, 102, and 104, one marking at a time until the entire wall is marked.

Figure 41:
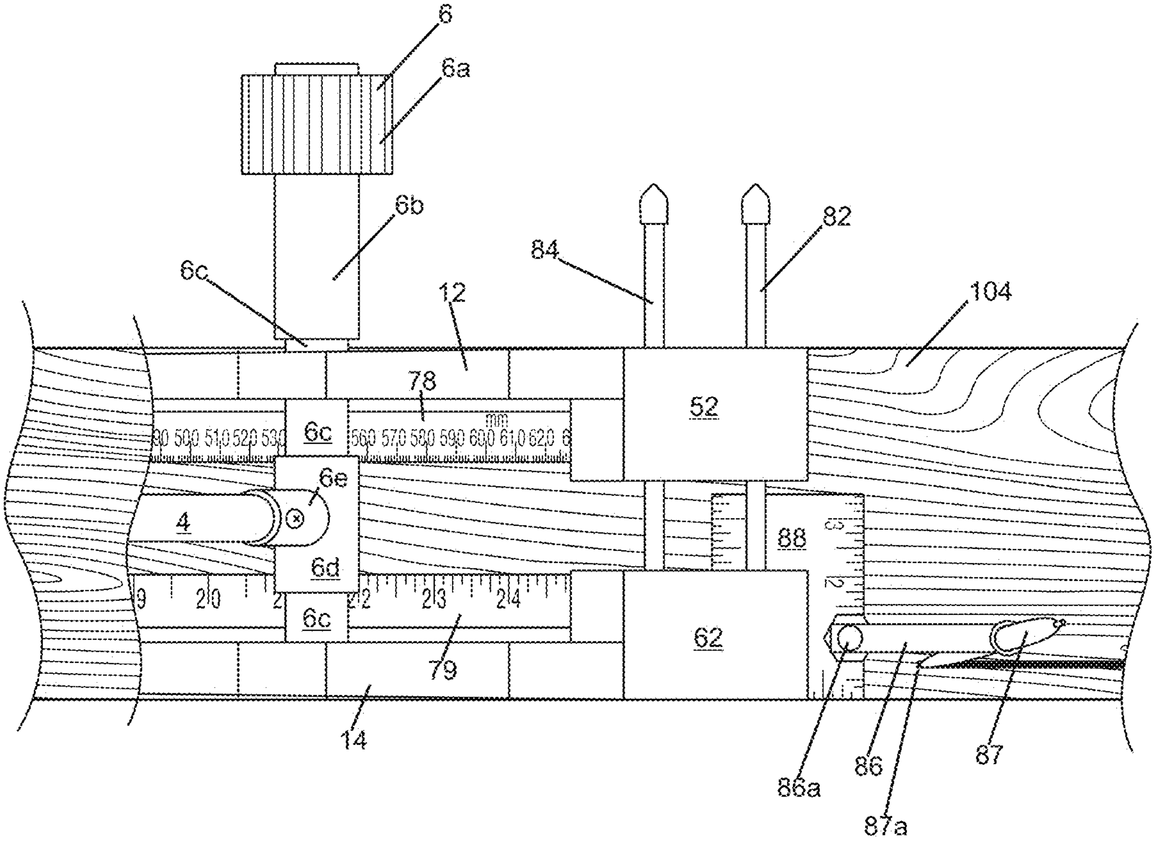
FIG. 41 is a closeup top view of part of the stud marker apparatus in the first state, and also shows the stud marker apparatus is calibrated for inches or metric spacing.

FIG. 41 is a closeup top view of part of the stud marker apparatus 1 in the first state. FIG. 41 also shows members 52, 62, 82, 84, and adjustable box beam scriber 86 with locking screw 86*a* that tightens to ruler 88. FIG. 41 also shows ruler 88 (inches), rulers 78 (metric) and ruler 79 (Inches). FIG. 41 also shows members 12 and 14, and member 4 connected to member 6*e*. FIG. 41 also shows handle 6 including cap or piece 6*a*, member 6*b*, and member 6*c*.

Figure 42:
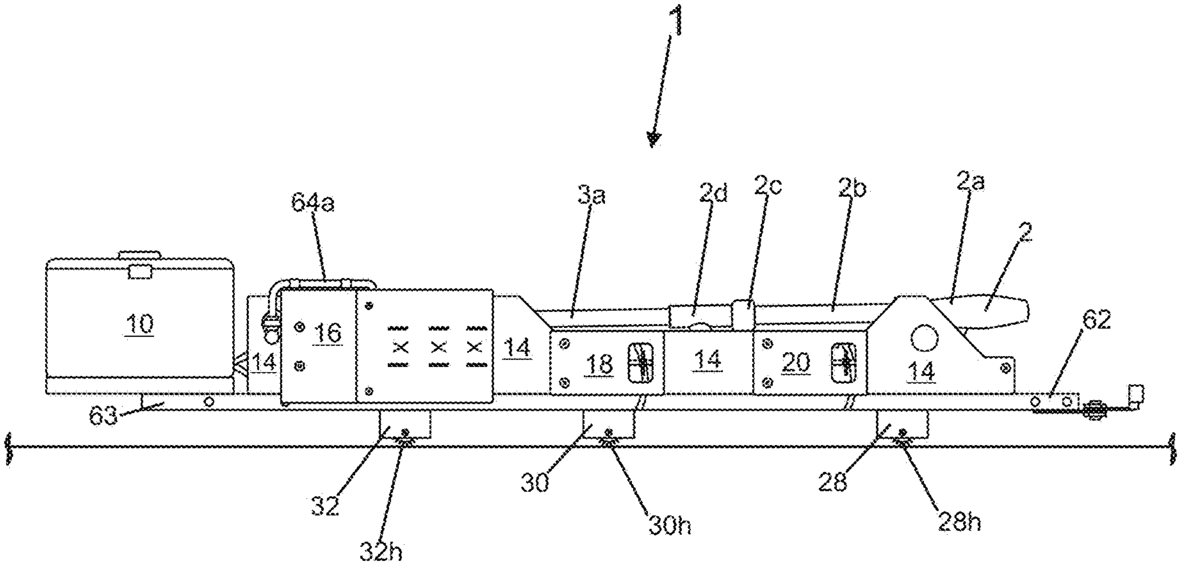
FIG. 42 is a left side view of the stud marker apparatus in a seventh state.

FIG. 42 is a left side view of the stud marker apparatus 1 in a seventh state. In FIG. 42, the handle 2 has been rotated with respect to the member 14 so that the handle 2 is aligned or substantially aligned with the member 14 in the down position for storage. The devices 16, 18, and 20 have also been rotated with respect to the member 14 so that they are aligned with the member 14 for storage. The configuration of FIG. 42 allows the apparatus 1 to be stored in a convenient, and compacted manner. At this stage the magnetic catches on marking arms 16, and 22 and stabilizer arms 18, 20, 24, and 26 are magnetically engaged to their counterparts (for example magnetic catch 44, shown in FIG. 27) on the main frame of the stud marker apparatus 1 for storage.

Figure 43:
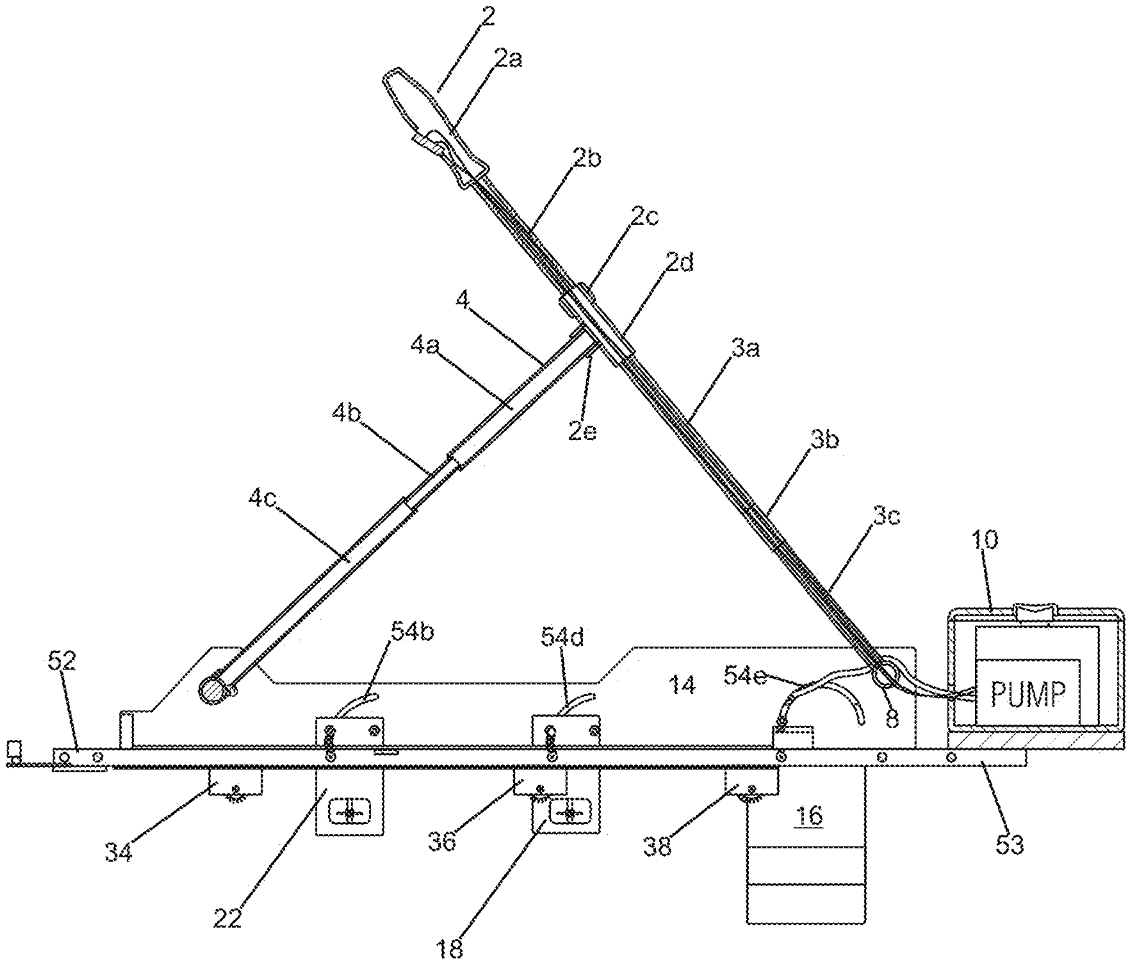
FIG. 43 is a rightside view of the stud marker apparatus in the first state, wherein various components are shown in cross section.

FIG. 43 is a right side view of the stud marker apparatus 1 in the first state, wherein various components are shown in cross section. The combination of handle 2, 2*a*, 2*b*, 2*c*, 2*d*, 3*a*, 3*b*, and 3*c* have been rotated to be in an operational state, at an angle with respect to the member 14. FIG. 43 also shows slots 54*b*, 54*d*, and 54*e* in member 14, which are used to rotate devices 22, 18, and 16.

Figure 44:
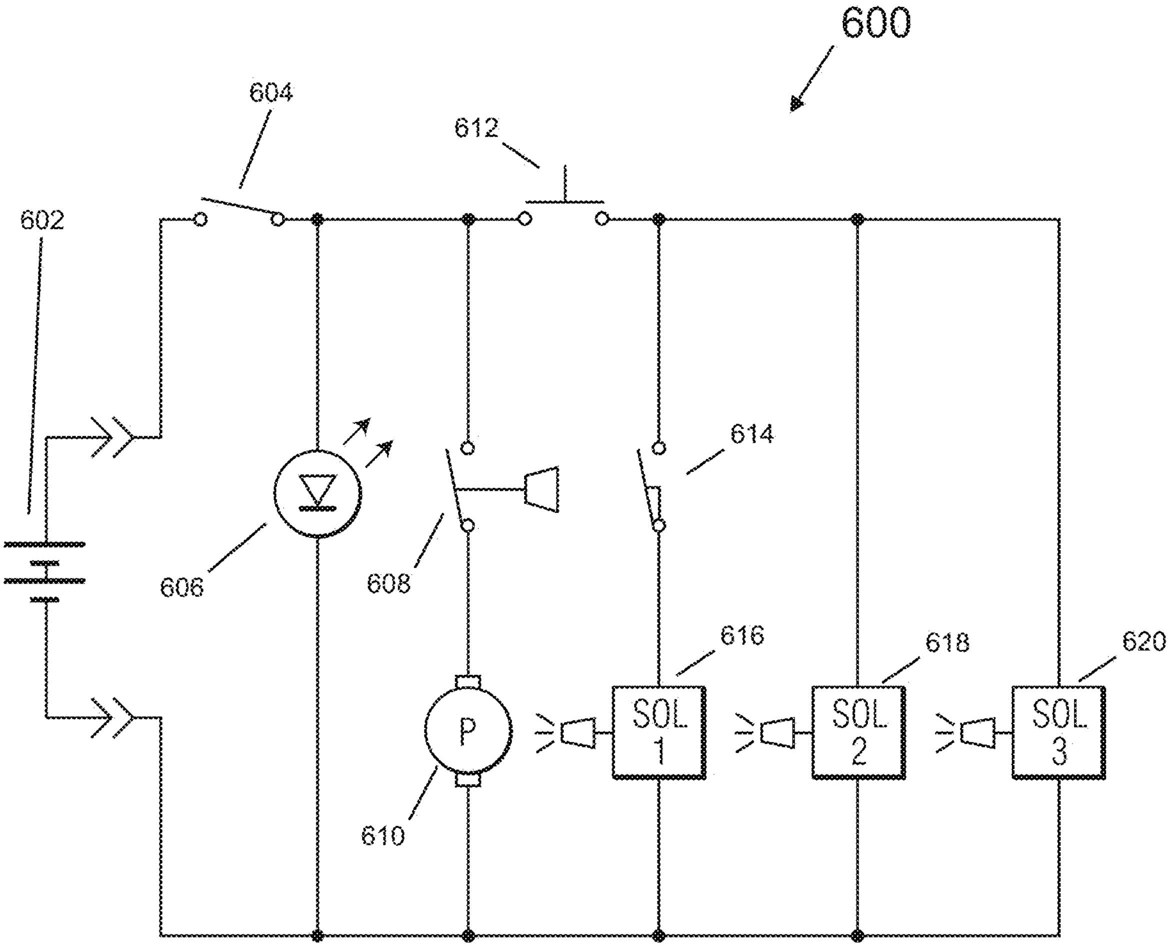
FIG. 44 is a circuit diagram which corresponds to the wiring schematic from trigger in handle to control panel/marking function.

FIG. 44 is a circuit diagram 600 which corresponds to the electrical components in the control panel which is part of device 10, that power the paint/ink pump 11*c*, trigger mechanism and kill switches (switch 74 and similar or identical switch). The component 602 may be a power source which is connected to device 10. Switch 604 may include the kill switch 74. Switch 612 includes the trigger 5*a*. Each of components 606, 608, 610, 614, 616, 618, and 620 may correspond to a solenoid which is part of one or more of spray heads of devices 16, 22, 66, and 68 shown in FIG. 23.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a first marking device;
a first roller wheel; and
a structure to which the first marking device and the first roller wheel are attached; and
wherein the first roller wheel is configured to roll on the top of a stack of one or more plates, while the structure moves over the top of the stack, and while the first marking device marks a first side of the stack with a marking material.

2. The apparatus of claim 1 wherein
the marking material is ink.

3. The apparatus of claim 1 wherein
the marking material is paint.

4. The apparatus of claim 1 further comprising:
a housing; and
wherein the housing includes an enclosure containing the marking material;
and wherein the housing includes a pump configured to pump the marking material out to the first marking device.

5. The apparatus of claim 1 further comprising:
a second marking device; and
wherein the second marking device is attached to the structure on a first side of the structure, and the first marking device is attached to the structure on a second side of the structure, which is opposite the first side of the structure;
and wherein the first roller wheel is configured to roll on the top of the stack, while the structure moves over the top of the stack, and while the second marking device marks a second side of the stack with a marking material, wherein the second side of the first plate is opposite the first side of the first plate.

6. The apparatus of claim 1 further comprising
a second marking device attached to the structure; and
and wherein the first roller wheel is configured to roll on the top of the first plate, while the structure moves over the top of the stack, and while the second marking device marks the top of the stack.

7. The apparatus of claim 1 wherein
the structure includes first and second members which are configured to be set parallel to one another, with a distance between the first and second members;
and further comprising means for changing the distance between the first and the second members.

8. The apparatus of claim 1 further comprising
a handle device attached to the structure;
and wherein the handle device has an activation device for causing the marking material to be supplied to the first marking device.

9. The apparatus of claim 1 further comprising
a first stabilizing device attached to the structure on a first side of the structure; and
a second stabilizing device attached to the structure on a second side of the structure which is opposite the first side of the structure; and
wherein first stabilizing device, the second stabilizing device, and the structure are configured to be put in a state where the stack is between the first stabilizing device and the second stabilizing device, and the first and second stabilizing device help to keep the structure aligned with the first stack, and simultaneously over the top of the stack.

10. The apparatus of claim 1 wherein
the first marking device is configured to rotate with respect to the structure.

11. The apparatus of claim 9 wherein
each of the first and second stabilizing devices is configured to rotate with respect to the structure.

12. A method comprising:

marking a first horizontal plate of a stack of one or more horizontal plates, with a location of a first vertical stud using an apparatus;

wherein the apparatus is comprised of:

a first marking device;

a first roller wheel; and a structure to which the first marking device and the first roller wheel are attached; and wherein the first roller wheel is configured to roll on the top of the stack, while the structure moves over the top of the stack, and while the first marking device marks a first side of the stack with a marking material.

13. The method of claim 12 wherein the marking material is ink.

14. The method of claim 12 wherein the marking material is paint.

15. The method of claim 12 wherein the apparatus further includes:

a housing; and wherein the housing includes an enclosure containing the marking material;

and wherein the housing includes a pump configured to pump the marking material out to the first marking device.

16. The method of claim 12 wherein the apparatus further includes:

a second marking device; and wherein the second marking device is attached to the structure on a first side of the structure, and the first marking device is attached to the structure on a second side of the structure, which is opposite the first side of the structure;

and wherein the first roller wheel is configured to roll on the top of the stack, while the structure moves over the top of the stack, and while the second marking device marks a second side of the stack with a marking material, wherein the second side of the first plate is opposite the first side of the first plate.

17. The method of claim 12 wherein the apparatus further includes:

a second marking device attached to the structure; and and wherein the first roller wheel is configured to roll on the top of the first plate, while the structure moves over the top of the stack, and while the second marking device marks the top of the stack.

18. The method of claim 12 wherein the apparatus further includes:

the structure includes first and second members which are configured to be set parallel to one another, with a distance between the first and second members;

and further comprising means for changing the distance between the first and the second members.

19. The method of claim 12 wherein the apparatus further includes:

a handle device attached to the structure;

and wherein the handle device has an activation device for causing the marking material to be supplied to the first marking device.

20. The method of claim 12 wherein the apparatus further includes:

a first stabilizing device attached to the structure on a first side of the structure; and a second stabilizing device attached to the structure on a second side of the structure which is opposite the first side of the structure; and wherein first stabilizing device, the second stabilizing device, and the structure are configured to be put in a state where the stack is between the first stabilizing device and the second stabilizing device, and the first and second stabilizing device help to keep the structure aligned with the first stack, and simultaneously over the top of the stack.

21. The method of claim 12 wherein the apparatus further includes:

the first marking device is configured to rotate with respect to the structure.

22. The method of claim 21 wherein each of the first and second stabilizing devices is configured to rotate with respect to the structure.

* * * * *